(12) United States Patent
Tsuruoka

(10) Patent No.: US 8,310,566 B2
(45) Date of Patent: Nov. 13, 2012

(54) IMAGE PICKUP SYSTEM AND IMAGE PROCESSING METHOD WITH AN EDGE EXTRACTION SECTION

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 1112 days.

(21) Appl. No.: 12/146,786

(22) Filed: Jun. 26, 2008

(65) Prior Publication Data

US 2008/0266432 A1    Oct. 30, 2008

Related U.S. Application Data

(63) Continuation of application No. PCT/JP2006/325276, filed on Dec. 19, 2006.

(30) Foreign Application Priority Data

Dec. 28, 2005    (JP) .................................. 2005-380346

(51) Int. Cl.
*H04N 5/217*    (2006.01)
*H04N 5/208*    (2006.01)

(52) U.S. Cl. ..................... 348/241; 348/222.1; 348/252; 382/266; 382/270

(58) Field of Classification Search .................. 382/266, 382/269
See application file for complete search history.

(56) References Cited

U.S. PATENT DOCUMENTS

| | | | | |
|---|---|---|---|---|
| 6,289,125 | B1 * | 9/2001 | Katoh et al. | 382/194 |
| 6,763,129 | B1 * | 7/2004 | Honda et al. | 382/132 |
| 6,904,169 | B2 * | 6/2005 | Kalevo et al. | 382/167 |
| 6,980,258 | B1 | 12/2005 | Matsunaga | 348/625 |
| 7,254,261 | B2 * | 8/2007 | Avinash et al. | 382/132 |
| 7,391,903 | B2 * | 6/2008 | Ishiga | 382/167 |
| 7,515,209 | B2 * | 4/2009 | Hsu | 348/606 |
| 7,970,231 | B2 * | 6/2011 | Tamura et al. | 382/266 |
| 8,035,705 | B2 * | 10/2011 | Tsuruoka | 348/252 |
| 2002/0126313 | A1 * | 9/2002 | Namizuka | 358/2.1 |
| 2003/0122969 | A1 * | 7/2003 | Higuchi | 348/607 |
| 2003/0174223 | A1 | 9/2003 | Hayashi | 348/241 |
| 2004/0207881 | A1 * | 10/2004 | Nomura | 358/3.24 |
| 2005/0074181 | A1 | 4/2005 | Hoshuyama | 382/266 |
| 2005/0157189 | A1 | 7/2005 | Sambongi | 348/241 |
| 2006/0050157 | A1 | 3/2006 | Tsuruoka | 348/241 |
| 2007/0132864 | A1 * | 6/2007 | Tsuruoka | 348/241 |

FOREIGN PATENT DOCUMENTS

EP    1 227 668    7/2002
(Continued)

OTHER PUBLICATIONS

International Search Report mailed Mar. 27, 2007 in corresponding PCT International Application No. PCT/JP2006/325276.

*Primary Examiner* — Ngoc-Yen Vu
(74) *Attorney, Agent, or Firm* — Ostrolenk Faber LLP

(57) ABSTRACT

An image pickup system for processing a signal from a CCD includes a noise reducing unit for performing a noise reduction processing on the signal from the CCD, an edge direction detection unit for detecting an edge direction from the signal having been subjected to the noise reduction processing, and an edge extraction unit for extracting an edge component from the signal from the CCD on the basis of the edge direction.

63 Claims, 36 Drawing Sheets

FOREIGN PATENT DOCUMENTS

| | | |
|---|---|---|
| EP | 1 555 809 | 7/2005 |
| EP | 1 677 516 | 7/2006 |
| JP | 6-86098 | 3/1994 |
| JP | 6-90724 | 11/1994 |
| JP | 7-135584 | 5/1995 |
| JP | 8-163408 | 6/1996 |
| JP | 11-261848 | 9/1999 |
| JP | 2000-306089 | 11/2000 |
| JP | 2000-348018 | 12/2000 |
| JP | 2001-128031 | 5/2001 |
| JP | 3289435 | 3/2002 |
| JP | 2003-230052 | 8/2003 |
| JP | 2003-242504 | 8/2003 |
| JP | 2003-274181 | 9/2003 |
| JP | 2004-128985 | 4/2004 |
| JP | 2005-130297 | 5/2005 |
| WO | WO 01/33834 | 5/2001 |
| WO | WO 2004/032486 | 4/2004 |
| WO | WO 2005/041560 | 5/2005 |

\* cited by examiner

FIG.10
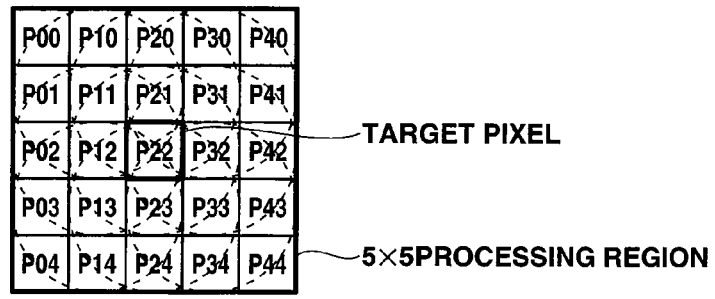
TARGET PIXEL
5×5 PROCESSING REGION
FIG.11
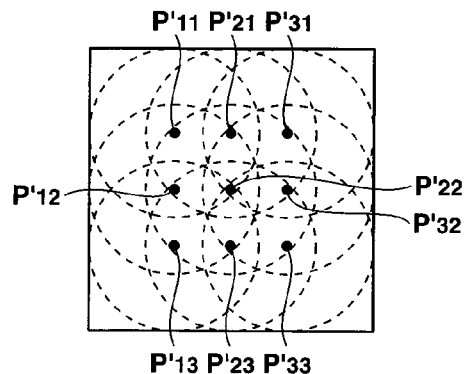
FIG.12
| -3 | -3 | 5 |
|----|----|---|
| -3 |    | 5 |
| -3 | -3 | 5 |
FIG.13
| -3 | 5  | 5  |
|----|----|----|
| -3 |    | 5  |
| -3 | -3 | -3 |
FIG.14
| 5  | 5  | 5  |
|----|----|----|
| -3 |    | -3 |
| -3 | -3 | -3 |

FIG.15

| 5 | 5 | -3 |
|---|---|---|
| 5 |   | -3 |
| -3 | -3 | -3 |

FIG.16

| 5 | -3 | -3 |
|---|---|---|
| 5 |   | -3 |
| 5 | -3 | -3 |

FIG.17

| -3 | -3 | -3 |
|---|---|---|
| 5 |   | -3 |
| 5 | 5 | -3 |

FIG.18

| -3 | -3 | -3 |
|---|---|---|
| -3 |   | -3 |
| 5 | 5 | 5 |

FIG.19

| -3 | -3 | -3 |
|---|---|---|
| -3 |   | 5 |
| -3 | 5 | 5 |

FIG.20

| 1 | 1 | 1 |
|---|---|---|
| 1 | -8 | 1 |
| 1 | 1 | 1 |

FIG.21
| -1 |   | 1 |
|----|---|---|
| -2 |   | 2 |
| -1 |   | 1 |
FIG.22
| 1  | 2  | 1  |
|----|----|----|
|    |    |    |
| -1 | -2 | -1 |
FIG.23
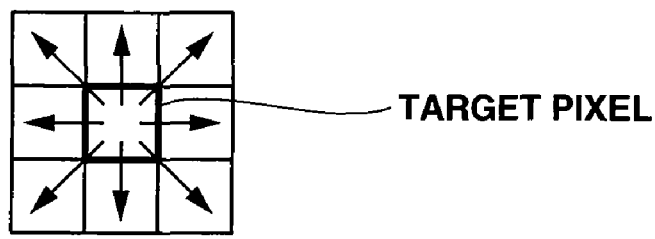
TARGET PIXEL
FIG.24
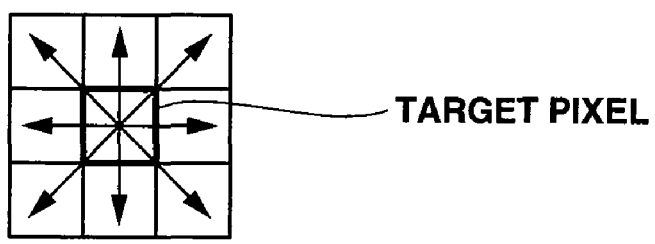
TARGET PIXEL

FIG.29

| P00 | P10 | P20 | P30 | P40 |
|-----|-----|-----|-----|-----|
| P01 | P11 | P21 | P31 | P41 |
| P02 | P12 | P22 | P32 | P42 |
| P03 | P13 | P23 | P33 | P43 |
| P04 | P14 | P24 | P34 | P44 |

TARGET PIXEL

5×5 TARGET REGION

FIG.30

| P00 | P10 | P20 | P30 | P40 |
|-----|-----|-----|-----|-----|
| P01 | P11 | P21 | P31 | P41 |
| P02 | P12 | P22 | P32 | P42 |
| P03 | P13 | P23 | P33 | P43 |
| P04 | P14 | P24 | P34 | P44 |

TARGET PIXEL

SIMILAR PIXEL

FIG.34

| -1 | -2 |    | 2 | 1 |
|----|----|----|----|----|
| -3 | -5 |    | 5 | 3 |
| -4 | -6 |    | 6 | 4 |
| -3 | -5 |    | 5 | 3 |
| -1 | -2 |    | 2 | 1 |

TARGET PIXEL

FIG.35

| 1 | 3 | 4 | 3 | 1 |
|----|----|----|----|----|
| 2 | 5 | 6 | 5 | 2 |
|   |   |   |   |   |
| -2 | -5 | -6 | -5 | -2 |
| -1 | -3 | -4 | -3 | -1 |

TARGET PIXEL

| P00 | P10 | P20 | P30 |
|-----|-----|-----|-----|
| P01 | P11 | P21 | P31 |
| P02 | P12 | P22 | P32 |
| P03 | P13 | P23 | P33 |

FIG.49

| R00 | G10 | R20 | G30 | R40 | G50 |
|-----|-----|-----|-----|-----|-----|
| G01 | B11 | G21 | B31 | G41 | B51 |
| R02 | G12 | R22 | G32 | R42 | G52 |
| G03 | B13 | G23 | B33 | G43 | B53 |
| R04 | G14 | R24 | G34 | R44 | G54 |
| G05 | B15 | G25 | B35 | G45 | B55 |

FIG.50

| Cy00 | Ye10 | Cy20 | Ye30 | Cy40 | Ye50 |
|------|------|------|------|------|------|
| G01 | Mg11 | G21 | Mg31 | G41 | Mg51 |
| Cy02 | Ye12 | Cy22 | Ye32 | Cy42 | Ye52 |
| Mg03 | G13 | Mg23 | G33 | Mg43 | G53 |
| Cy04 | Ye14 | Cy24 | Ye34 | Cy44 | Ye54 |
| G05 | Mg15 | G25 | Mg35 | G45 | Mg55 |

FIG.53

| R00 | G10 | R20 | G30 | R40 | G50 |
|-----|-----|-----|-----|-----|-----|
| G01 | B11 | G21 | B31 | G41 | B51 |
| R02 | G12 | R22 | G32 | R42 | G52 |
| G03 | B13 | G23 | B33 | G43 | B53 |
| R04 | G14 | R24 | G34 | R44 | G54 |
| G05 | B15 | G25 | B35 | G45 | B55 |

FIG.54

|     | G10 |     | G30 |     | G50 |
|-----|-----|-----|-----|-----|-----|
| G01 |     | G21 |     | G41 |     |
|     | G12 |     | G32 |     | G52 |
| G03 |     | G23 |     | G43 |     |
|     | G14 |     | G34 |     | G54 |
| G05 |     | G25 |     | G45 |     |

FIG.55

| R00 |  | R20 |  | R40 |  |
|-----|--|-----|--|-----|--|
|     |  |     |  |     |  |
| R02 |  | R22 |  | R42 |  |
|     |  |     |  |     |  |
| R04 |  | R24 |  | R44 |  |
|     |  |     |  |     |  |

FIG.56

|  |     |  |     |  |     |
|--|-----|--|-----|--|-----|
|  | B11 |  | B31 |  | B51 |
|  |     |  |     |  |     |
|  | B13 |  | B33 |  | B53 |
|  |     |  |     |  |     |
|  | B15 |  | B35 |  | B55 |

FIG.57

|  | -3/4 |  | 5/4 |  |
|---|---|---|---|---|
| -3/4 |  | -5/2 |  | 5/4 |
|  | -9/2 |  | 15/2 |  |
| -3/4 |  | -5/2 |  | 5/4 |
|  | -3/4 |  | 5/4 |  |

FIG.58

|  |  | -3/4 |  |  |
|---|---|---|---|---|
|  | -9/2 |  | 11/2 |  |
| -3/4 |  | -1 |  | 5/4 |
|  | -9/2 |  | 11/2 |  |
|  |  | -3/4 |  |  |

FIG.59

|  | -3/4 |  | 5/4 |  |
|---|---|---|---|---|
| -3/4 |  | 11/2 |  | 5/4 |
|  | -9/2 |  | 11/2 |  |
| -3/4 |  | -9/2 |  | -3/4 |
|  | -3/4 |  | -3/4 |  |

FIG.60

|  |  | 5/4 |  |  |
|---|---|---|---|---|
|  | -5/2 |  | 15/2 |  |
| -3/4 |  | 1 |  | 5/4 |
|  | -9/2 |  | -5/2 |  |
|  |  | -3/4 |  |  |

FIG.61

|   | 5/4 |   | 5/4 |   |
|---|---|---|---|---|
| 5/4 |   | 15/2 |   | 5/4 |
|   | -5/2 | ☐ | -5/2 |   |
| -3/4 |   | -9/2 |   | -3/4 |
|   | -3/4 |   | -3/4 |   |

FIG.62

|   |   | 5/4 |   |   |
|---|---|---|---|---|
|   | 11/2 |   | 11/2 |   |
| -3/4 |   | -1 |   | -3/4 |
|   | -9/2 |   | -9/2 |   |
|   |   | -3/4 |   |   |

FIG.63

|   | 5/4 |   | -3/4 |   |
|---|---|---|---|---|
| 5/4 |   | 11/2 |   | -3/4 |
|   | 11/2 | ☐ | -9/2 |   |
| -3/4 |   | -9/2 |   | -3/4 |
|   | -3/4 |   | -3/4 |   |

FIG.64

|   |   | 5/4 |   |   |
|---|---|---|---|---|
|   | 15/2 |   | -5/2 |   |
| 5/4 |   | 1 |   | -3/4 |
|   | -5/2 |   | -9/2 |   |
|   |   | -3/4 |   |   |

FIG.65

|     | 5/4  |     | -3/4 |      |
|-----|------|-----|------|------|
| 5/4 |      | -5/2|      | -3/4 |
|     | 15/2 |     | -9/2 |      |
| 5/4 |      | -5/2|      | -3/4 |
|     | 5/4  |     | -3/4 |      |

FIG.66

|     |      | -3/4 |      |      |
|-----|------|------|------|------|
|     | 11/2 |      | -9/2 |      |
| 5/4 |      | -1   |      | -3/4 |
|     | 11/2 |      | -9/2 |      |
|     |      | -3/4 |      |      |

FIG.67

|      | -3/4 |      | -3/4 |      |
|------|------|------|------|------|
| -3/4 |      | -9/2 |      | -3/4 |
|      | 11/2 |      | -9/2 |      |
| 5/4  |      | 11/2 |      | -3/4 |
|      | 5/4  |      | -3/4 |      |

FIG.68

|     |      | -3/4 |      |      |
|-----|------|------|------|------|
|     | -5/2 |      | -9/2 |      |
| 5/4 |      | 1    |      | -3/4 |
|     | 15/2 |      | -5/2 |      |
|     |      | 5/4  |      |      |

FIG.69

|  | -3/4 |  | -3/4 |  |
|---|---|---|---|---|
| -3/4 |  | -9/2 |  | -3/4 |
|  | -5/2 |  | -5/2 |  |
| 5/4 |  | 15/2 |  | 5/4 |
|  | 5/4 |  | 5/4 |  |

FIG.70

|  |  | -3/4 |  |  |
|---|---|---|---|---|
|  | -9/2 |  | -9/2 |  |
| -3/4 |  | -1 |  | -3/4 |
|  | 11/2 |  | 11/2 |  |
|  |  | 5/4 |  |  |

FIG.71

|  | -3/4 |  | -3/4 |  |
|---|---|---|---|---|
| -3/4 |  | -9/2 |  | -3/4 |
|  | -9/2 |  | 11/2 |  |
| -3/4 |  | 11/12 |  | 5/4 |
|  | -3/4 |  | 5/4 |  |

FIG.72

|  |  | -3/4 |  |  |
|---|---|---|---|---|
|  | -9/2 |  | -5/2 |  |
| -3/4 |  | 1 |  | 5/4 |
|  | -5/2 |  | 15/2 |  |
|  |  | 5/4 |  |  |

IMAGE PICKUP SYSTEM AND IMAGE PROCESSING METHOD WITH AN EDGE EXTRACTION SECTION

CROSS REFERENCE TO RELATED APPLICATION

This application is a continuation application of PCT/JP2006/325276 filed on Dec. 19, 2006 and claims benefit of Japanese Application No. 2005-380346 filed in Japan on Dec. 28, 2005, the entire contents of which are incorporated herein by this reference.

BACKGROUND OF THE INVENTION

1. Field of the Invention

The present invention relates to an image pickup system, an image processing method, and a computer program product for extracting an edge component with respect to a signal from an image pickup device.

2. Description of the Related Art

A processing for extracting an edge component with respect to a signal from an image pickup device is roughly divided into a single filter processing such as Laplacian and a directional plural-filter processing. As a latter example, as in Japanese Examined Patent Application Publication No. 6-90724, for example, there is disclosed a technology of performing a directional unsharp mask processing by selecting a rectangular region in which a difference with respect to a smoothed signal is maximized among four-direction rectangular regions. With this configuration, an influence of a dotted defect such as dust is suppressed, and a higher precision edge component can be extracted. In addition, Japanese Patent No. 3289435 discloses a technology of calculating a weighting factor from a step edge, an impulse signal, a noise, or the like to correct an edge signal on the basis of this factor. With this configuration, the edge signal is shaped, and it is possible to extract a higher precision edge component. Furthermore, Japanese Unexamined Patent Application Publication No. 2000-306089 discloses a technology of frequency-decomposing a signal through wavelet, Laplacian pyramid, or the like and correcting a high frequency component from vector information of a low frequency component. With this configuration, the edge signal is shaped, and also a noise component is suppressed, thus making it possible to obtain a high precision signal.

According to Japanese Examined Patent Application Publication No. 6-90724, it is possible to identify a large dotted noise with a large luminance difference such as the dust. However, it is not possible to deal with an identification of an isotropically generated noise such as a random noise due to the image pickup device or a slight noise with small luminance difference, and there is a problem that it is not possible to stably extract an edge component from various noises. In addition, according to Japanese Patent No. 3289435, in a case where the noises are large, it is possible to suppress the influence of the noises by generating a small weighting factor. However, as the noise component itself remains, it is not possible to deal with an execution of a strong edge emphasis, and there is a problem that a degree of freedom for image creation is small. Furthermore, according to Japanese Unexamined Patent Application Publication No. 2000-306089, the vector information for the correction is obtained from the low frequency signal. A resolution of the vector information depends on a decomposition level of the wavelet or the Laplacian pyramid, but the resolution becomes ½ when the decomposition is performed once, and the resolution becomes ¼ when decomposition is performed twice. For this reason, it is not possible to deal with the shaping of the edge signal at the resolution of the original signal, and there is a problem that a high precision edge component in a pixel unit cannot be generated.

The present invention has been made in view of the above-mentioned circumstances, and it is an object to provide an image pickup system, an image processing method, and a computer program product with which it is possible to extract a high precision edge component with respect to a signal where a noise is mixed as well by combining a noise reduction processing with an edge extraction processing.

SUMMARY OF THE INVENTION

An image pickup system according to a first aspect of the present invention is an image pickup system for processing a signal from an image pickup device. The image pickup system includes: a noise processing section for performing a noise reduction processing on the signal from the image pickup device; an edge direction detection section for detecting an edge direction based on a result of the noise reduction processing; and an edge extraction section for extracting an edge component from the signal from the image pickup device on the basis of the edge direction.

The image pickup system according to the first aspect detects an edge direction using a result of the noise reduction processing, and extracts an edge component from the signal from the image pickup device on the basis of the detected edge direction.

With the image pickup system according to the first aspect, a noise influence can be suppressed and a high quality edge component storing a fine signal be obtained Further, an image processing method according to a second aspect of the present invention is an image processing method for processing a signal from an image pickup device. The image processing method includes: a noise processing step for performing a noise reduction processing on the signal from the image pickup device; an edge direction detection step for detecting an edge direction based on a result of the noise reduction processing; and an edge extraction step for extracting an edge component from the signal from the image pickup device on the basis of the edge direction.

With the image processing method according to the second aspect, an operation and effect similar to those of the image pickup system according to the first aspect can be obtained.

Furthermore, a computer program product according to a third aspect of the present invention is a computer program product for causing a computer to process a signal from an image pickup device. The computer program product includes: a noise processing module for performing a noise reduction processing on the signal from the image pickup device; an edge direction detection module for detecting an edge direction based on a result of the noise reduction processing; and an edge extraction module for extracting an edge component from the signal from the image pickup device on the basis of the edge direction.

With the computer program product according to the third aspect, an operation and effect similar to those of the image pickup system according to the first aspect can be obtained. In general, when referring herein to the computer program product, it is clearly understood by those of skill in the art that the program, per se, is typically stored and/or run from a tangible computer readable media.

BRIEF DESCRIPTION OF THE DRAWINGS

FIG. 10 is an explanatory diagram related to a processing region of the edge direction detection unit and an edge extraction filter in which the target pixel and the processing region thereof are illustrated.

FIG. 11 is an explanatory diagram related to the processing region of the edge direction detection unit and the edge extraction filter in which a pixel location subjected to an edge extraction is illustrated.

FIG. 12 is an explanatory diagram related to the processing region of the edge direction detection unit and the edge extraction filter in which the edge extraction filter at 0° is illustrated.

FIG. 13 is an explanatory diagram related to the processing region of the edge direction detection unit and the edge extraction filter in which the edge extraction filter at 45° is illustrated.

FIG. 14 is an explanatory diagram related to the processing region of the edge direction detection unit and the edge extraction filter in which the edge extraction filter at 90° is illustrated.

FIG. 15 is an explanatory diagram related to the processing region of the edge direction detection unit and the edge extraction filter in which the edge extraction filter at 135° is illustrated.

FIG. 16 is an explanatory diagram related to the processing region of the edge direction detection unit and the edge extraction filter in which the edge extraction filter at 180° is illustrated.

FIG. 17 is an explanatory diagram related to the processing region of the edge direction detection unit and the edge extraction filter in which the edge extraction filter at 225° is illustrated.

FIG. 18 is an explanatory diagram related to the processing region of the edge direction detection unit and the edge extraction filter in which the edge extraction filter at 270° is illustrated.

FIG. 19 is an explanatory diagram related to the processing region of the edge direction detection unit and the edge extraction filter in which the edge extraction filter at 315° is illustrated.

FIG. 20 is an explanatory diagram related to the processing region of the edge direction detection unit and the edge extraction filter in which an isotropic edge extraction filter is illustrated.

FIG. 21 is an explanatory diagram related to the processing region of the edge direction detection unit and the edge extraction filter for illustrating a horizontal edge extraction filter.

FIG. 22 is an explanatory diagram related to the processing region of the edge direction detection unit and the edge extraction filter for illustrating a vertical edge extraction filter.

FIG. 23 is an explanatory diagram related to an edge correction in an edge correction unit for illustrating an eight-direction edge shaping.

FIG. 24 is an explanatory diagram related to the edge correction in the edge correction unit for illustrating a four-direction edge shaping.

FIG. 29 is an explanatory diagram related to the target pixel and the target region in which the target pixel and a neighborhood region thereof are illustrated.

FIG. 30 is an explanatory diagram related to the target pixel and the target region in which the target pixel and extracted similar pixels are illustrated.

FIG. 34 is an explanatory diagram related to the edge extraction filter of the edge direction detection unit in which the horizontal edge extraction filter is illustrated.

FIG. 35 is an explanatory diagram related to the edge extraction filter of the edge direction detection unit in which the vertical edge extraction filter is illustrated.

FIG. 49 is an explanatory diagram related to a color filter in which a Bayer type primary color filter is illustrated.

FIG. 50 is an explanatory diagram related to a color filter in which a color difference line-sequential type complementary-color filter is illustrated.

FIG. 53 is an explanatory diagram related to a Y/C separation in which the Bayer type primary color filter is illustrated.

FIG. 54 is an explanatory diagram related to the Y/C separation in which the luminance signal is illustrated.

FIG. 55 is an explanatory diagram related to the Y/C separation in which a color difference signal of R (red) is illustrated.

FIG. 56 is an explanatory diagram related to the Y/C separation in which a color difference signal of B (blue) is illustrated.

FIG. 57 is an explanatory diagram related to the edge extraction filter at 0° of the edge direction extraction unit in a case where the target pixel is R or B.

FIG. 58 is an explanatory diagram related to the edge extraction filter at 0° of the edge direction extraction unit in a case where the target pixel is G.

FIG. 59 is an explanatory diagram related to the edge extraction filter at 45° of the edge direction extraction unit in a case where the target pixel is R or B.

FIG. 60 is an explanatory diagram related to the edge extraction filter at 45° of the edge direction extraction unit in a case where the target pixel is G.

FIG. 61 is an explanatory diagram related to the edge extraction filter at 90° of the edge direction extraction unit in a case where the target pixel is R or B.

FIG. 62 is an explanatory diagram related to the edge extraction filter at 90° of the edge direction extraction unit in a case where the target pixel is G.

FIG. 63 is an explanatory diagram related to the edge extraction filter at 135° of the edge direction extraction unit in a case where the target pixel is R or B.

FIG. 64 is an explanatory diagram related to the edge extraction filter at 135° of the edge direction extraction unit in a case where the target pixel is G.

FIG. 65 is an explanatory diagram related to the edge extraction filter at 180° of the edge direction extraction unit in a case where the target pixel is R or B.

FIG. 66 is an explanatory diagram related to the edge extraction filter at 180° of the edge direction extraction unit in a case where the target pixel is G.

FIG. 67 is an explanatory diagram related to the edge extraction filter at 225° of the edge direction extraction unit in a case where the target pixel is R or B.

FIG. 68 is an explanatory diagram related to the edge extraction filter at 225° of the edge direction extraction unit in a case where the target pixel is G.

FIG. 69 is an explanatory diagram related to the edge extraction filter at 270° of the edge direction extraction unit in a case where the target pixel is R or B.

FIG. 70 is an explanatory diagram related to the edge extraction filter at 270° of the edge direction extraction unit in a case where the target pixel is G.

FIG. 71 is an explanatory diagram related to the edge extraction filter at 315° of the edge direction extraction unit in a case where the target pixel is R or B.

FIG. 72 is an explanatory diagram related to the edge extraction filter at 315° of the edge direction extraction unit in a case where the target pixel is G.

DETAILED DESCRIPTION OF THE PREFERRED EMBODIMENT(S)

Figure 1:
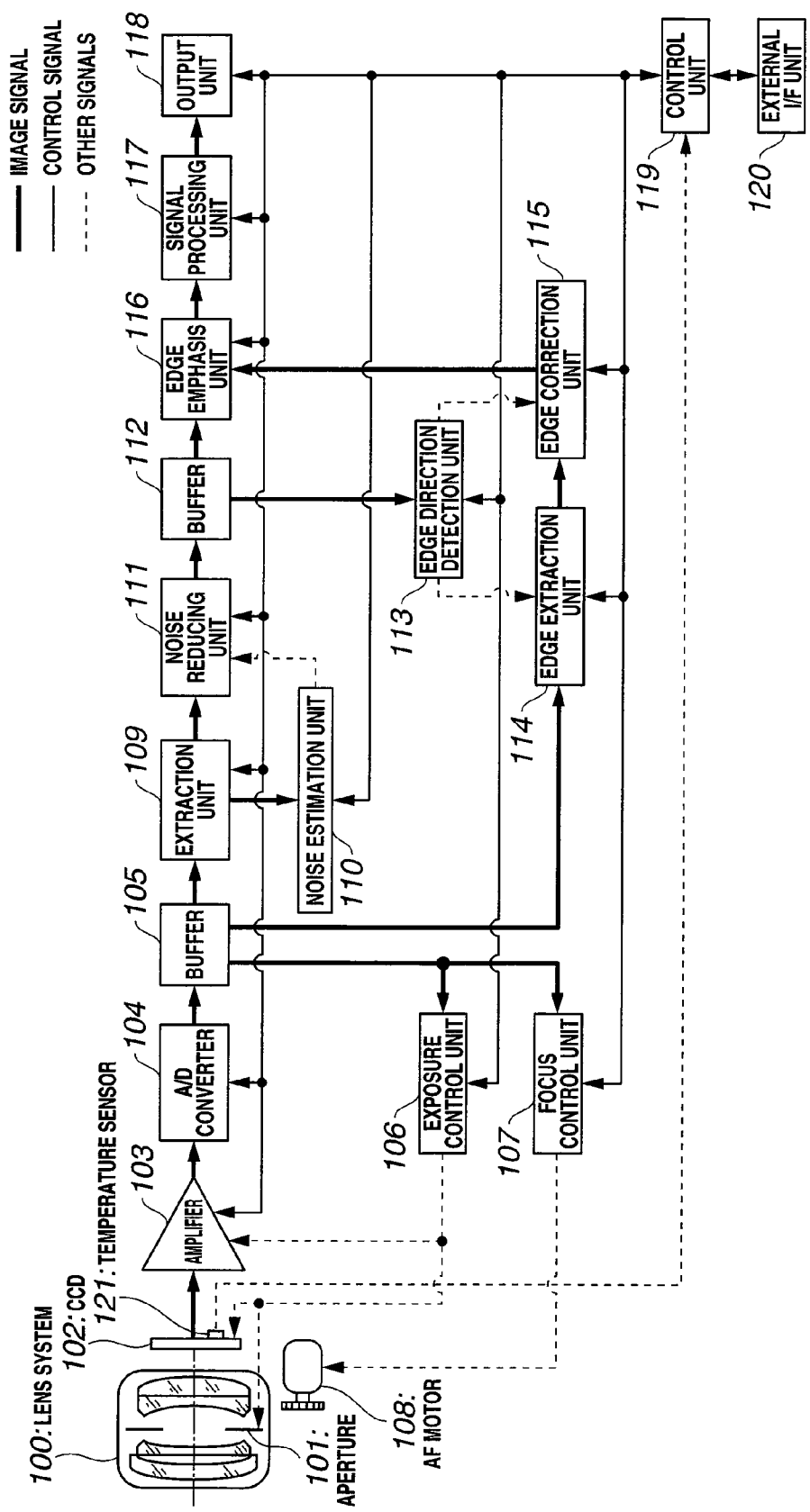
FIG. 1 is a block diagram of a configuration according to a first embodiment.
Figure 2:
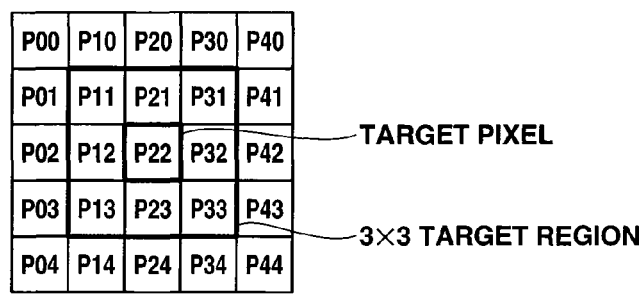
FIG. 2 is an explanatory diagram related to a target pixel and a target region.
Figure 3:
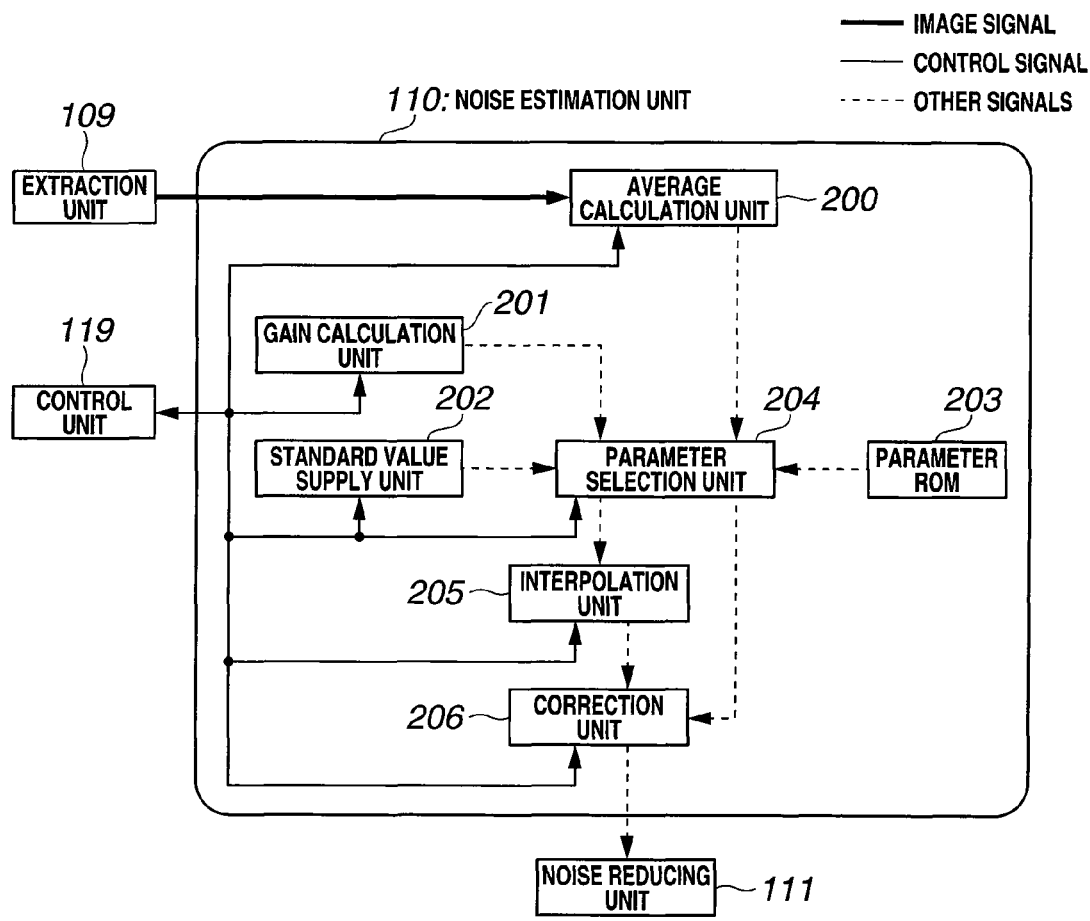
FIG. 3 is a block diagram of a configuration of a noise estimation unit.
Figure 4:
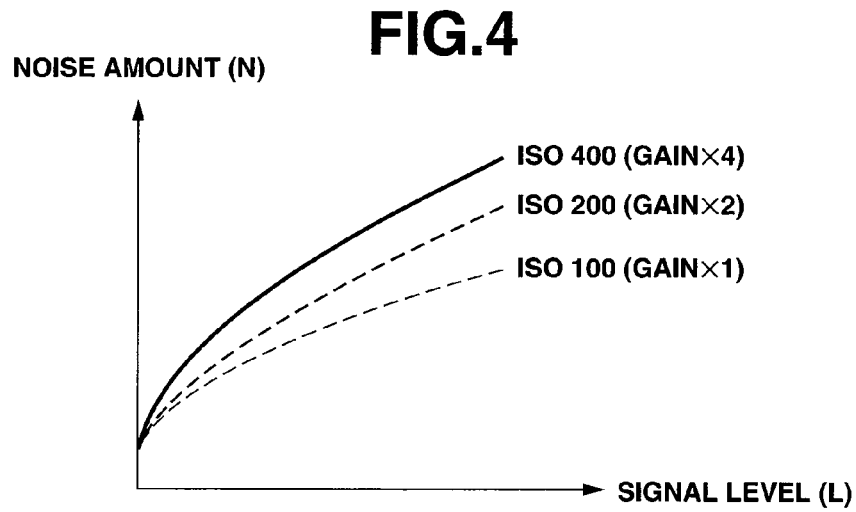
FIG. 4 is an explanatory diagram related to an estimation of a noise amount in which a relation of a luminance noise amount with respect to a signal level is illustrated.
Figure 5:
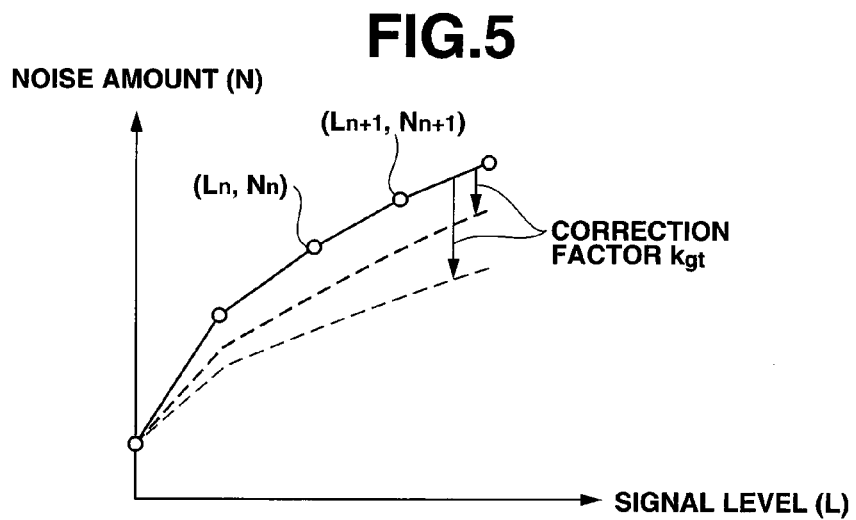
FIG. 5 is an explanatory diagram related to the estimation of the noise amount in which a simplification of a noise model is illustrated.
Figure 6:
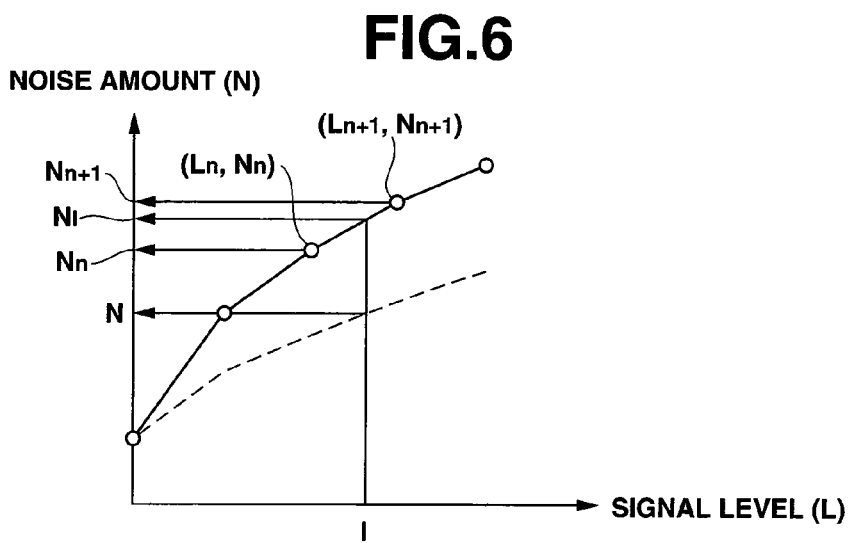
FIG. 6 is an explanatory diagram related to the estimation of the noise amount in which a calculation method for the luminance noise amount from the simplified noise model is illustrated.
Figure 7:
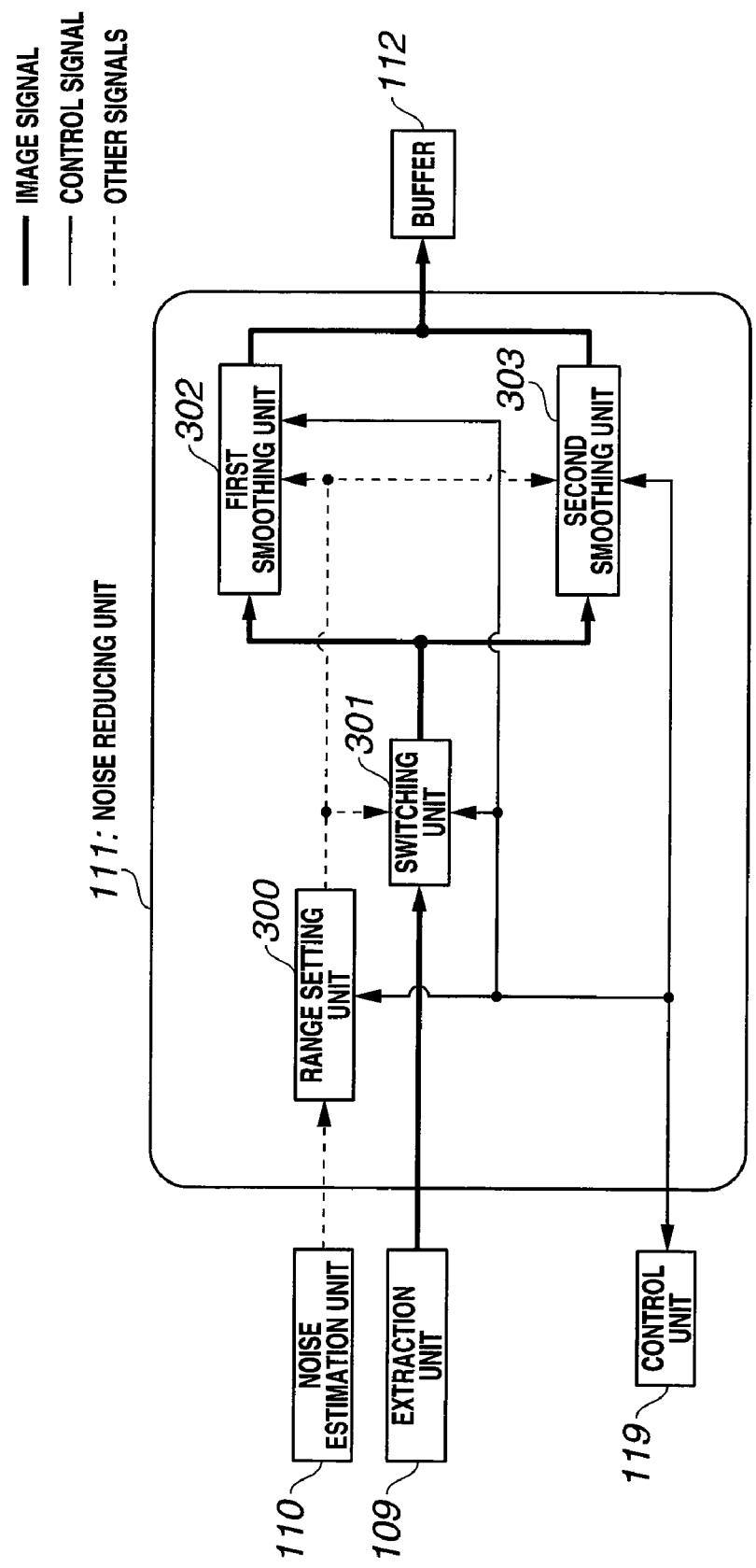
FIG. 7 is a block diagram of a configuration of a noise reducing unit.
Figure 8:
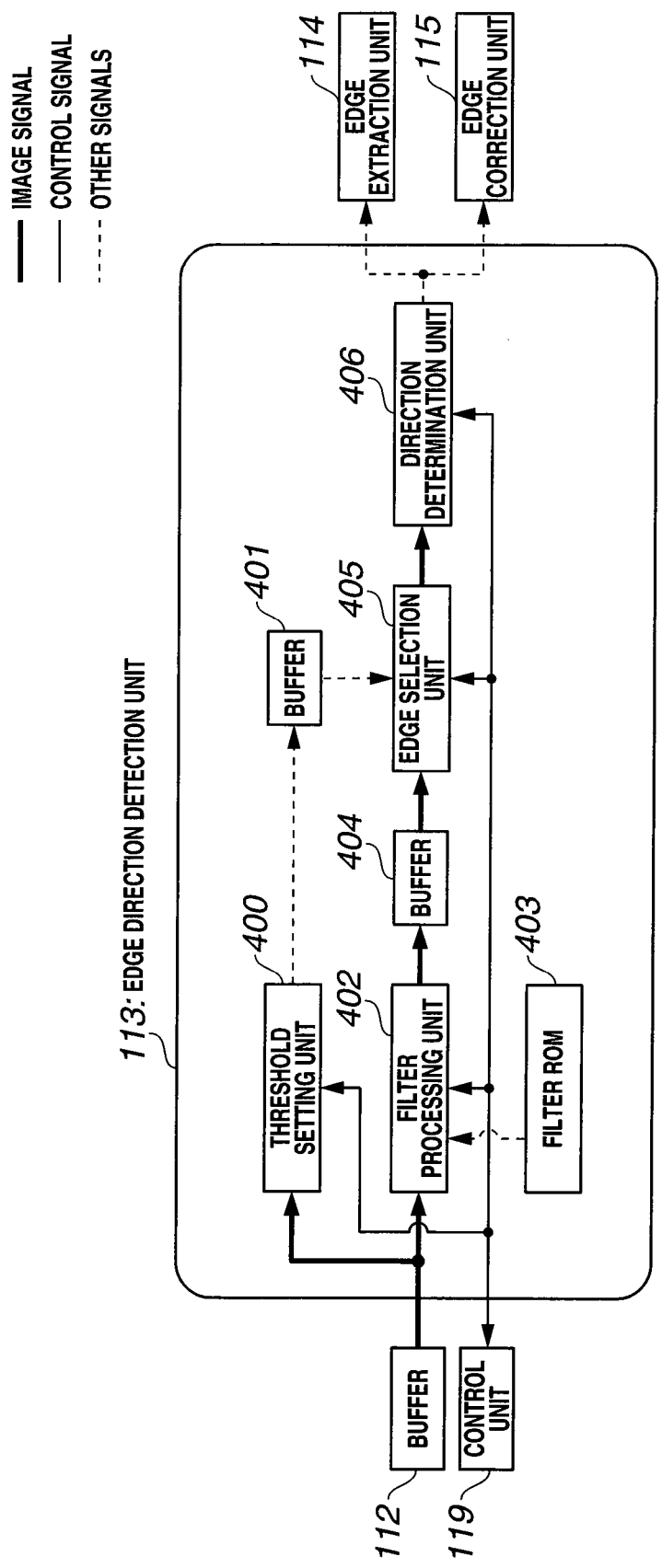
FIG. 8 is a block diagram of a configuration of an edge direction detection unit.
Figure 9:
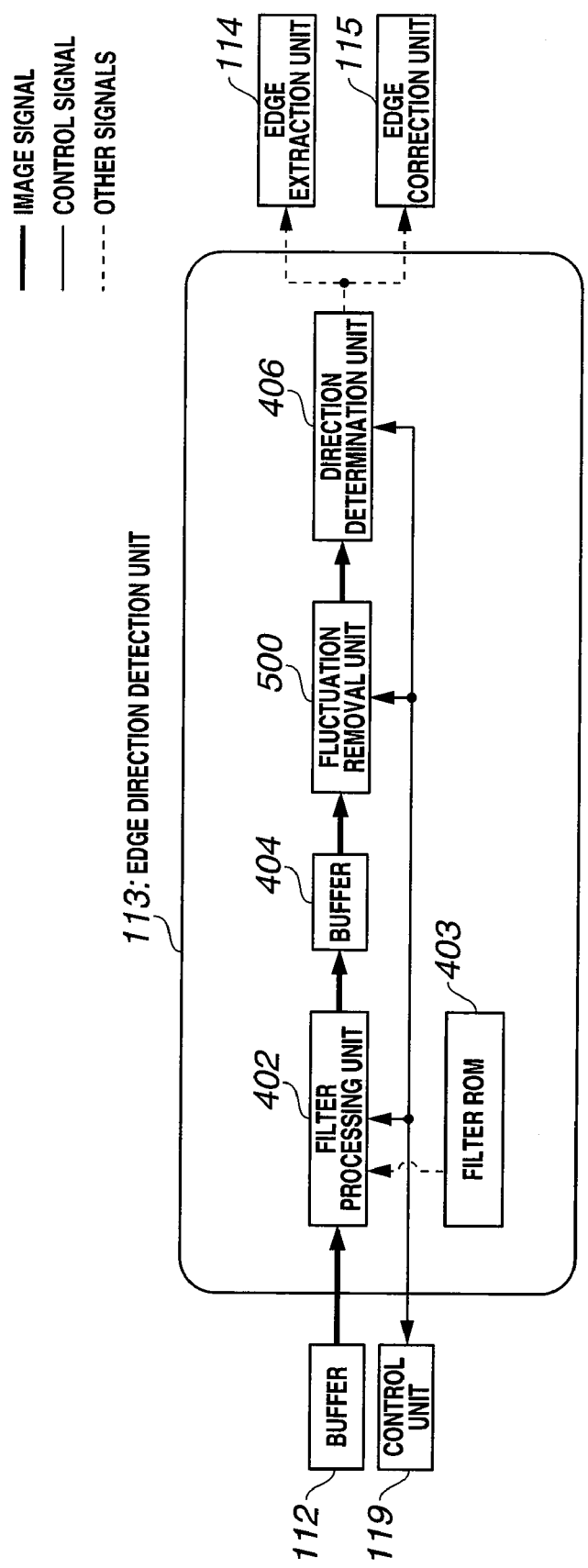
FIG. 9 is a block diagram of another mode configuration of the edge direction detection unit.
Figure 25:
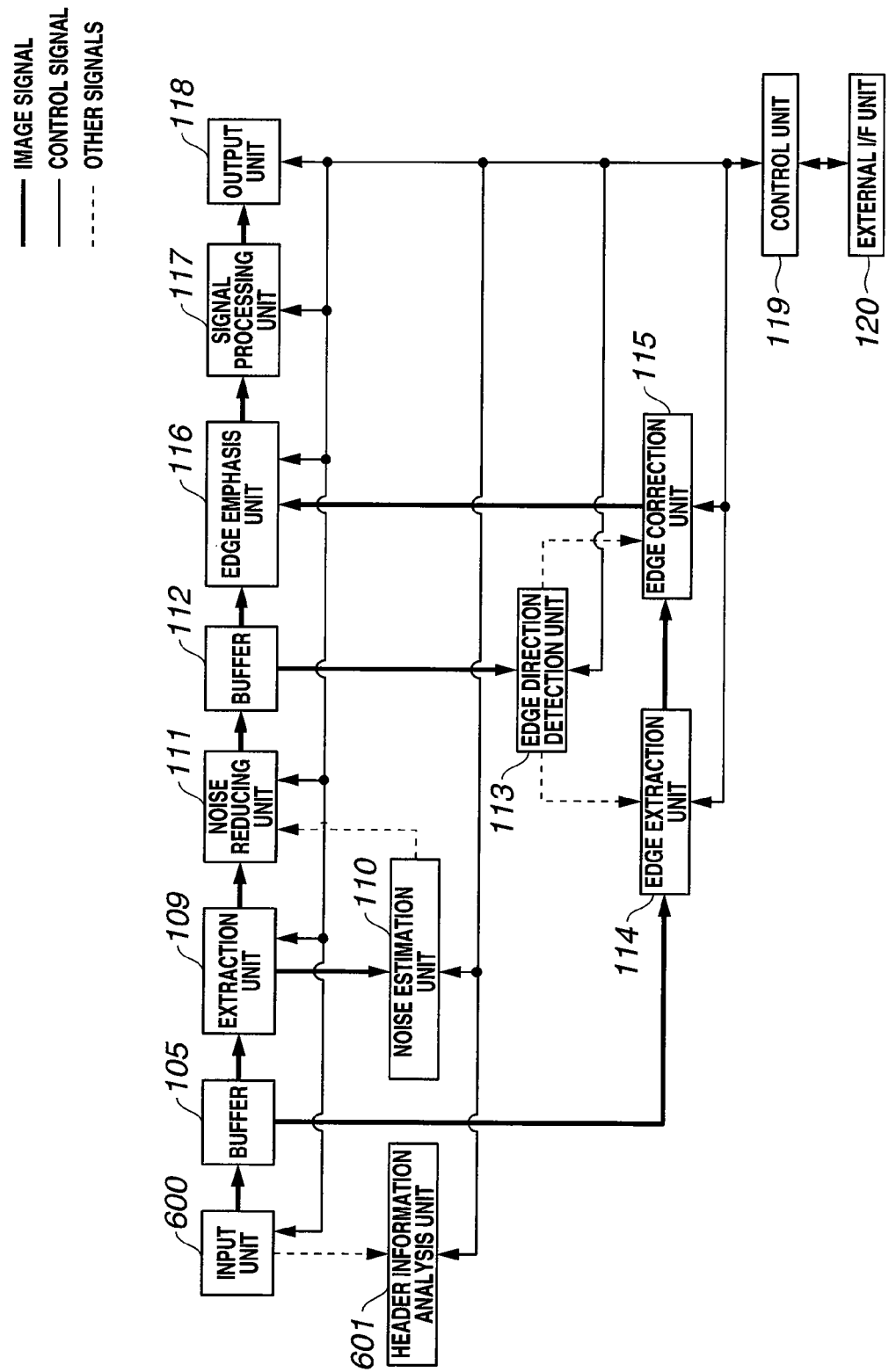
FIG. 25 is a block diagram of another mode configuration according to the first embodiment.
Figure 26:
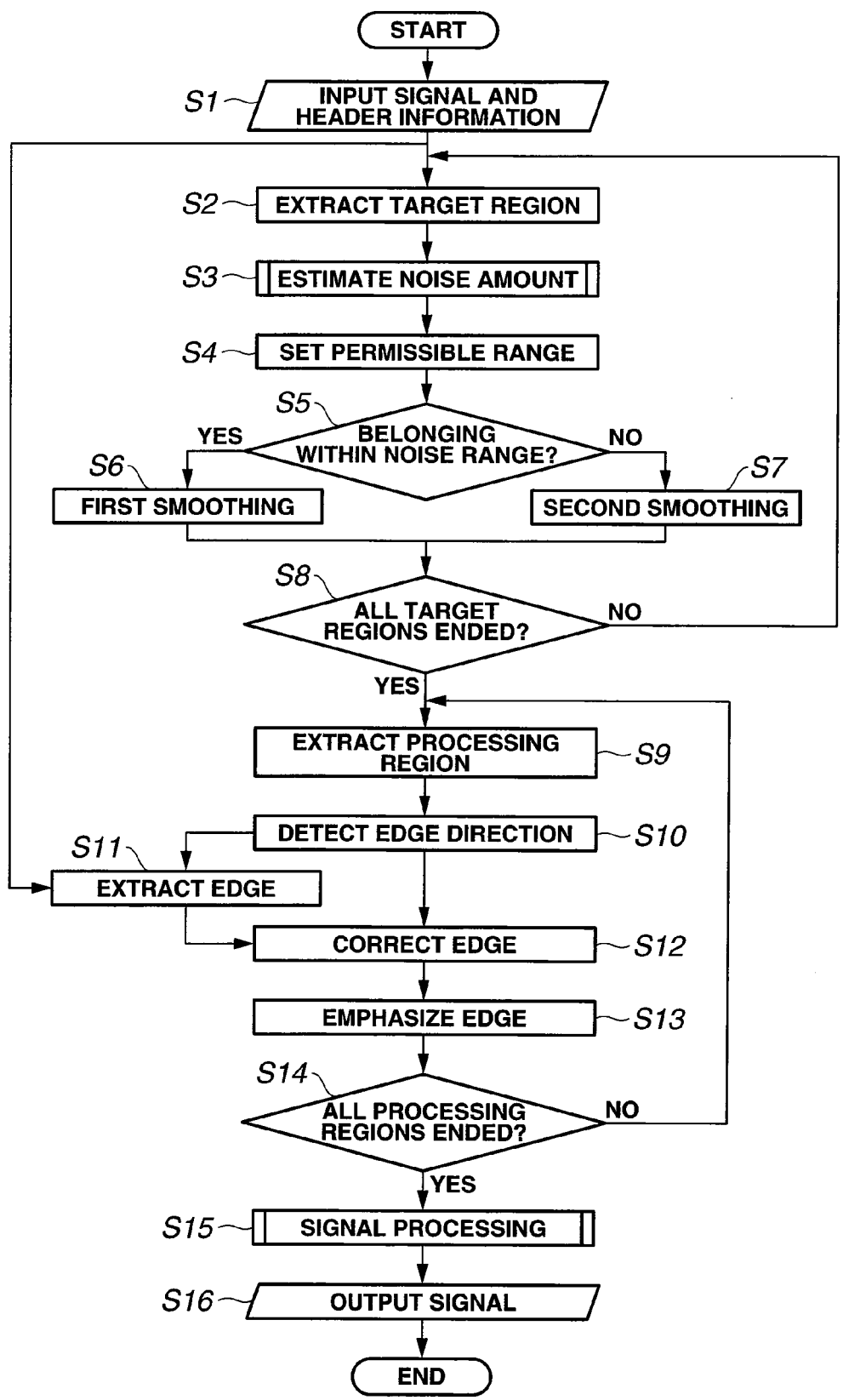
FIG. 26 is a flow chart of a procedure of a signal processing according to the first embodiment which illustrates a flow chart of an entire processing.
Figure 27:
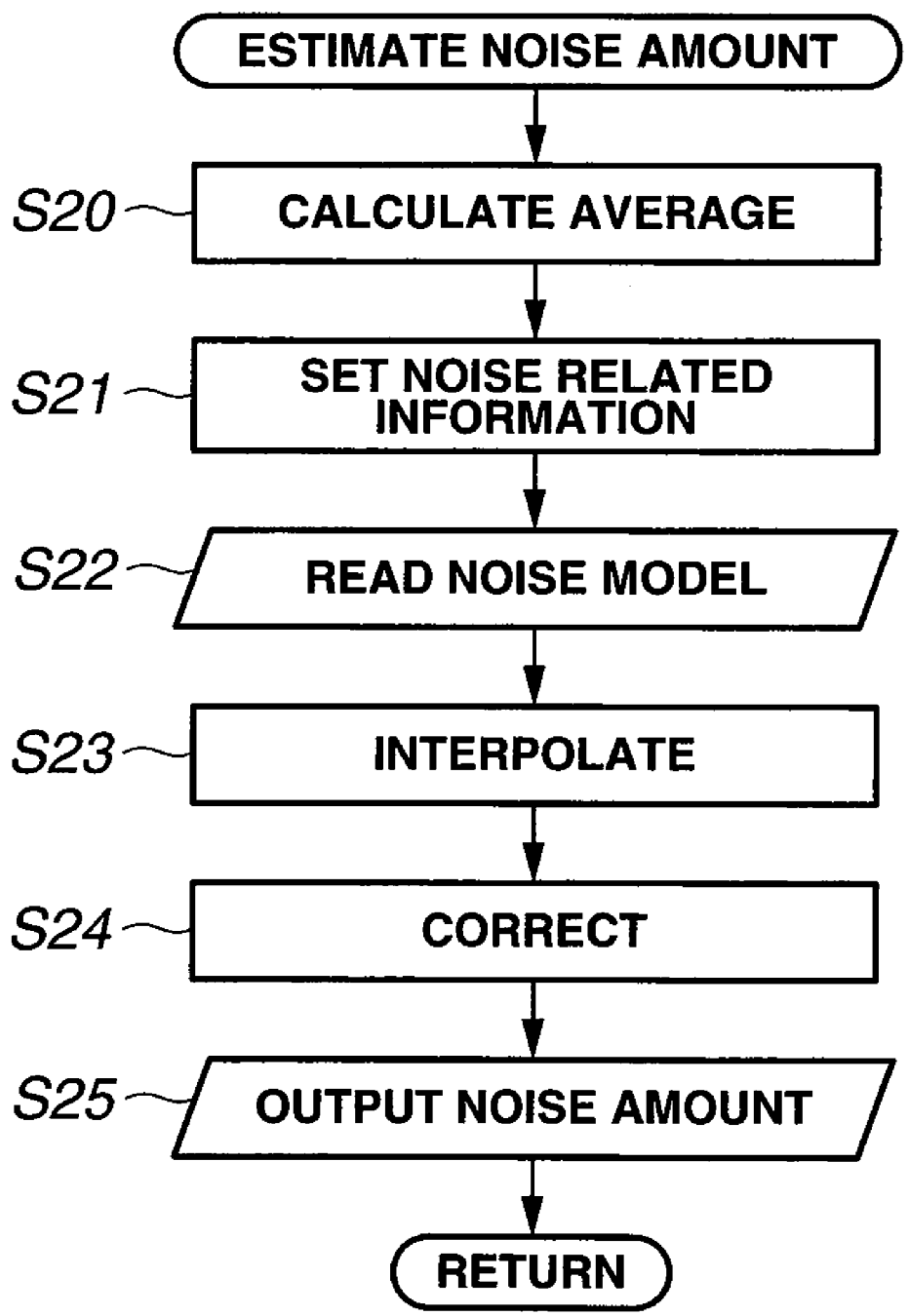
FIG. 27 is a flow chart of the procedure of the signal processing according to the first embodiment which illustrates a flow chart of a noise estimation processing.

Hereinafter, embodiments of the present invention will be described with reference to the drawings. FIGS. 1 to 27 illustrate a first embodiment of the present invention: FIG. 1 is a block diagram of a configuration according to the first embodiment, FIG. 2 is an explanatory diagram related to a target pixel and a target region, FIG. 3 is a block diagram of a configuration of a noise estimation unit, FIG. 4 is an explanatory diagram related to an estimation of a noise amount in which a relation of a luminance noise amount with respect to a signal level is illustrated, FIG. 5 is an explanatory diagram related to the estimation of the noise amount in which a simplification of a noise model is illustrated, FIG. 6 is an explanatory diagram related to the estimation of the noise amount in which a calculation method for the luminance noise amount from the simplified noise model is illustrated, FIG. 7 is a block diagram of a configuration of a noise reducing unit, FIG. 8 is a block diagram of a configuration of an edge direction detection unit, FIG. 9 is a block diagram of another mode configuration of the edge direction detection unit, FIGS. 10 to 22 are explanatory diagrams related to a processing region and an edge extraction filter of the edge direction detection unit in which FIG. 10 illustrates the target pixel and the processing region thereof, FIG. 11 illustrates a pixel location subjected to an edge extraction, FIG. 12 illustrates the edge extraction filter at 0°, FIG. 13 illustrates the edge extraction filter at 45°, FIG. 14 illustrates the edge extraction filter at 90°, FIG. 15 illustrates the edge extraction filter at 135°, FIG. 16 illustrates the edge extraction filter at 180°, FIG. 17 illustrates the edge extraction filter at 225°, FIG. 18 illustrates the edge extraction filter at 270°, FIG. 19 illustrates the edge extraction filter at 315°, FIG. 20 illustrates an isotropic edge extraction filter, and FIG. 21 is an explanatory diagram of a horizontal edge extraction filter, FIG. 22 is an explanatory diagram of a vertical edge extraction filter, FIG. 23 and FIG. 24 are explanatory diagrams related to an edge correction in an edge correction unit in which FIG. 23 is an explanatory diagram based on an eight-direction edge shaping and FIG. 24 is an explanatory diagram based on a four-direction edge shaping, FIG. 25 is a block diagram of another mode configuration according to the first embodiment, FIG. 26 and FIG. 27 are flow charts of a signal processing according to the first embodiment in which FIG. 26 is a flow chart of an entire processing and FIG. 27 is a flow chart of a noise estimation processing.

With reference to FIG. 1, the configuration according to the first embodiment will be described. FIG. 1 is a block diagram of an image pickup system configuration according to the first embodiment of the present invention. A lens system 100 is adapted to form a subject image. An aperture 101 is arranged in the lens system 100, and is adapted to regulate a passing range of light flux in the lens system 100. A CCD 102 is adapted to photoelectrically convert the subject image optically formed via the lens system 100 to output an electrical image signal. An amplifier 103 is adapted to amplify an output of the CCD 102 while following a predetermine amplification factor (also referred to as amplification amount or gain). An A/D converter 104 is adapted to convert the analog image signal outputted from the CCD 102 and amplified by the amplifier 103 into a digital signal. A buffer 105 is adapted to temporarily store the digital image signal outputted from the A/D converter 104. The signal from the A/D converter 104 is transferred via the buffer 105 to the extraction unit 109 and the edge extraction unit 114. The buffer 105 is also connected to an exposure control unit 106 and a focus control unit 107. The exposure control unit 106 is adapted to perform an exposure control related to the subject on the basis of the image signal stored in the buffer 105 and perform a control on the aperture 101, the CCD 102, and the amplifier 103 on the basis of the exposure control result. That is, the exposure control unit 106 is adapted to perform the exposure control by adjusting an aperture value of the aperture 101, an electronic shutter speed of the CCD 102, and the gain of the amplifier 103. The focus control unit 107 is adapted to detect a focal point on the basis of the image signal stored in the buffer 105 and drive an AF motor 108 which will be described later on the basis of the detection result. The AF motor 108 is controlled by the focus control unit 107 to drive a focus lens and the like included in the lens system 100 and is adapted to form the subject image on an image pickup surface of the CCD 102. The extraction unit 109 is for example an extraction section and is adapted to extract an image signal in a predetermined region from the image signal stored in the buffer 105 for output. The signal from the extraction unit 109 is connected to the noise estimation unit 110 and the noise reducing unit 111.

The noise estimation unit 110 is for example a noise estimation section and is adapted to estimate a noise amount from the image signal in the predetermined region extracted by the extraction unit 109. The estimated noise amount is transferred to the noise reducing unit 111. The noise reducing unit 111 is adapted to perform a noise reduction processing on the image signal in the predetermined region extracted by the extraction unit 109 on the basis of the noise amount estimated by the noise estimation unit 110. The image signal having been subjected to the noise reduction processing is transferred to a buffer 112. The buffer 112 is connected to the edge direction detection unit 113 and an edge emphasis unit 116. The edge direction detection unit 113 is for example an edge direction detection section and is adapted to detect an edge direction from the image signal having been subjected to the noise reduction processing stored in the buffer 112. The detected edge direction is transferred to the edge extraction unit 114 and an edge correction unit 115. The edge extraction unit 114 is for example an edge extraction section, and is adapted to extract an edge component from the image signal stored in the buffer 105 on the basis of information related to the edge direction detected by the edge direction detection unit 113. The extracted edge component is transferred to the edge correction unit 115. The edge correction unit 115 is for example an edge correction section and is adapted to correct the edge component extracted by the edge extraction unit 114 on the basis of information related to the edge direction detected by the edge direction detection unit 113. The corrected edge component is transferred to the edge emphasis unit 116. The edge emphasis unit 116 is for example an edge emphasis section and is adapted to use the edge component having been subjected to the correction processing in the edge correction unit 115 to perform an edge emphasis processing on the image signal having been subjected to the noise reduction processing stored in the buffer. The image signal having been subjected to the edge emphasis processing is transferred to a signal processing unit 117. The signal processing unit 117 is for example a signal processing section and is adapted to perform a desired signal processing such as a known compression processing, for example, on the image signal having been subjected to the edge emphasis processing in the edge emphasis unit 116. The image signal having been subjected to the signal processing is transferred to an output unit 118. The output unit 118 is for example an output section and is adapted to output the image signal from the signal processing unit 117 to be recorded in a memory card or the like, for example. An external I/F unit 120 functioning as for example an information obtaining section included in for example a control section is provided with a power supply switch, a shutter button, and an interface with respect to a mode switch and the like for setting various modes such as a moving picture/still image switching, a compression rate, an image size, and an ISO sensitivity. A control unit 119 which also functions as for example the control section, the parameter calculation section, and the information obtaining section is connected to the amplifier 103, the A/D converter 104, the exposure control unit 106, the focus control unit 107, the extraction unit 109, the noise estimation unit 110, the noise reducing unit 111, the edge direction detection unit 113, the edge extraction unit 114, the edge correction unit 115, the edge emphasis unit 116, the signal processing unit 117, the output unit 118, and the external I/F unit 120 bi-directionally, and is adapted to integrally control the image pickup system including these units, which, for example, comprises a microcomputer. Furthermore, a signal from a temperature sensor arranged in the vicinity of the CCD 102 is also connected to the control unit 119.

Next, in FIG. 1, a flow of the signal will be described. After image pickup conditions such as the ISO sensitivity are set via the external I/F unit 120, by half-pressing the shutter button not shown in the drawing, a pre shooting mode is established.

The signal picked up via the lens system 100, the aperture 101, and the CCD 102 is outputted as the analog signal.

It should be noted that according to the present embodiment, it is supposed that the CCD 102 is a monochrome single CCD and the signal to be outputted is a luminance signal Y. The analog signal is amplified by a predetermined amount by the amplifier 103 and converted into the digital signal by the A/D converter 104 to be transferred to the buffer 105.

It should be noted that according to the present embodiment, it is supposed that the A/D converter 104 converts into the digital signal in a 12-bit gradation.

The image signal in the buffer 105 is transferred to the exposure control unit 106 and the focus control unit 107. The exposure control unit 106 determines a luminance level of the signal, and controls the aperture value of the aperture 101, the electric shutter speed of the CCD 102, the gain of the amplifier 103 and the like in consideration of the ISO sensitivity and the shutter speed of limit of image stability, so that an appropriate exposure is obtained. Also, in the focus control unit 107, an edge strength in the signal is detected and the AF motor 108 is controlled so that the edge strength is maximized to thereby obtain a focused image.

Next, as full-press information from the shutter button via the external I/F unit 120 is inputted, a real shooting is conducted, and the image signal is transferred to the buffer 105 similarly to the pre shooting. The real shooting is conducted on the basis of the exposure conditions calculated by the exposure control unit 106 and the focus conditions calculated by the focus control unit 107, and these conditions for each shooting operation are transferred to the control unit 119. The image signal in the buffer 105 is transferred to the extraction unit 109. On the basis of the control of the control unit 119, the extraction unit 109 sequentially extracts target regions $P_{ij}$ (i=1 to 3, j=1 to 3) with a 3×3 pixel size including the target pixel $P_{22}$ illustrated in FIG. 2 to be transferred to the noise estimation unit 110 and the noise reducing unit 111.

It should be noted that FIG. 2 illustrates a region with a 5×5 pixel size, but this is because the region with the 5×5 pixel size will be necessary in an edge processing described later, and the 5×5 pixel size is illustrated for convenience of the description.

Also, in the following description, it is supposed that the target pixel is $P_{22}$, but the target pixel itself is extracted sequentially from all the signals, and its coordination positions are also sequentially moved.

On the basis of the control of the control unit 119, the noise estimation unit 110 estimates the noise amount $N_{22}$ of the target pixel $P_{22}$ based on the target region from the extraction unit 109, and the information at the time of the shooting, to be transferred to the noise reducing unit 111. On the basis of the control of the control unit 119, the noise reducing unit 111 performs the noise reduction processing regarding the target pixel $P_{22}$ from the extraction unit 109 on the basis of the noise amount $N_{22}$ from the noise estimation unit 110, and transfers the target pixel $P'_{22}$ having been subjected to the noise reduction processing and the noise amount $N_{22}$ to the buffer 112. The processing in the extraction unit 109, the noise estimation unit 110, and the noise reducing unit 111 are performed for each target region unit on the basis of the control of the control unit 119 in synchronization. The buffer 112 records all the signals having been subjected to the noise reduction processing and the noise amount thereof.

On the basis of the control of the control unit 119, the edge direction detection unit 113 sequentially extracts the target pixel $P'_{22}$ having been subjected to the noise reduction processing illustrated in FIG. 10 and a processing region $P'_{kl}$ (k=0 to 4, l=0 to 4) having the 5×5 pixel size including the target pixel from the buffer 112. Thereafter, edge directions ($D_{22}$ and $D_{11}$, $D_{21}$, $D_{31}$, $D_{12}$, $D_{32}$, $D_{13}$, $D_{23}$, $D_{33}$) of the target pixel $P'_{22}$ and surrounding 8 pixels ($P'_{11}$, $P'_{21}$, $P'_{31}$, $P'_{12}$, $P'_{32}$, $P'_{13}$, $P'_{23}$, $P'_{33}$) are detected to be transferred to the edge extraction unit 114 and the edge correction unit 115. On the basis of the control of the control unit 119, the edge extraction unit 114 sequentially extracts the original signal before being subjected to the noise reduction processing at the same location as the processing region used in the edge direction detection unit 113 from the buffer 105. Thereafter, on the basis of the edge direction from the edge direction detection unit 113, edge components ($E_{22}$ and $E_{11}$, $E_{21}$, $E_{31}$, $E_{12}$, $E_{32}$, $E_{13}$, $E_{23}$, $E_{33}$) of the target pixel $P'_{22}$ and the surrounding 8 pixels ($P'_{11}$, $P'_{21}$, $P'_{31}$, $P'_{12}$, $P'_{32}$, $P'_{13}$, $P'_{23}$, $P'_{33}$) are extracted to be transferred to the edge correction unit 115.

On the basis of the control of the control unit 119, regarding the edge component $E_{22}$ of the target pixel $P'_{22}$, the edge correction unit 115 calculates an corrected edge component $E'_{22}$ on the basis of the edge direction $D_{22}$ from the edge direction detection unit 113 and the edge components ($E_{22}$ and $E_{11}$, $E_{21}$, $E_{31}$, $E_{12}$, $E_{32}$, $E_{13}$, $E_{23}$, $E_{33}$) of the surrounding 8 pixels from the edge extraction unit 114 to be transferred to the edge emphasis unit 116. On the basis of the control of the control unit 119, the edge emphasis unit 116 sequentially extracts the target pixel $P'_{22}$ having been subjected to the noise reduction processing from the buffer 112. Thereafter, on the basis of the edge component $E'_{22}$ from the edge correction unit 115, as illustrated in Expression 1, after multiplication of a predetermined factor $g_1$ and then addition, a pixel value $P''_{22}$ having been subjected to the edge emphasis processing is calculated and transferred to the signal processing unit 117.

$$P''_{22} = P'_{22} + g_1 \cdot E'_{22} \quad \text{[Expression 1]}$$

On the basis of the control of the control unit 119, the processing in the edge direction detection unit 113, the edge extraction unit 114, the edge correction unit 115, and the edge emphasis unit 116 are performed for each processing region unit in synchronization. The signal processing unit 117 performs a known compression processing or the like on the signal having been subjected to the edge emphasis processing on the basis of the control of the control unit 119 and transfers the signal to the output unit 118. The output unit 118 records and saves the signal in the memory card or the like.

FIG. 3 illustrates a configuration example of the noise estimation unit 110. The noise estimation unit 110 is provided with an average calculation unit 200, a gain calculation unit 201, a standard value supply unit 202, a parameter ROM 203, a parameter selection unit 204, an interpolation unit 205, and a correction unit 206. The extraction unit 109 is connected to the average calculation unit 200. The average calculation unit 200 is connected to the parameter selection unit 204. The gain calculation unit 201, the standard value supply unit 202, and the parameter ROM 203 are connected to the parameter selection unit 204. The parameter selection unit 204 is connected to the interpolation unit 205 and the correction unit 206. The interpolation unit 205 is connected via the correction unit 206 to the noise reducing unit 111. The control unit 119 is connected to the average calculation unit 200, the gain calculation unit 201, the standard value supply unit 202, the parameter selection unit 204, the interpolation unit 205, and the correction unit 206 bi-directionally.

The average calculation unit 200 reads in the target regions ($P_{ij}$, i=1 to 3, j=1 to 3) illustrated in FIG. 2 from the extraction unit 109, and calculates the average values $AV_{22}$ as to the target region in a manner as illustrated in Expression 2. The average values $AV_{22}$ is be transferred to the parameter selection unit 204.

$$AV_{22} = \Sigma P_{ij}/9 \quad \text{[Expression 2]}$$

The gain calculating unit 201 calculates the gain at the amplifier 103 based on information such as the ISO sensitivity and exposure conditions transferred from the control unit 119, and transfers the gain information to the parameter selecting unit 204. Also, the control unit 119 obtains the temperature information of the CCD 102 from the temperature sensor 121 and transfers the temperature information to the parameter selection unit 204.

The parameter selection unit 204 estimates the luminance noise amount on the basis of the average value of the target region from the average calculation unit 200, the gain information from the gain calculation unit 201 and the temperature information from the control unit 119.

FIGS. 4 to 6 are explanatory diagrams related to the estimation of the luminance noise amount. FIG. 4 illustrates plotting of the noise amount N in the case where the luminance value is set at a signal level L, and the noise amount N increases in a quadratic curve manner with respect to the signal level L. When FIG. 4 is modelized by the quadratic function, Expression 3 is obtained.

$$N = \alpha L^2 + \beta L + \gamma \quad \text{[Expression 3]}$$

Herein, $\alpha$, $\beta$, and $\gamma$ are constant terms. However, the noise amount varies depending not only on the signal level but also on the temperature of the image pickup device and the gain.

FIG. 4 illustrates plotting of the noise amounts with respect to three types of the ISO sensitivities 100, 200, and 400 related to the gains under a certain temperature, as an example. The individual curves have forms illustrated in Expression 3, but the factors vary depending on the ISO sensitivities related to the gains. While the temperature is set as t and the gain is set as g, when the model is formulized with a consideration regarding the above, Expression 4 is established.

$$N = \alpha_{gt} L^2 + \beta_{gt} L + \gamma_{gt} \quad \text{[Expression 4]}$$

Herein, $\alpha_{gt}$, $\beta_{gt}$, and $\gamma_{gt}$ are constant terms. It should be noted that such a processing is troublesome that a plurality of functions of Expression 4 are recorded to calculate the noise amount each time through a calculation. For this reason, a simplification of the model as illustrated in FIG. 5 is carried out.

In FIG. 5, a model for providing the maximum noise amount is selected as a reference noise model, and this is approximated with a predetermined number of polygonal lines. An inflexion point of the polygonal line is represented by coordination data $(L_n, N_n)$ having the signal level L and the noise amount N as components. Herein, n denotes the number of inflexion points. Also, a correction factor $k_{gt}$ for deriving other noise models from the reference noise model is also prepared. The correction factor $k_{gt}$ is calculated by applying least squares method between the respective noise models and the reference noise model. The derivation of other noise models from the reference noise model is carried out through multiplication of the correction factor $k_{gt}$.

FIG. 6 illustrates a method of calculating the noise amount from the simplified noise model illustrated in FIG. 5. For example, it is supposed that the noise amount N corresponding to the given signal level 1, the gain g, and the temperature t is calculated. First, a search is performed as to which interval the signal level 1 belongs to in the reference noise model. Herein, the signal level 1 belongs to an interval between $(L_n, N_n)$ and $(L_{n+1}, N_{n+1})$. A reference noise amount $N_1$ in the reference noise model is calculated through a linear interpolation.

$$N_l = \frac{N_{n+1} - N_n}{L_{n+1} - L_n}(l - L_n) + N_n \quad \text{[Expression 5]}$$

Next, the reference noise amount $N_1$ is multiplied by the correction factor $k_{gt}$ to calculate the noise amount N.

$$N = k_{gt} \cdot N_1 \quad \text{[Expression 6]}$$

The parameter selection unit 204 sets the signal level 1 from the average value $AV_{22}$ of the target regions from the average calculation unit 200, sets the gain g from the gain information from the gain calculation unit 201, and sets the temperature t from the temperature information from the control unit 119. Next, the coordinate data $(L_n, N_n)$ and $(L_{n+1}, N_{n+1})$ of the section to which the signal level 1 belongs is searched from the parameter ROM 203, which is transferred to the interpolation unit 205 together with the signal level 1. Furthermore, the correction factor $k_{gt}$ is searched from the parameter ROM 203 and this is transferred to the correction unit 206.

On the basis of the control of the control unit 119, the interpolation unit 205 calculates the reference noise amount $N_1$ in the reference noise model from the signal level 1 from the parameter selection unit 204 and the coordinate data $(L_n, N_n)$ and $(L_{n+1}, N_{n+1})$ on the basis of Expression 5, and transfers the reference noise amount $N_1$ to the correction unit 206.

On the basis of the control of the control unit 119, the correction unit 206 calculates the noise amount N from the correction factor $k_{gt}$ from parameter selection unit 204 and the reference noise amount $N_1$ from the interpolation unit 205 on the basis of Expression 6 to be set as the noise amount $N_{22}$ of the target pixel $P_{22}$. The estimated noise amount $N_{22}$ and the average value $AV_{22}$ are transferred to the noise reducing unit 111.

During the procedure of the noise amount calculation, it should be noted that there is no need to obtain information such as the temperature t, the gain g, and the like for each shooting operation. It is also possible to adopt such a configuration that arbitrary information is recorded in the standard value supply unit 202 and the calculation procedure is omitted. With this configuration, the high speed processing, the power saving, and the like can be realized.

FIG. 7 illustrates a configuration example of the noise reducing unit 111. The noise reducing unit 111 is provided with a range setting unit 300, a switching unit 301, a first smoothing unit 302, and a second smoothing unit 303. The noise estimation unit 110 is connected to the range setting unit 300, and the range setting unit 300 is connected to the switching unit 301, the first smoothing unit 302, and the second smoothing unit 303. The extraction unit 109 is connected to the switching unit 301, and the switching unit 301 is connected to the first smoothing unit 302 and the second smoothing unit 303. The first smoothing unit 302 and the second smoothing unit 303 are connected to the buffer 112. The control unit 119 is connected to the range setting unit 300, the switching unit 301, the first smoothing unit 302, and the second smoothing unit 303 bi-directionally. The noise estimation unit 110 transfers the average value $AV_{22}$ in the target region and the noise amount $N_{22}$ to the range setting unit 300.

On the basis of the control of the control unit 119, the range setting unit 300 sets an upper limit Up and a lower limit Low as a permissible range related to the noise amount as shown in Expression 7.

$$Up = AV_{22} + N_{22}/2$$

$$Low = AV_{22} - N_{22}/2 \quad \text{[Expression 7]}$$

The permissible range Up and Low are transferred to the switching unit 301. Also, the range setting unit 300 transfers the average value $AV_{22}$ and the noise amount $N_{22}$ to the first smoothing unit 302 and the second smoothing unit 303.

The switching unit 301 reads the target pixel $P_{22}$ from the extraction unit 109 on the basis of the control of the control unit 119 and performs determination whether the target pixel belongs within the permissible range. The determination has three options: "belonging within the noise range", "being above the noise range", and "being below the noise range". The switching unit 301 transfers the target pixel $P_{22}$ to the first smoothing unit 302 in the case of "belonging within the noise range" or to the second smoothing unit 303 in other cases. The first smoothing unit 302 performs a processing of substituting the average value $AV_{22}$ from the range setting unit 300 into the target pixel $P_{22}$ from the switching unit 301.

$$P'_{22} = AV_{22} \quad \text{[Expression 8]}$$

The target pixel $P'_{22}$ having been subjected to the noise reduction processing in Expression 8 and the noise amount $N_{22}$ are transferred to the buffer 112.

The second smoothing unit 303 performs a processing of correcting the target pixel $P_{22}$ from the switching unit 301 by using the average value $AV_{22}$ and the noise amount $N_{22}$ from the range setting unit 300. First, in the case of "being above the noise range", the correction is performed as in Expression 9.

$$P'_{22}=AV_{22}-N_{22}/2 \quad \text{[Expression 9]}$$

Also, in the case of "being below the noise range", the correction is performed as in Expression 10.

$$P'_{22}=AV_{22}+N_{22}/2 \quad \text{[Expression 10]}$$

The target pixel $P'_{22}$ having been subjected to the noise reduction processing in Expression 9 or Expression 10 and the noise amount $N_{22}$ are transferred to the buffer 112.

FIG. 8 illustrates a configuration example of the edge direction detection unit 113. The edge direction detection unit 113 is provided with a threshold setting unit 400, a buffer 401, a filter processing unit 402, a filter ROM 403, a buffer 404, an edge selection unit 405, and a direction determination unit 406. The buffer 112 is connected to the threshold setting unit 400 and the filter processing unit 402. The threshold setting unit 400 is connected via the buffer 401 to the edge selection unit 405. The filter processing unit 402 is connected via the buffer 404, the edge selection unit 405, and the direction determination unit 406 to the edge extraction unit 114 and the edge correction unit 115. The filter ROM 403 is connected to the filter processing unit 402. The control unit 119 is connected to the threshold setting unit 400, the filter processing unit 402, the edge selection unit 405, and the direction determination unit 406 bi-directionally.

On the basis of the control of the control unit 119, the threshold setting unit 400 reads the noise amount $N_{22}$ corresponding to the target pixel $P'_{22}$ having been subjected to the noise reduction processing from the buffer 112, and through a multiplication of a predetermined factor $g_2$, for example, $g_2=2$, a threshold $T_{22}$ with respect to the edge component is calculated as in Expression 11.

$$T_{22}=g_2 \cdot N_{22} \quad \text{[Expression 11]}$$

It should be noted that according to the present embodiment, a processing region $P'_{kl}$ (k=0 to 4, l=0 to 4) with the 5×5 pixel size illustrated in FIG. 10 is supposed, and thresholds ($T_{22}$ and $T_{11}$, $T_{21}$, $T_{31}$, $T_{12}$, $T_{32}$, $T_{13}$, $T_{23}$, $T_{33}$) are calculated for 9 pixels of the target pixel $P'_{22}$ and the surrounding 8 pixels ($P'_{11}$, $P'_{21}$, $P'_{31}$, $P'_{12}$, $P'_{32}$, $P'_{13}$, $P'_{23}$, $P'_{33}$) illustrated in FIG. 11. The calculated thresholds are transferred to the buffer 401.

On the basis of the control of the control unit 119, the filter processing unit 402 reads the processing region $P'_{kl}$ with the 5×5 pixel size illustrated in FIG. 10 from the buffer 112, and performs a filter processing with a 3×3 size with respect to the 9 pixels of the target pixel $P'_{22}$ and the surrounding 8 pixels. FIGS. 12 to 19 illustrate a filter factor in 8 directions (0°, 45°, 90°, 135°, 180°, 225°, 270°, 315°) used in the filter processing. The filter factor is recorded in the filter ROM 403, and when necessary, transferred to the filter processing unit 402. The filter processing unit 402 performs the filter processing in the 8 directions on the 9 pixels illustrated in FIG. 11 and puts the same into an absolute value, so that total 72 edge components are calculated and transferred to the buffer 404.

On the basis of the control of the control unit 119, the edge selection unit 405 reads the thresholds with respect to the 9 pixels from the buffer 401 and reads the edge components in the 8 directions with respect to the 9 pixels from the buffer 404. Thereafter, the edge selection unit 405 compares the thresholds with the edge components in the 8 directions for each pixel unit, and omits the edge components equal to or lower than the threshold and transfers the edge components larger than the threshold to the direction determination unit 406.

On the basis of the control of the control unit 119, the direction determination unit 406 processes the edge components transferred from the edge selection unit 405 for the pixel unit of the 9 pixels. This means that the edge components to be transferred are sorted to detect the maximum value and the second maximum value except for the opposing direction shifted by 180° providing the maximum value the opposite angle are detected, and in a case where the difference between the values is larger than a predetermined threshold, the direction providing the maximum value is set as the edge direction ($D_{22}$ and $D_{11}$, $D_{21}$, $D_{31}$, $D_{12}$, $D_{32}$, $D_{13}$, $D_{23}$, $D_{33}$) and on the other hand, when the difference between the maximum value and the second maximum value is equal to or smaller than the predetermined threshold, it is determined that there are a plurality of effective edge directions to set an isotropic edge direction. Also, in a case where there being no edge component in the 8 directions transferred from the edge selection unit 405, there being no edge direction is determined as a flat region. In the case where "the direction providing the maximum value" is obtained, this direction is transferred to the edge extraction unit 114 and the edge correction unit 115. Also, in the case of "the isotropic edge direction" and "no edge direction", the information is transferred to the control unit 119.

The control unit 119 controls the edge extraction unit 114, and in the case where "the direction providing the maximum value" is obtained, the edge component extraction is performed through the filter factor corresponding to the direction illustrated in FIGS. 12 to 19. On the other hand, in the case of "the isotropic edge direction", the edge component extraction is performed through the isotropic filter factor illustrated in FIG. 20. Furthermore, in the case of "no edge direction", the processing of the edge extraction unit 114 is terminated and the processing is shifted to the next target pixel.

It should be noted that according to the above-mentioned embodiment, the filter processing in the 8 directions and the threshold based on the noise amount are used for determining the edge direction, but it is not necessary to limit to such a configuration. For example, as illustrated in FIG. 9, a further simplified configuration based on the filter processing in the two horizontal and vertical directions and a threshold in a fixed manner can also be adopted.

FIG. 9 illustrates a configuration in which the threshold setting unit 400 and the buffer 401 in FIG. 8 are deleted and the edge selection unit 405 is substituted by a fluctuation removal unit 500, the basic configuration is similar to the edge direction detection unit 113 illustrated in FIG. 8, the same configuration is allocated with the same name and reference numeral to omit the description and only a different point will mainly be described.

The buffer 404 is connected to the fluctuation removal unit 500, and the fluctuation removal unit 500 is connected to the direction determination unit 406. The control unit 119 is connected to the fluctuation removal unit 500 bi-directionally.

The filter processing unit 402 performs the filter processing in the two horizontal and vertical directions on the 9 pixels illustrated in FIG. 11 and puts the same into an absolute value, so that total 18 edge components are calculated and transferred to the buffer 404. FIGS. 21 and 22 illustrate the filter factor in the two horizontal and vertical directions. The filter factor is recorded in the filter ROM 403, and, when necessary, transferred to the filter processing unit 402.

On the basis of the control of the control unit 119, the fluctuation removal unit 500 reads the edge components in the two directions with respect to the 9 pixels from the buffer 404. Thereafter, a predetermined lower bit, for example, lower 4 bits according to the present embodiment are deleted as it is supposed that the A/D converter 104 has 12-bit gray scale, so that the minute fluctuation components are removed. The edge components in the two directions from which the fluctuation components are removed are transferred to the direction determination unit 406.

On the basis of the control of the control unit 119, the direction determination unit 406 processes the edge components to be transferred the edge selection unit 405 for the pixel unit of the 9 pixels to calculate the edge direction. Expression 12 illustrates the calculation of the edge direction in the target pixel $P'_{22}$.

$$D_{22} = \tan^{-1}(E90_{22}/E0_{22}) \quad \text{[Expression 12]}$$

In Expression 12, E0 means the edge component in the horizontal direction and E90 means the edge component in the vertical direction. The calculation in Expression 12 is performed on the 9 pixels illustrated in FIG. 11 for each pixel unit.

It should be noted that as the result of the removal of the fluctuation components, in a case where there are no edge component in both the two horizontal and vertical directions, while "no edge direction" is set, the information is transferred to the control unit 119. In the processing in the two directions, "the isotropic edge direction" is not detected.

FIGS. 23 and 24 illustrate surrounding pixels used for correcting the edge components in the edge correction unit 115. In an example of FIG. 23, one pixel in the surrounding 8 directions is selected on the basis of the edge direction $D_{22}$ of the target pixel $P'_{22}$, and in a case where an edge component thereof is set as $E_d$, the calculation is performed on the basis of Expression 13.

$$E'_{22} = (E_{22} + E_d)/2 \quad \text{[Expression 13]}$$

Also, in an example of FIG. 24, one pixel in the surrounding 8 directions is selected on the basis of the edge direction $D_{22}$ of the target pixel $P'_{22}$, and in a case where an edge component thereof is set as $E_d$ and an edge component in the opposite direction is set as $E_{d0}$, the calculation is performed on the basis of Expression 14.

$$E'_{22} = (2E_{22} + E_d + E_{d0})/4 \quad \text{[Expression 14]}$$

With the above-mentioned configuration, the rough direction of the edge is detected from the signal having been subjected to the noise reduction processing, and the edge component is extracted from the original signal on the basis of the direction, so that it is possible to obtain the high quality edge component in which the influence of the noise is suppressed and the fine signal is saved.

In addition, the edge component is corrected on the basis of the detected edge direction, so that it is possible to generate the high quality edge component. In this case, as the edge direction which is used at the time of extracting the edge component is utilized again, it is possible to reduce the scale of the system, so that the lower cost can be realized.

Furthermore, the noise reduction processing is performed through the noise estimation and the noise reduction, and the estimation accuracy is increased by performing the estimation from a wide region in the noise estimation and only the target pixel is set as the target in the noise reduction, so that the accuracy of the noise reduction processing can be improved and it is possible to obtain the high quality signal.

In the noise estimation, various pieces of information related to the noise amount are dynamically calculated, and the standard value is set for the information which cannot be calculated, so that it is possible to obtain the noise reduction effect with the high accuracy as well as the stability.

Furthermore, in the detection for the edge direction, after the edge strengths in the plural directions or horizontal and vertical directions are calculated, the comparison with the threshold on the basis of the noise amount or the removal of the minute edge strength is performed, and it is thus possible to obtain the edge direction in which the influence of the noise is suppressed and the accuracy is high.

Also, as the edge extraction processing in the later stage is stopped in the case where the edge direction cannot be determined, the wasteful processing can be omitted and it is possible to increase the processing speed.

Furthermore, as the isotropic edge extraction processing is performed in the case where the plural edge directions are detected, it is possible to obtain the stable processing result.

It should be noted that according to the above-mentioned embodiment, the configuration of being integrated to the image pickup unit including the lens system 100, the aperture 101, the CCD 102, the amplifier 103, the A/D converter 104, the exposure control unit 106, the focus control unit 107, the AF motor 108, and the temperature sensor 121 is adopted, but it is not necessary to adopt the above-mentioned configuration.

For example, as illustrated in FIG. 25, an image signal picked up by a separate image pickup unit can be processed in an unprocessed Raw data mode, and furthermore, can also be processed from the recording medium such as the memory card in which additional information like the image pickup condition is recorded in a header part.

FIG. 25 illustrates a configuration in which the lens system 100, the aperture 101, the CCD 102, the amplifier 103, the A/D converter 104, the exposure control unit 106, the focus control unit 107, the AF motor 108, and the temperature sensor 121 are omitted from the configuration illustrated in FIG. 1, and an input unit 600 and a header information analysis unit 601 are added. The basic configuration is similar to FIG. 1 and the same configuration is allocated with the same name and reference numeral to omit the description. Hereinafter, only a different point will be described.

The input unit 600 is connected to the buffer 105 and the header information analysis unit 601. The control unit 119 is connected to the input unit 600, the header information analysis unit 601 bi-directionally. As the reproduction operation is started via the external I/F unit 120 such as the mouse and the key board, the signal and the header information saved in the recording medium such as the memory card are read through the input unit 600. The signal from the input unit 600 is transferred to the buffer 105 and the header information is transferred to the header information analysis unit 601. The header information analysis unit 601 extracts the information at the time of the shooting from the header information to be transferred to the control unit 119. The subsequent processing is similar to that in FIG. 1.

Furthermore, according to the above-mentioned embodiment, the processing by way of the hardware is supposed, it is not necessary to limit to such a configuration. For example, it is also possible to adopt such a configuration that the signal from the CCD 102 remains unprocessed and is set as the Raw data, and the temperature at the time of the shooting, the gain, and the like from the control unit 119 are output as the header information to be processed by way of separate software.

FIGS. 26 and 27 illustrate flow charts related to the software processing of the signal processing.

When the processing is started, first, the signal and the header information such as the temperature and the gain are read (step S1).

Next, the target pixel and the target region with the 3×3 pixel size illustrated in FIG. 2 are extracted (step S2).

Then, as will be separately described, the noise amount of the extracted target region is estimated, and the amount is calculated as the noise amount with respect to the target pixel (step S3).

Subsequently, the permissible range illustrated in Expression 7 is set in the target pixel (step S4).

Next, it is determined whether the target pixel belongs to the permissible range or not, and in a case where the target pixel belongs to the permissible range, the flow is branched to the next step S6, and in a case where the target pixel does not belong to the permissible range, the flow is branched to step S7 (step S5).

In step S5, when it is determined that the target pixel belongs to the permissible range, the processing illustrated in Expression 8 is performed (step S6).

On the other hand, in step S5, when it is determined that the target pixel does not belong to the permissible range, the processing illustrated in Expression 9 or Expression 10 is performed (step S7).

When the processing in step S6 or step S7 is ended, it is subsequently determined whether the extraction of all the target regions is completed, and in a case the extraction is not completed, the flow is branched to step 2 and in a case the extraction is completed, the flow is branched to step 9 (step S8).

In step S8, when it is determined that the extraction of all the target regions is completed, next, the target pixel and the target region with the 5×5 pixel size illustrated in FIG. 10 are extracted (step S9).

Subsequently, regarding the 9 pixels illustrated in FIG. 11, by using the directional extraction filter illustrated in FIGS. 12 to 19, the edge direction is detected (step S10).

Furthermore, on the basis of the edge direction from step S10, the edge component is extracted from the original signal before being subjected to the noise reduction processing (step S11).

Next, on the basis of the edge direction detected in step S10, with the edge component in the neighborhood pixel illustrated in FIG. 23 or 24, the edge component is corrected through the correction processing illustrated in Expression 13 or Expression 14 (step S12).

Furthermore, the edge emphasis processing illustrated in Expression 1 is performed on the signal of the target pixel having been subjected to the noise reduction processing (step S13).

Then, it is determined whether the extraction of all the processing regions is completed, and in a case the extraction is not completed, the flow is branched to step 9 and in a case the extraction is completed, the flow is branched to step 15 (step S14).

In step S14, when it is determined that the extraction of all the processing regions is completed, a known compression processing or the like is performed subsequently (step S15).

Thereafter, the signal after the processing is outputted and the processing is ended (step S16).

FIG. 27 is a flow chart related to the noise amount estimation in step S3.

First, the average value of the target region illustrated in Expression 2 is calculated (step S20).

Next, from the read header information, information such as the temperature and the gain is set (step S21). At this time, if a necessary parameter does not exist in the header information, a predetermined standard value is assigned.

Furthermore, the coordination data of the reference noise model and the correction factor are read (step S22).

Subsequently, the reference noise amount is calculated through the interpolation processing illustrated in Expression 5 (step S23).

Next, the noise amount is calculated through the correction processing illustrated in Expression 6 (step S24).

Finally, the calculated noise amount is outputted and the flow is ended (step S25).

In this manner, the above-mentioned processing in which the execution by way of the hardware is supposed can be, similarly to the first embodiment, executed by way of software in a processing apparatus such as a computer.

Figure 28:
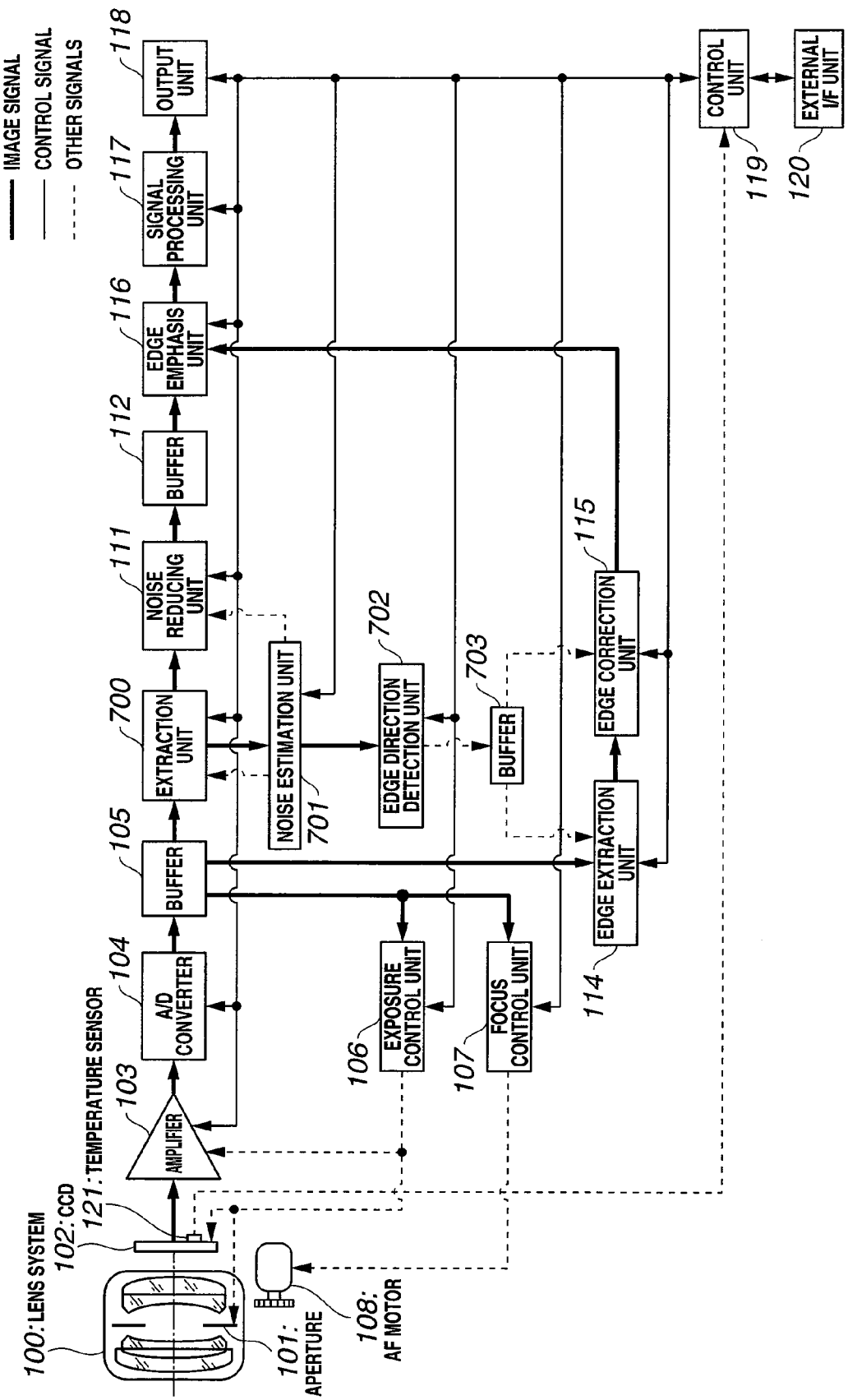
FIG. 28 is a block diagram of a configuration according to a second embodiment.
Figure 31:
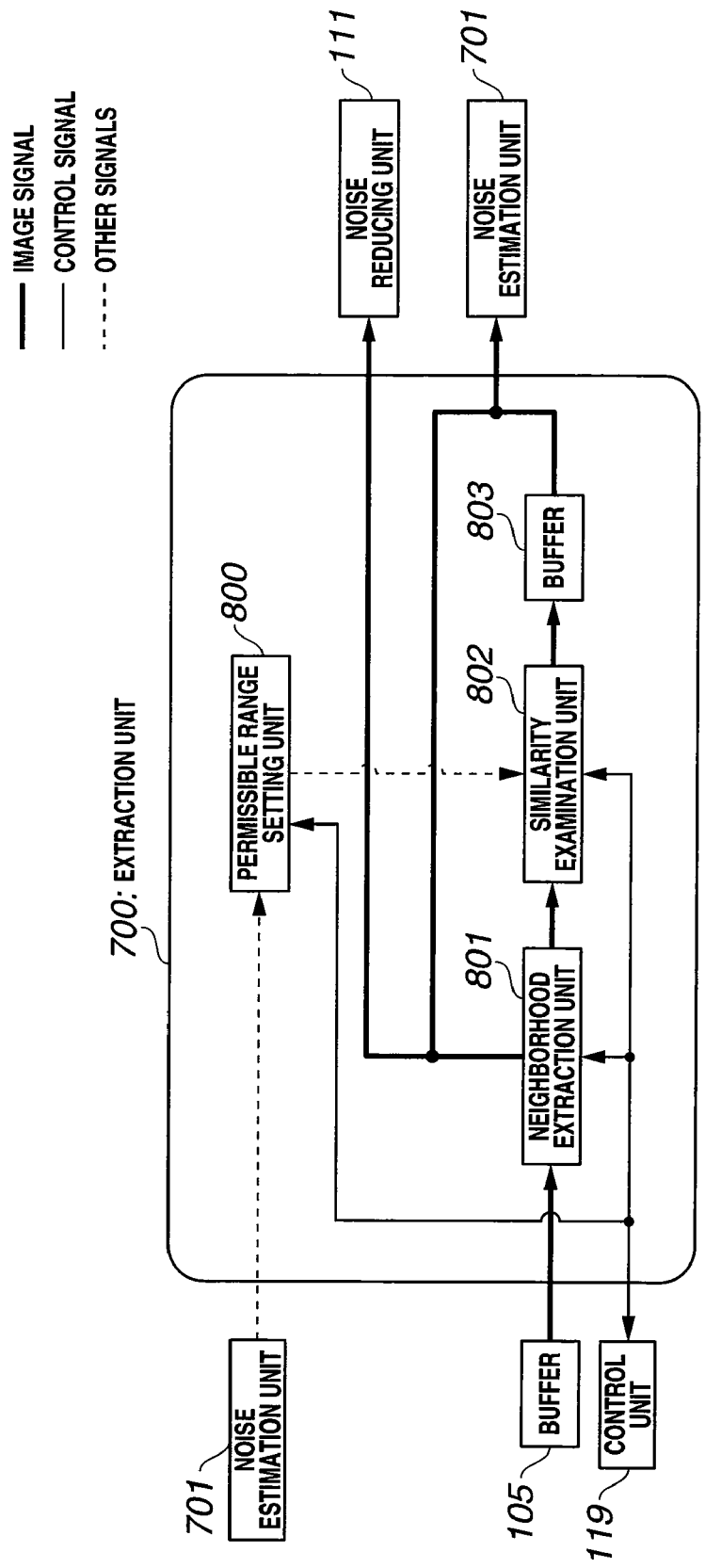
FIG. 31 is a block diagram of a configuration of an extraction unit.
Figure 32:
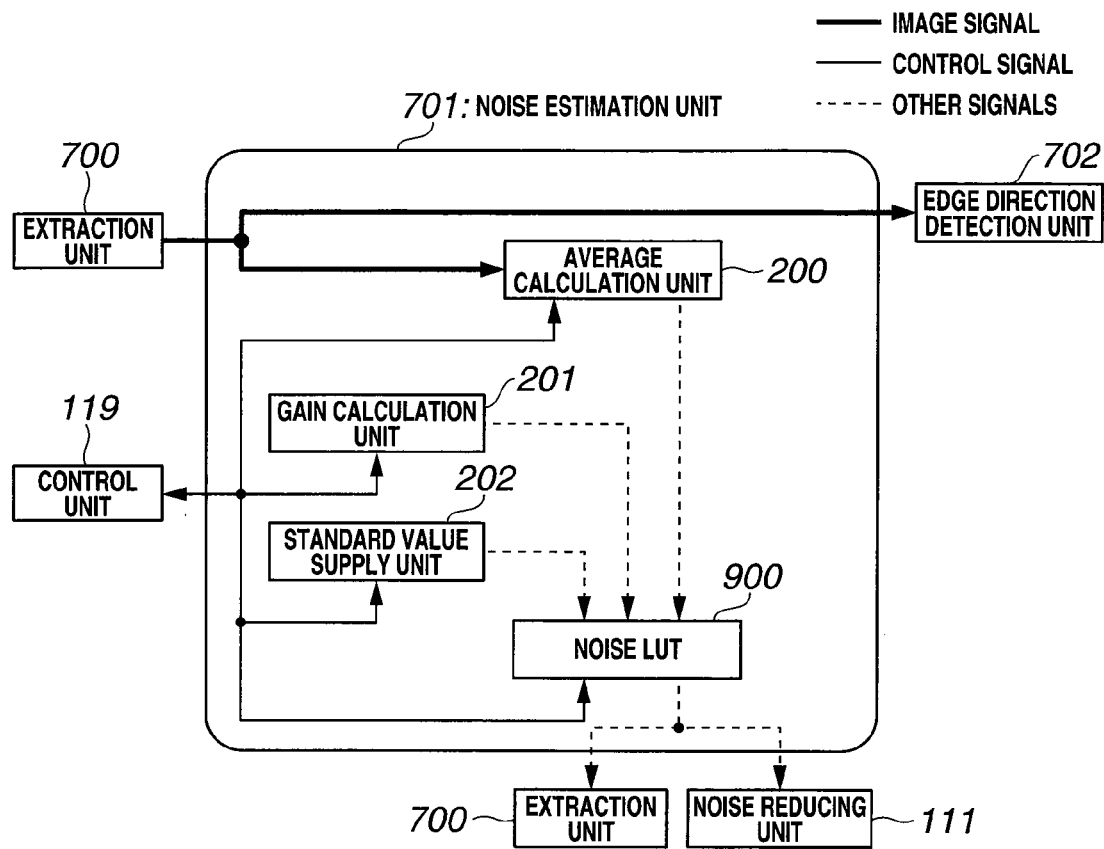
FIG. 32 is a block diagram of a configuration of the noise estimation unit.
Figure 33:
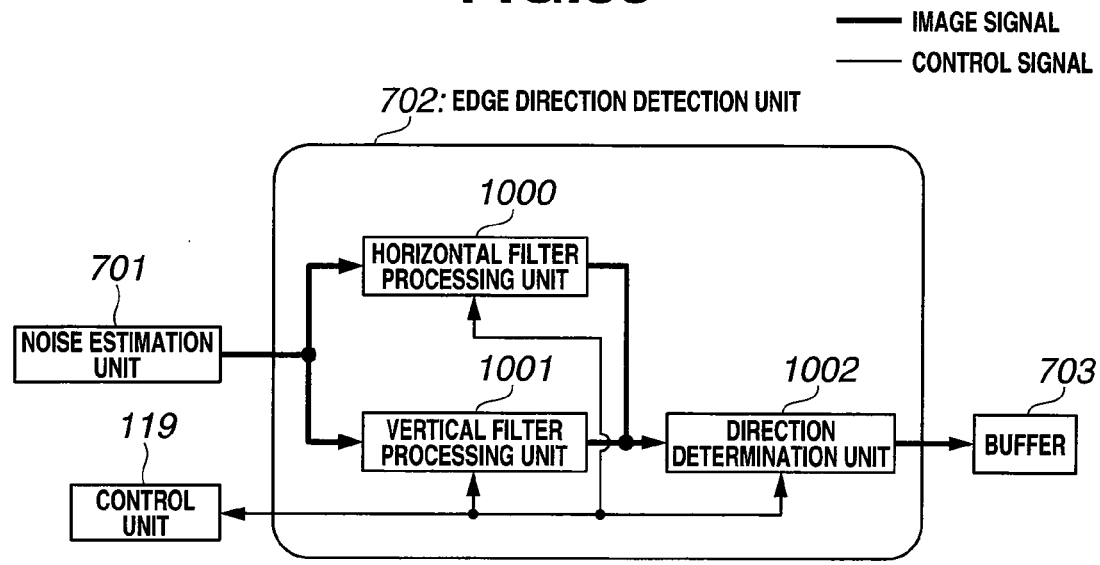
FIG. 33 is a block diagram of a configuration of the edge direction detection unit.
Figure 36:
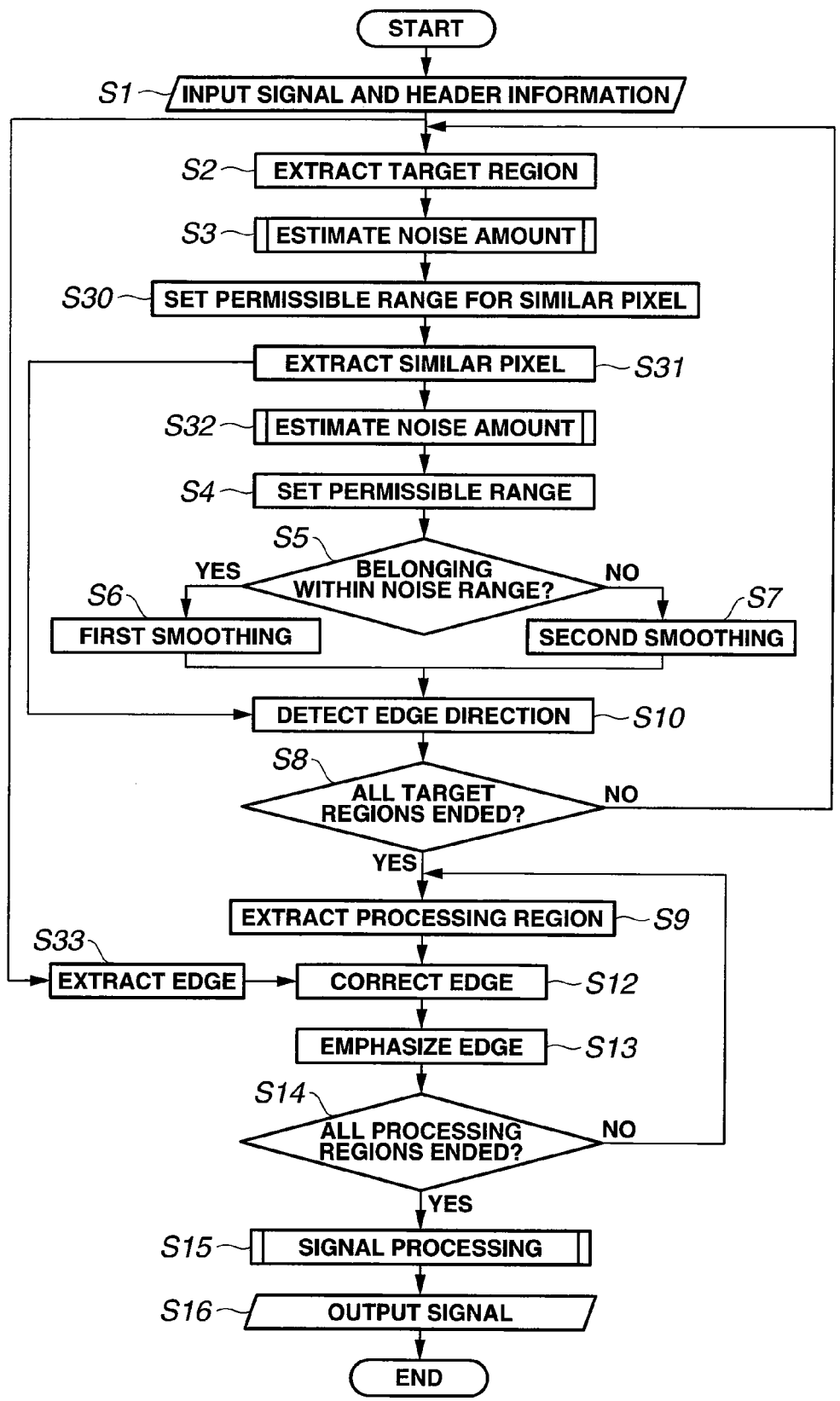
FIG. 36 is a flow chart of a procedure of a signal processing according to the second embodiment which illustrates a flow chart of an entire processing.
Figure 37:
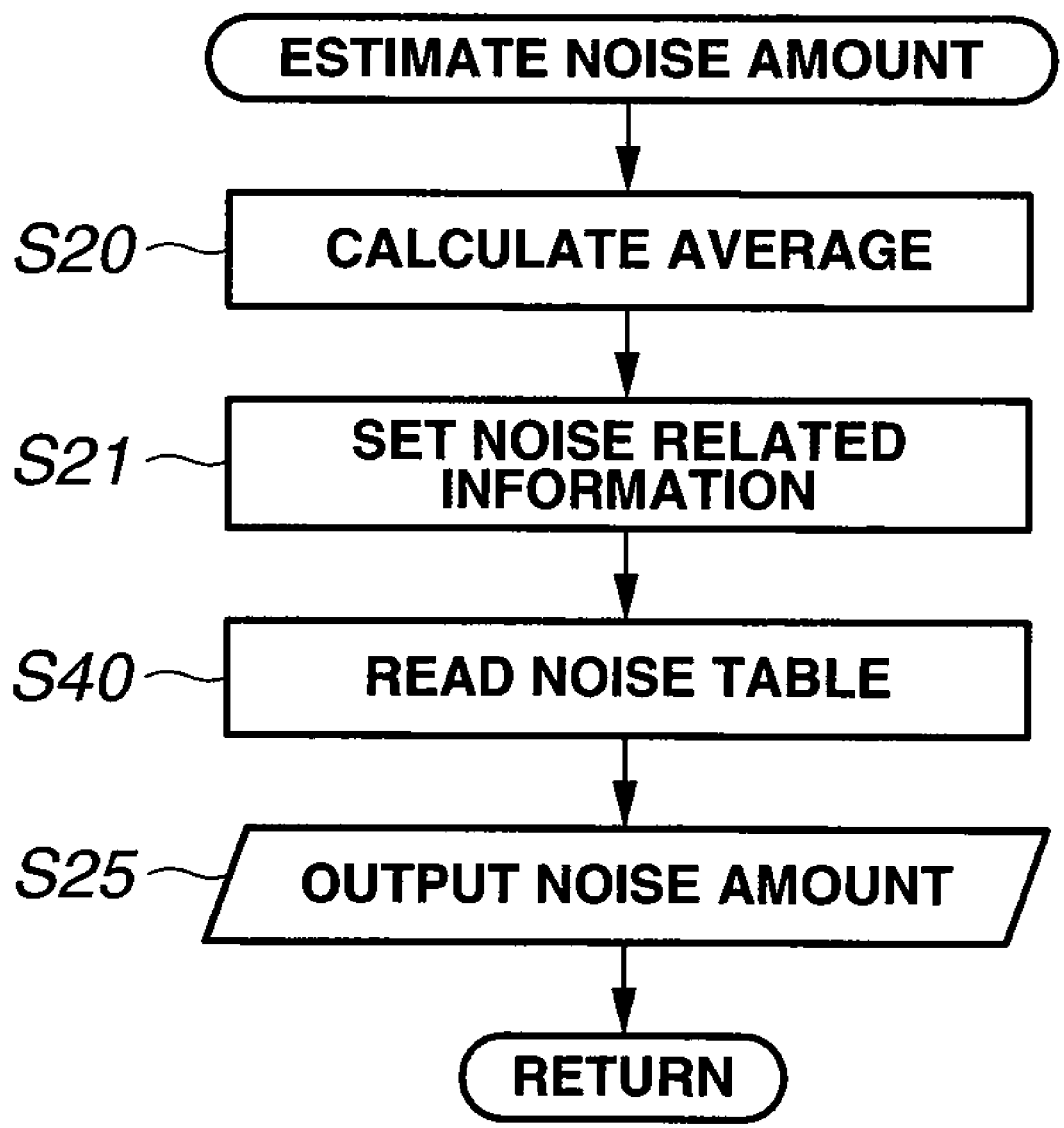
FIG. 37 is a flow chart of the procedure of the signal processing according to the second embodiment which illustrates a flow chart of a noise estimation processing.

FIGS. 28 to 37 illustrate a second embodiment of the present invention: FIG. 28 is a block diagram of a configuration according to the second embodiment, FIGS. 29 and 30 are explanatory diagrams related to the target pixel and the target region in which FIG. 29 illustrates the target pixel and a neighborhood region thereof and FIG. 30 illustrates the target pixel and extracted similar pixels, FIG. 31 is a block diagram of a configuration of an extraction unit, FIG. 32 is a block diagram of a configuration of the noise estimation unit, FIG. 33 is a block diagram of a configuration of the edge direction detection unit, FIGS. 34 and 35 are explanatory diagrams related to the edge extraction filter of the edge direction detection unit in which FIG. 34 illustrates the horizontal edge extraction filter and FIG. 35 illustrates the vertical edge extraction filter, FIGS. 36 and 37 are flow charts of the signal processing according to the second embodiment in which FIG. 36 is a flow chart of an entire processing and FIG. 37 is a flow chart of a noise estimation processing.

FIG. 28 is a block diagram of a configuration according to the second embodiment. According to the present embodiment, such a configuration is made that the extraction unit 109, the noise estimation unit 110, and the edge direction detection unit 113 in the first embodiment illustrated in FIG. 1 are replaced by the extraction unit 700, the noise estimation unit 701, and the edge direction detection unit 702, and a buffer 703 is added. The basic configuration is similar to the first embodiment, the same configuration is allocated with the same name and reference numeral to omit the description and only a different point will mainly be described.

The buffer 105 is connected to the exposure control unit 106, the focus control unit 107, the extraction unit 700, and the edge extraction unit 114. The extraction unit 700 is connected to the noise estimation unit 701 and the noise reducing unit 111. The noise estimation unit 701 is connected to the extraction unit 700, the noise reducing unit 111, and the edge direction detection unit 702. The edge direction detection unit 702 is connected via the buffer 703 to the edge extraction unit 114 and the edge correction unit 115. The control unit 119 is connected to the extraction unit 700, the noise estimation unit 701, and the edge direction detection unit 702 bi-directionally.

The present embodiment is basically similar to the first embodiment and only a different point will mainly be described.

In FIG. 28, a flow of the signal will be described. On the basis of the control of the control unit 119, the extraction unit 700 sequentially extracts the target regions $P_{ij}$ (i=0 to 4, j=0 to 4) with the 5×5 pixel size including the target pixel $P_{22}$ illustrated in FIG. 29. The target pixel $P_{22}$ is transferred to the noise estimation unit 701 and the noise reducing unit 111.

On the basis of the control of the control unit 119, the noise estimation unit 701 estimates a first noise amount $N1_{22}$ with respect to the target pixel $P_{22}$ to be subjected to the noise reduction processing and transfers the first noise amount $N1_{22}$ to the extraction unit 700.

On the basis of the control of the control unit 119, the extraction unit 700 calculates the permissible range for extracting the pixels similar to the target pixel $P_{22}$ on the basis of the target pixel $P_{22}$ and the first noise amount $N1_{22}$. On the basis of the calculated permissible range, the similar pixels are extracted from the target region. As the similar pixels, for example, the similar pixels $P_{kl}$ (k=any of 0 to 4, 1=any of 0 to 4) illustrated in FIG. 30 are supposed. The extracted similar pixels $P_{kl}$ and the target pixel $P_{22}$ are transferred to the noise estimation unit 701.

On the basis of the control of the control unit 119, the noise estimation unit 701 estimates a second noise amount $N2_{22}$ with respect to the target pixel $P_{22}$ and the similar pixels $P_{kl}$ subjected to the noise reduction processing and transfers the second noise amount $N2_{22}$ to the noise reducing unit 111. Also, information on the target pixel $P_{22}$ and the similar pixels $P_{kl}$ is transferred to the edge direction detection unit 702.

Similarly to the first embodiment, regarding the target pixel $P_{22}$, the noise reducing unit 111 performs the noise reduction processing on the basis of the noise amount $N2_{22}$ from the noise estimation unit 701, and transfers the target pixel $P'_{22}$ having been subjected to the noise reduction processing to the buffer 112.

On the basis of the information on the target pixel $P_{22}$ and the similar pixels $P_{kl}$ from the noise estimation unit 701, the edge direction detection unit 702 detects the edge direction $D_{22}$ with respect to the target pixel $P_{22}$. The edge direction $D_{22}$ is transferred to the buffer 703.

On the basis of the control of the control unit 119, the processings in the extraction unit 700, the noise estimation unit 701, the noise reducing unit 111, and the edge direction detection unit 702 are performed for each target region unit in synchronization.

All the signals having being subjected to the noise reduction processing are recoded in the buffer 112, and the edge direction is recorded in the buffer 703.

The edge extraction unit 114 reads, similarly to the first embodiment, the region with the 5×5 pixel size including the 9 pixels of the target pixel $P_{22}$ and the surrounding 8 pixels ($P_{11}$, $P_{21}$, $P_{31}$, $P_{12}$, $P_{32}$, $P_{13}$, $P_{23}$, $P_{33}$) illustrated in FIG. 30 from the buffer 105 and reads the edge direction ($D_{22}$ and $D_{11}$, $D_{21}$, $D_{31}$, $D_{12}$, $D_{32}$, $D_{13}$, $D_{23}$, $D_{33}$) from the buffer 703. Thereafter, with respect to the 9 pixels, on the basis of the edge direction, the edge extraction filters illustrated in FIGS. 12 to 19 are selected to perform the filter processing, and the edge components ($E_{22}$ and $E_{11}$, $E_{21}$, $E_{31}$, $E_{12}$, $E_{32}$, $E_{13}$, $E_{23}$, $E_{33}$) are extracted to be transferred to the edge correction unit 115.

Similarly to the first embodiment, with respect to the edge component $E_{22}$ of the target pixel $P_{22}$, on the basis of the edge direction $D_{22}$ from the buffer 703 and the edge components ($E_{11}$, $E_{21}$, $E_{31}$, $E_{12}$, $E_{32}$, $E_{13}$, $E_{23}$, $E_{33}$) of the surrounding 8 pixels from the edge extraction unit 114, the edge correction unit 115 calculates corrected edge components $E'_{22}$ to be transferred to the edge emphasis unit 116.

On the basis of the control of the control unit 119, the edge emphasis unit 116 sequentially extracts the target pixel $P'_{22}$ having been subjected to the noise reduction processing from the buffer 112. Thereafter, on the basis of the edge component $E'_{22}$ from the edge correction unit 115, similarly to the first embodiment, the pixel value $P''_{22}$ having been subjected to the edge emphasis processing is calculated to be transferred to the signal processing unit 117.

On the basis of the control of the control unit 119, the processings in the edge extraction unit 114, the edge correction unit 115, and the edge emphasis unit 116 are performed for each processing region unit in synchronization.

The signal processing unit 117 performs a known compression processing or the like on the signal having been subjected to the edge emphasis processing on the basis of the control of the control unit 119 and transfers the signal to the output unit 118. The output unit 118 records and saves the signal in the memory card or the like.

FIG. 31 illustrates a configuration example of the extraction unit 700. The extraction unit 700 is provided with a permissible range setting unit 800, a neighborhood extraction unit 801, a similarity examination unit 802, and a buffer 803.

The noise estimation unit 701 is connected via the permissible range setting unit 800 to the similarity examination unit 802. The buffer 105 is connected via the neighborhood extraction unit 801, the similarity examination unit 802, and the buffer 803 to the noise estimation unit 701. The neighborhood extraction unit 801 is connected to the noise reducing unit 111 and the noise estimation unit 701. The control unit 119 is connected to the permissible range setting unit 800, the neighborhood extraction unit 801, and the similarity examination unit 802 bi-directionally.

On the basis of the control of the control unit 119, the neighborhood extraction unit 801 extracts the target pixel $P_{22}$ from the buffer 105 to be transferred to the noise estimation unit 701, the noise reducing unit 111, and the permissible range setting unit 800.

On the basis of the control of the control unit 119, after the first noise amount $N1_{22}$ with respect to the target pixel $P_{22}$ is transferred from the noise estimation unit 701, the permissible range setting unit 800 sets an upper limit App_Up and a lower limit App_Low as the permissible range for searching for the similar pixels as in Expression 15.

$$App\_Up = P_{22} + N1_{22}/2$$

$$App\_Low = P_{22} - N1_{22}/2 \qquad \text{[Expression 15]}$$

The permissible range is transferred to the similarity examination unit 802.

On the basis of the control of the control unit 119, the neighborhood extraction unit 801 extracts, the target regions $P_{ij}$ illustrated in FIG. 29 from the buffer 105 to be sequentially transferred to the similarity examination unit 802.

On the basis of the upper limit App_Up and the lower limit App_Low as the permissible range from the permissible range setting unit 800, the similarity examination unit 802 examines the pixel from the neighborhood extraction unit 801. In a case where the pixel is within the permissible range of Expression 15, a flag meaning the validity as the similar pixels $P_{kl}$, for example, 1 is assigned thereto. On the other hand, in a case where the pixel is outside the permissible range, a flag meaning the invalidity, for example, 0 is assigned. The flag and the pixel value are saved in the buffer 803 as a pair. FIG. 30 illustrates an example of the extracted similar pixel. It should be noted that the target pixel is necessarily extracted as one of the similar pixels. The flag and the pixel value information on the buffer 803 are transferred to the noise estimation unit 701 when necessary on the basis of the control of the control unit 119.

FIG. 32 illustrates a configuration example of the noise estimation unit 701. The noise estimation unit 701 has such a configuration that a noise LUT (look up table) 900 is added to the noise estimation unit 110 illustrated in FIG. 3 according to the first embodiment, and the parameter ROM 203, the parameter selection unit 204, the interpolation unit 205, and the correction unit 206 are omitted. The basic configuration is similar to the noise estimation unit 110 illustrated in FIG. 3, the same configuration is allocated with the same name and reference numeral to omit the description and only a different point will mainly be described.

The extraction unit 700 is connected to the average calculation unit 200 and the edge direction detection unit 702. The average calculation unit 200, the gain calculation unit 201, and the standard value supply unit 202 are connected to the noise LUT 900. The noise LUT 900 is connected to the noise reducing unit 111 and the extraction unit 700. The control unit 119 is connected to the noise LUT 900 bi-directionally.

On the basis of the control of the control unit 119, the average calculation unit 200 reads the target pixel $P_{22}$, or the target pixel $P_{22}$ and the similar pixels $P_{k1}$ from the extraction unit 700 to calculate the average value. The average value is transferred to the noise LUT 900.

The gain calculation unit 201 calculates the gain in the amplifier 103 on the basis of the information related to the ISO sensitivity and the exposure condition transferred from the control unit 119 and transfers the gain to the noise LUT 900.

Also, the control unit 119 obtains the temperature information of the CCD 102 from the temperature sensor 121, and transfers the same to the noise LUT 900.

The noise LUT 900 estimates the noise amount on the basis of the average value from the average calculation unit 200, the gain information from the gain calculation unit 201, and the temperature information from the control unit 119. The noise LUT 900 is a look up table in which a relation between the temperature, the signal value level, and the gain and the noise amount is recorded, and is configured in a similar manner as the first embodiment. The noise amount obtained in the noise LUT 900 is transferred to the extraction unit 700. Also, the flag information for identifying the similar pixel obtained in the extraction unit 700 and the pixel value are transferred to the edge direction detection unit 702.

It should be noted that the standard value supply unit 202 has, similarly to the first embodiment, a function of supplying the standard value in a case where any one of the parameters is omitted.

FIG. 33 illustrates a configuration example of the edge direction detection unit 702. The edge direction detection unit 702 is provided with horizontal filter processing unit 1000, a vertical filter processing unit 1001, and a direction determination unit 1002. The noise estimation unit 701 is connected to the horizontal filter processing unit 1000 and the vertical filter processing unit 1001. The horizontal filter processing unit 1000 and the vertical filter processing unit 1001 are connected to the direction determination unit 1002. The direction determination unit 1002 is connected to the buffer 703. The control unit 119 is connected to the horizontal filter processing unit 1000, the vertical filter processing unit 1001, and the direction determination unit 1002 bi-directionally.

On the basis of the control of the control unit 119, the horizontal filter processing unit 1000 and the vertical filter processing unit 1001 read, the flag and the pixel value information related to the target pixel $P_{22}$ and the similar pixels $P_{k1}$ with the 5×5 pixel size illustrated in FIG. 30. Thereafter, the filter processing with the 5×5 pixel size illustrated in FIG. 34 or 35 and putting into an absolute value are performed to extract the edge component in the horizontal or vertical direction. It should be noted that regarding the similar pixels $P_{k1}$, the filter processing is performed in such a manner that in the pixel having the flag of 0, the pixel value is substituted into 0. The edge component is transferred to the direction determination unit 1002.

On the basis of the control of the control unit 119, the direction determination unit 1002 calculates the edge direction $D_{22}$ on the basis of the horizontal edge component $E0_{22}$ from the horizontal filter processing unit 1000 and the vertical edge component $E90_{22}$ from the vertical filter processing unit 1001 as illustrated in Expression 12. The calculated edge direction $D_{22}$ is transferred to the buffer 703.

With the above-mentioned configuration, the rough direction of the edge is detected on the basis of the information obtained through the course of the noise reduction processing, and the edge component is extracted from the original signal on the basis of the direction, so that it is possible to obtain the high quality edge component in which the influence of the noise is suppressed and the fine signal is saved.

As the edge direction is detected from the information obtained through the course of the noise reduction processing, it is possible to reduce the scale of the system and the lower cost can be realized.

In addition, the edge component is corrected on the basis of the detected edge direction, so that it is possible to generate the high quality edge component. In this case, as the edge direction which is used at the time of extracting the edge component is utilized again, it is possible to reduce the scale of the system, so that the lower cost can be realized.

Furthermore, in the noise reduction processing, the rough first noise amount is estimated from the target pixel, the similar pixel is extracted from the first noise amount, the second noise amount with the high precision is estimated from the target pixel and the similar pixel, and the noise reduction processing is performed on the basis of the second noise amount, so that the accuracy of the noise reduction processing can be improved and it is possible to obtain the high quality signal.

In the noise estimation, various pieces of information related to the noise amount are dynamically calculated, and the standard value is set for the information which cannot be calculated, so that it is possible to obtain the noise reduction effect with the high accuracy as well as the stability.

It should be noted that according to the second embodiment, the configuration of being integrated to the image pickup unit is adopted, but it is not necessary to adopt the above-mentioned configuration. Similarly to the first embodiment, it is also possible to adopt a configuration of being separated from the image pickup unit.

Furthermore, according to the second embodiment, the processing by way of the hardware is supposed, but it is not necessary to limit to such a configuration. For example, it is also possible to adopt such a configuration that the signal from the CCD 102 remains unprocessed and is set as the Raw data, and the temperature at the time of the shooting, the gain, and the like from the control unit 119 are outputted as the header information to be processed by way of separate software.

FIGS. 36 and 37 illustrate flow charts related to the software processing of the signal processing. It should be noted that for the same processing steps as those in the flow chart of the signal processing according to the first embodiment of the present invention illustrated in FIGS. 26 and 27, the same step reference numerals are allocated.

When the processing is started, first, the signal and the header information such as the temperature and the gain are read (step S1).

Next, the target pixel and the target region with the 5×5 pixel size illustrated in FIG. 29 are extracted (step S2).

Then, as will be separately described, the noise amount of the extracted target region is estimated, and the amount is calculated as the noise amount with respect to the target pixel (step S3).

Furthermore, the permissible range for searching for the similar pixel illustrated in Expression 15 is set (step S30).

Thereafter, the similar pixel illustrated in FIG. 30 is extracted (step S31).

Then, through the same processing as in step S3, the noise amount is estimated by using the target pixel and the extracted similar pixel, and calculated as the noise amount with respect to the target pixel (step S32).

Next, the permissible range illustrated in Expression 7 is set with respect to the target pixel (step S4).

Then, it is determined whether the target pixel belongs to the permissible range or not, and in a case where the target pixel belongs to the permissible range, the flow is branched to the next step S6, and in a case where the target pixel does not belong to the permissible range, the flow is branched to step S7 (step S5).

In step S5, when it is determined that the target pixel belongs to the permissible range, subsequently, the processing illustrated in Expression 8 is performed (step S6).

On the other hand, in step S5, when it is determined that the target pixel does not belong to the permissible range, the processing illustrated in Expression 9 or Expression 10 is performed (step S7).

Thereafter, with respect to the target pixel and the similar pixel illustrated in FIG. 30, the horizontal and vertical extraction filters illustrated in FIGS. 34 and 35 are used to detect the edge direction (step S10).

Then, it is determined whether the extraction of all the target regions is completed, and in a case the extraction is not completed, the flow is branched to step S2, and in a case the extraction is completed, the flow is branched to step S9 (step S8).

Next, the processing region with the 5×5 pixel size including the target region and the similar pixels illustrated in FIG. 30 is extracted (step S9).

Furthermore, on the basis of the edge direction information from step S10, the edge component of the target region is extracted from the original signal before being subjected to the noise reduction processing (step S33).

Next, on the basis of the edge direction detected instep S10, with the edge component in the neighborhood pixel illustrated in FIG. 23 or 24, the edge component is corrected through the correction processing illustrated in Expression 13 or Expression 14 (step S12).

Thereafter, the edge emphasis processing illustrated in Expression 1 is performed on the signal of the target pixel having been subjected to the noise reduction processing (step S13).

Then, it is determined whether the extraction of all the processing regions is completed, and in a case the extraction is not completed, the flow is branched to step 9 and in a case the extraction is completed, the flow is branched to step 15 (step S14).

In a case where it is determined that the extraction of all the processing regions is completed, a known compression processing or the like is performed (step S15), and the signal after the processing is outputted and the processing is ended (step S16).

FIG. 37 is a flow chart related to the estimation of the noise amount in steps S3 and S32.

First, the average value of the target region or the target pixel and the similar pixel is calculated (step S20).

Next, from the read header information, information such as the temperature and the gain is set (step S21). At that time, if no necessary parameter exists in the header information, a predetermined standard value is supplied.

Thereafter, the look up table is used to calculate the noise amount (step S40), and the calculated noise amount is outputted and the flow is ended (step S25).

In this manner, when the signal from the CCD 102 is set as the unprocessed Raw data, and the image signal to which the temperature at the time of the shooting, the gain, and the like from the control unit 119 are added as the header information is used, it is also possible to adopt such a configuration that the processing is performed by way of separate software.

Figure 38:
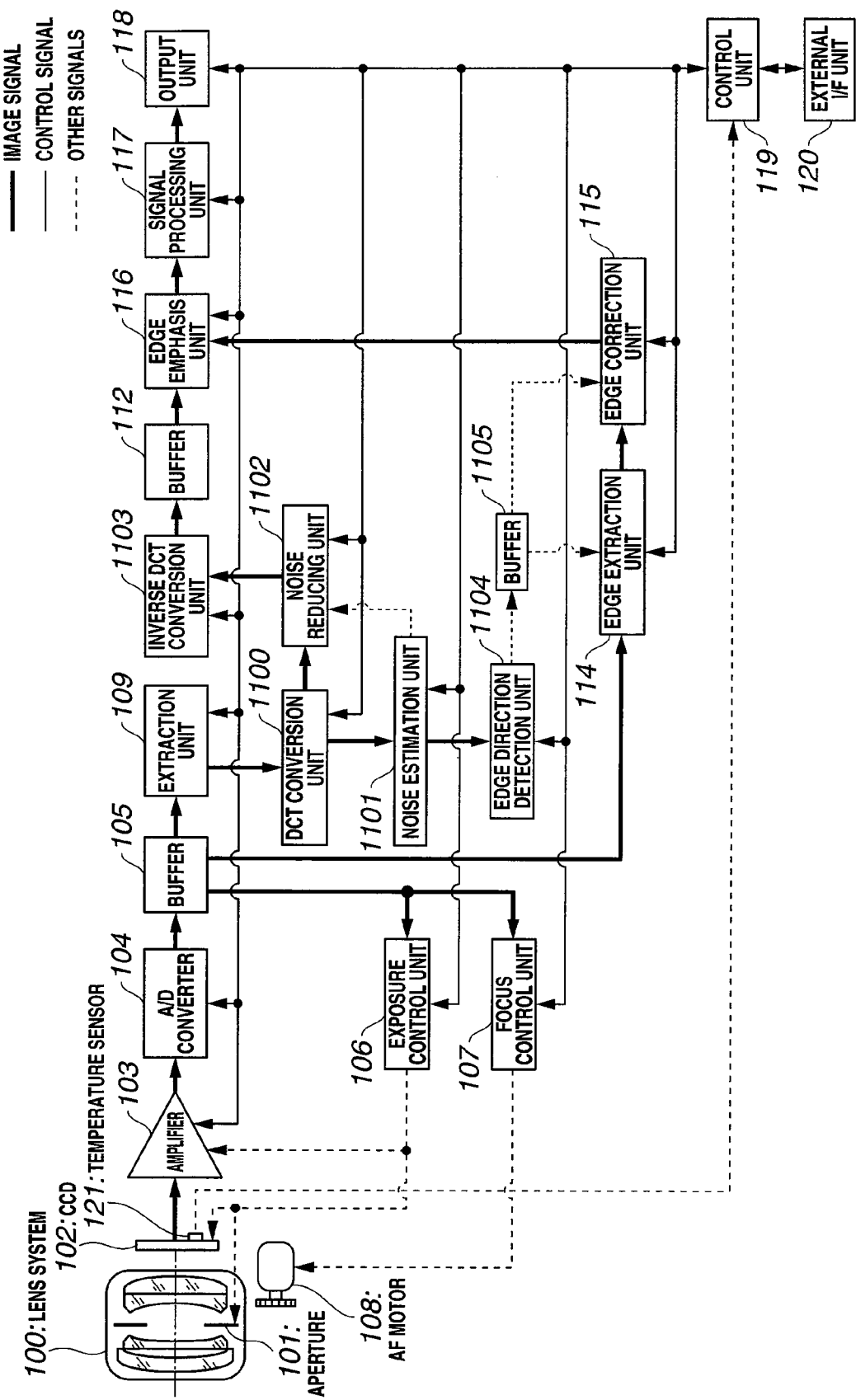
FIG. 38 is a block diagram of a configuration according to a third embodiment.
Figures 39, 40:
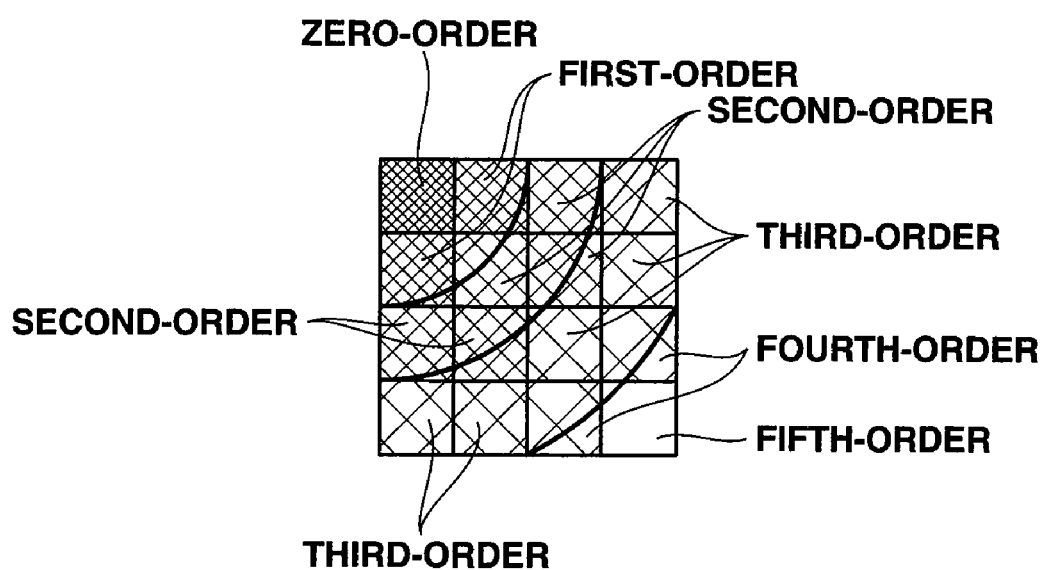
FIG. 39 is an explanatory diagram related to a DCT (Discrete Cosine Transform) in which a real space is illustrated.
FIG. 40 is an explanatory diagram related to the DCT (Discrete Cosine Transform) in which a frequency space is illustrated.
Figure 41:
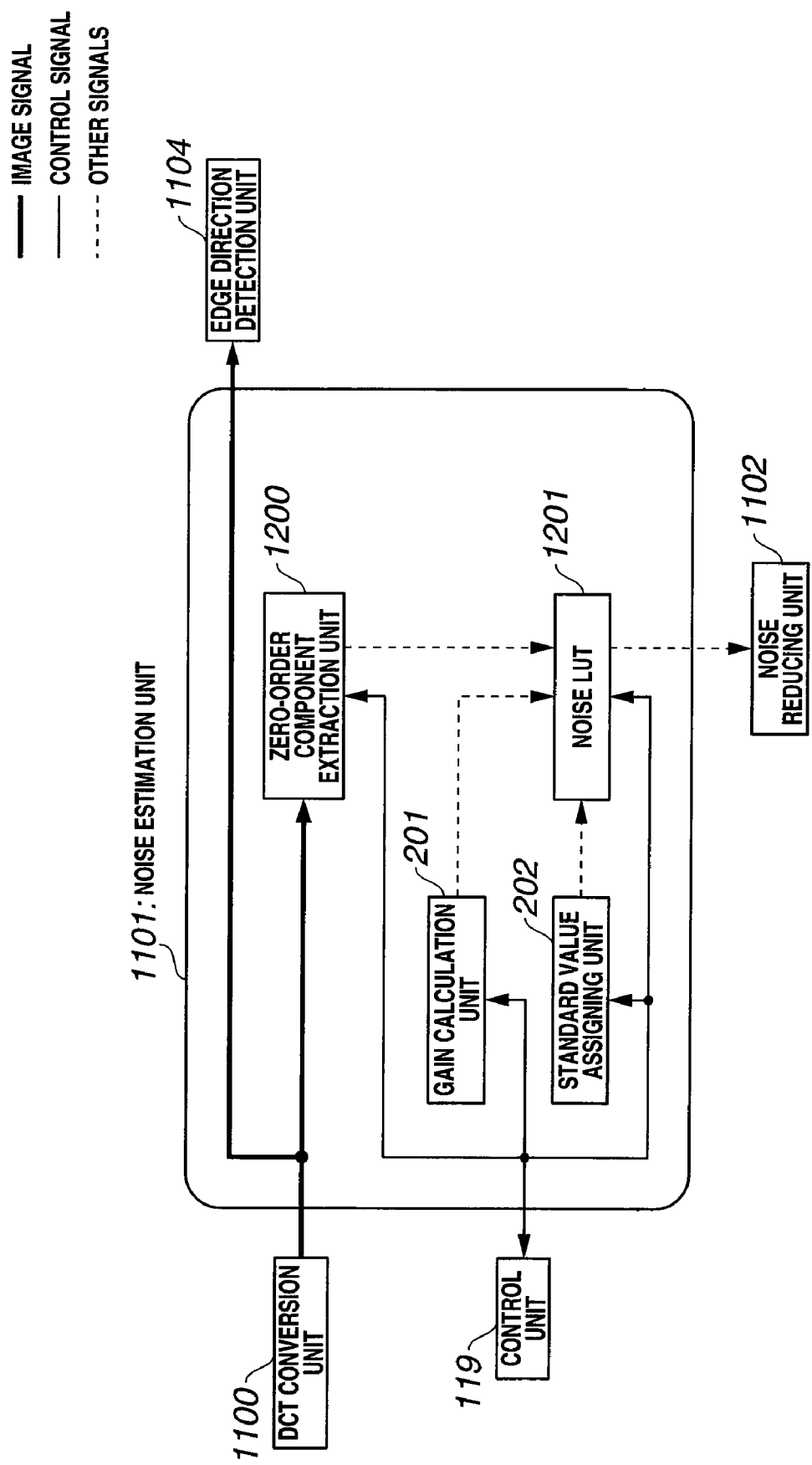
FIG. 41 is a block diagram of a configuration of the noise estimation unit.
Figure 42:
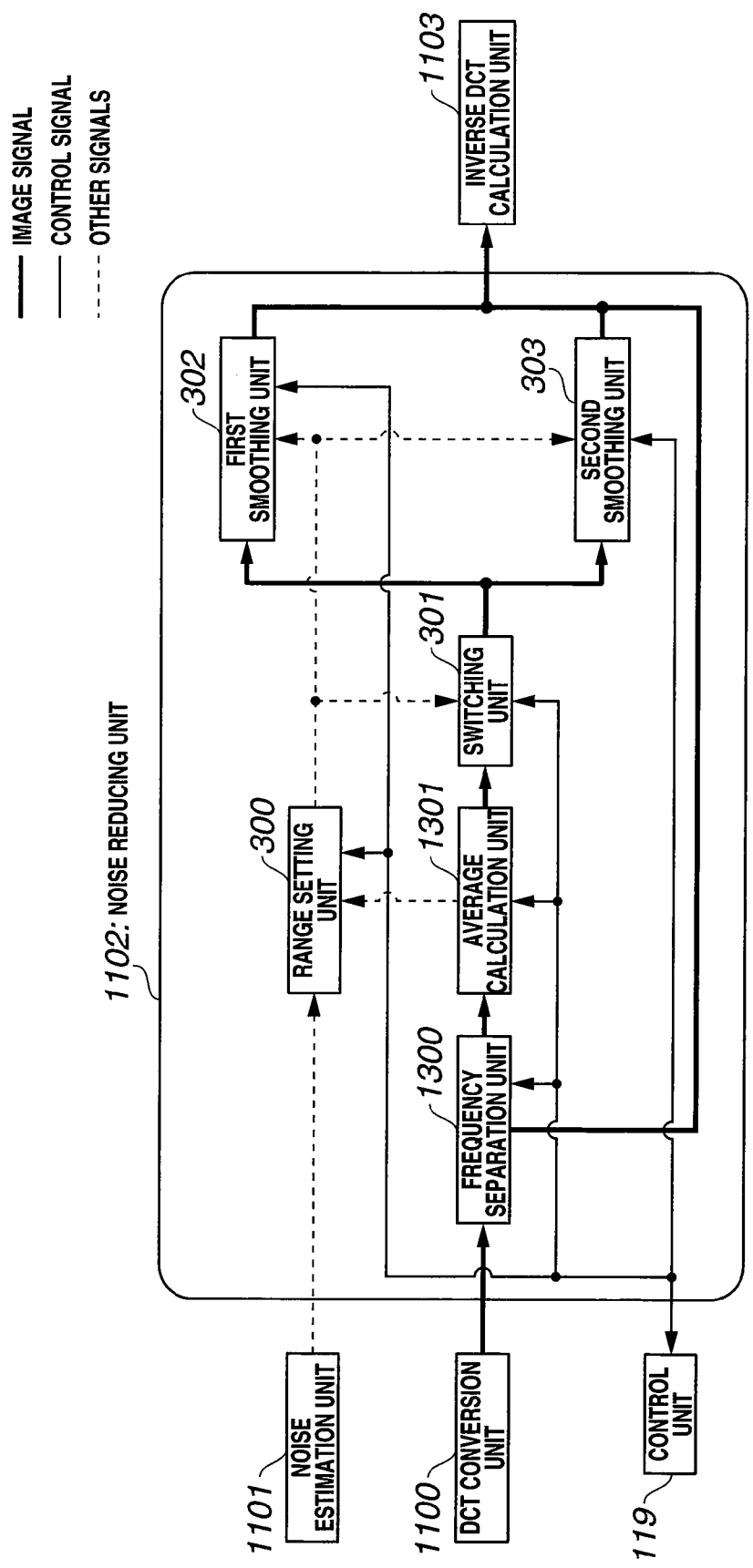
FIG. 42 is a block diagram of a configuration of the noise reducing unit.
Figure 43:
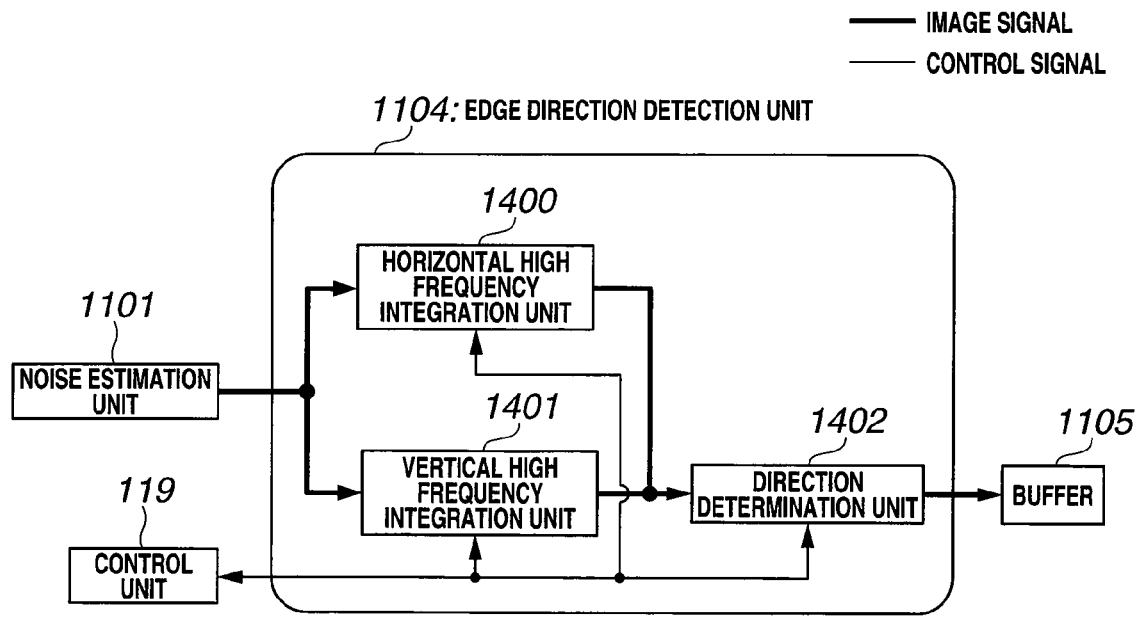
FIG. 43 is a block diagram of a configuration of the edge direction detection unit.
Figure 44:
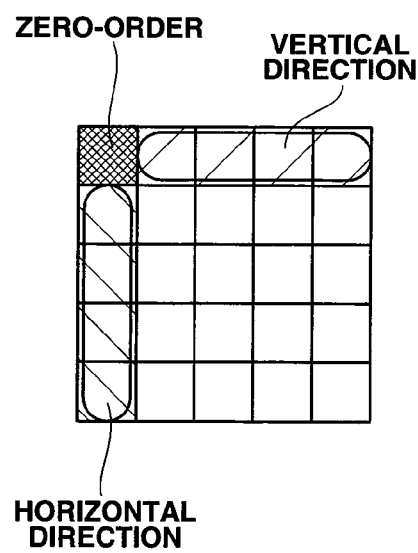
FIG. 44 is an explanatory diagram related to frequency components in horizontal and vertical directions which are used in the edge direction detection unit.
Figure 45:
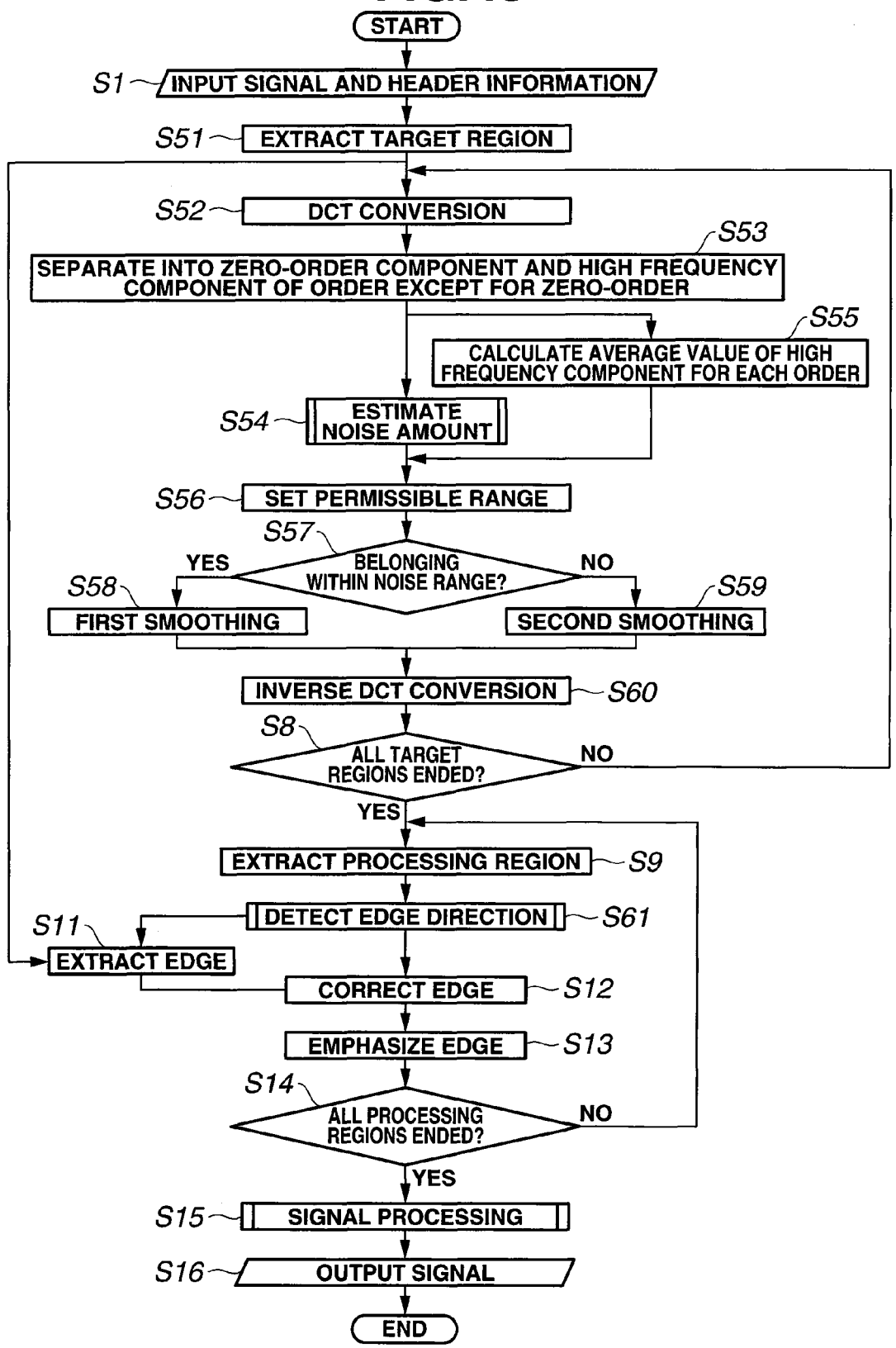
FIG. 45 is a flow chart of a procedure of a signal processing according to the third embodiment which illustrates a flow chart of an entire processing.
Figure 46:
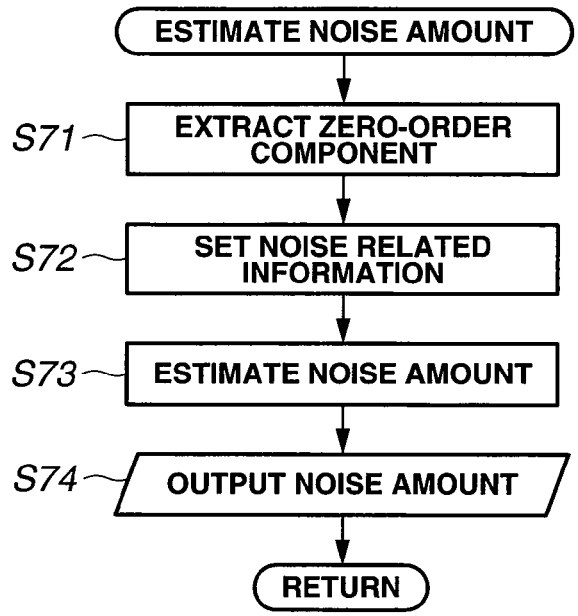
FIG. 46 is a flow chart of the procedure of the signal processing according to the third embodiment which illustrates a flow chart of a noise estimation processing.
Figure 47:
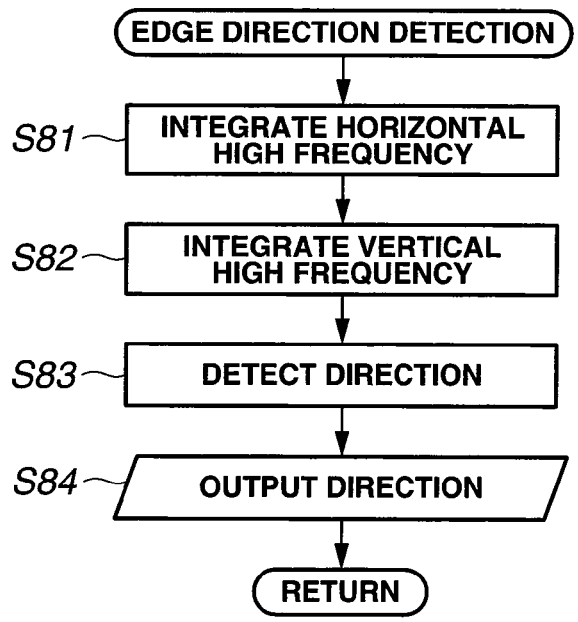
FIG. 47 is a flow chart of the procedure of the signal processing according to the third embodiment which illustrates a flow chart of an edge direction detection processing.

FIGS. 38 to 47 illustrate a third embodiment of the present invention: FIG. 38 is a block diagram of a configuration according to the third embodiment, FIGS. 39 and 40 are explanatory diagrams related to a DCT (Discrete Cosine Transform) conversion in which FIG. 39 illustrates a real space and FIG. 40 illustrates a frequency space, FIG. 41 is a block diagram of a configuration of the noise estimation unit, FIG. 42 is a block diagram of a configuration of the noise reducing unit, FIG. 43 is a block diagram of a configuration of the edge direction detection unit, FIG. 44 is an explanatory diagram related to frequency components in horizontal and vertical directions which are used in the edge direction detection unit, FIGS. 45, 46, and 47 are flow charts of a signal processing according to the third embodiment in which FIG. 45 is a flow chart of an entire processing, FIG. 46 is a flow chart of a noise estimation processing, and FIG. 47 is a flow chart of an edge direction detection processing.

FIG. 38 is a block diagram of a configuration according to the third embodiment of the present invention. According to the present embodiment, such a configuration is made that the noise estimation unit 110, the noise reducing unit 111, and the edge direction detection unit 113 in the first embodiment illustrated in FIG. 1 are replaced by the noise estimation unit 1101, the noise reducing unit 1102, and the edge direction detection unit 1104, and the DCT conversion unit 1100, the inverse DCT conversion unit 1103, a buffer 1105 are added. The basic configuration is similar to the first embodiment, the same configuration is allocated with the same name and reference numeral to omit the description and only a different point will mainly be described.

The extraction unit 109 is connected to the DCT conversion unit 1100, and the DCT conversion unit 1100 is connected to the noise estimation unit 1101 and the noise reducing unit 1102. The noise reducing unit 1102 is connected via the inverse DCT conversion unit 1103 to the buffer 112. The noise estimation unit 1101 is connected to the noise reducing unit 1102 and the edge direction detection unit 1104. The edge direction detection unit 1104 is connected to the buffer 1105, and the buffer 1105 is connected to the edge extraction unit 114 and the edge correction unit 115. The control unit 119 is connected to the DCT conversion unit 1100, the noise estimation unit 1101, the noise reducing unit 1102, the inverse DCT conversion unit 1103, and the edge direction detection unit 1104 bi-directionally.

The present embodiment is basically similar to the first embodiment and only a different point will mainly be described.

In FIG. 38, a flow of the signal will be described. The extraction unit 109 sequentially extracts, on the basis of the control of the control unit 119, the target region (block region) with a 4×4 pixel size illustrated in FIG. 39 to be transferred to the DCT conversion unit 1100.

On the basis of the control of the control unit 119, the DCT conversion unit 1100 performs a known DCT (Discrete Cosine Transform) on the target region to be converted into a frequency component illustrated in FIG. 40. In the DCT, as illustrated in FIG. 40, the upper left is set as the origin, that is, the zero-order component, and first or higher-order high frequency components are arranged in a concentric fashion with the zero-order component as the origin. According to the present embodiment, as the 4×4 pixel size is supposed, as the order, up to the fifth-order high frequency components exist. The frequency components having been subjected to the conversion are transferred to the noise estimation unit 1101 and the noise reducing unit 1102.

On the basis of the control of the control unit 119, the noise estimation unit 1101 calculates the noise amounts with respect to the high frequency components except for the zero-order component for each order component on the basis of the zero-order component in the frequency components and the information at the time of the shooting. The calculated noise amounts are transferred to the noise reducing unit 1102, and the frequency components are transferred to the edge direction detection unit 1104.

On the basis of the control of the control unit 119, the noise reducing unit 1102 performs the noise reduction processing on the high frequency components except for the zero-order component on the basis of the noise amounts from the noise estimation unit 1101 to be transferred to the inverse DCT conversion unit 1103 together with the zero-order component.

On the basis of the control of the control unit 119, the inverse DCT conversion unit 1103 performs an inverse DCT on the zero-order component and the high frequency components except for the zero-order component having been subjected to the noise reduction processing to be converted into pixels in a real space. The pixels having been subjected to the noise reduction are transferred to the buffer 112.

On the other hand, on the basis of the control of the control unit 119, the edge direction detection unit 1104 detects the edge direction from the frequency components in the horizontal and vertical directions on the basis of the frequency components from the noise estimation unit 1101. The detected edge direction is transferred to the buffer 1105.

On the basis of the control of the control unit 119, the processing in the DCT conversion unit 1100, the noise estimation unit 1101, the noise reducing unit 1102, the inverse DCT conversion unit 1103, and the edge direction detection unit 1104 are performed for each target region unit in synchronization.

All the signals having being subjected to the noise reduction processing are recorded in the buffer 112, and the edge directions in the 4×4 pixel unit are recorded in the buffer 1105.

Similarly to the first embodiment, the edge extraction unit 114 searches the buffer 105 for the 9 pixels of the target pixel $P_{22}$ and the surrounding 8 pixels ($P_{11}$, $P_{21}$, $P_{31}$, $P_{12}$, $P_{32}$, $P_{13}$, $P_{23}$, $P_{33}$), and searches the buffer 1105 for the 4×4 pixel unit to which each pixel belongs to read the edge direction ($D_{22}$ and $D_{11}$, $D_{21}$, $D_{31}$, $D_{12}$, $D_{32}$, $D_{13}$, $D_{23}$, $D_{33}$). Thereafter, the edge extraction filters illustrated in FIGS. 12 to 19 are selected with respect to the 9 pixels on the basis of the edge direction and the filter processing is performed to extract the edge components ($E_{22}$ and $E_{11}$, $E_{21}$, $E_{31}$, $E_{12}$, $E_{32}$, $E_{13}$, $E_{23}$, $E_{33}$) to be transferred to the edge correction unit 115.

Similarly to the first embodiment, regarding the edge component $E_{22}$ of the target pixel $P_{22}$, on the basis of the edge direction $D_{22}$ from the buffer 1105 and the edge components ($E_{11}$, $E_{21}$, $E_{31}$, $E_{12}$, $E_{32}$, $E_{13}$, $E_{23}$, $E_{33}$) of the surrounding 8 pixels from the edge extraction unit 114, the edge correction unit 115 calculates the corrected edge components $E'_{22}$ to be transferred to the edge emphasis unit 116.

On the basis of the control of the control unit 119, the edge emphasis unit 116 subsequently extracts the target pixel $P'_{22}$ having been subjected to the noise reduction processing from the buffer 112. Thereafter, on the basis of the edge component $E'_{22}$ from the edge correction unit 115, similarly to the first embodiment, the pixel value $P''_{22}$ having been subjected to the edge emphasis processing is calculated to be transferred to the signal processing unit 117.

On the basis of the control of the control unit 119, the processings in the edge extraction unit 114, the edge correction unit 115, and the edge emphasis unit 116 are performed in the target pixel unit in synchronization.

The signal processing unit 117 performs a known compression processing or the like on the signal having been subjected to the edge emphasis processing on the basis of the control of the control unit 119 and transfers the signal to the output unit 118. The output unit 118 records and saves the signal in the memory card or the like.

FIG. 41 illustrates a configuration example of the noise estimation unit 1101. The noise estimation unit 1101 has such a configuration that a zero-order component extraction unit 1200 and the noise LUT 1201 are added to the noise estimation unit 110 illustrated in FIG. 3 according to the first embodiment, and the average calculation unit 200, the parameter ROM 203, the parameter selection unit 204, the interpolation unit 205, and the correction unit 206 are omitted. The basic configuration is similar to the noise estimation unit 110 illustrated in FIG. 3, the same configuration is allocated with the same name and reference numeral to omit the description and only a different point will mainly be described.

The DCT conversion unit 1100 is connected to the zero-order component extraction unit 1200 and the edge direction detection unit 1104. The zero-order component extraction unit 1200, the gain calculation unit 201, and the standard value supply unit 202 are connected to the noise LUT 1201. The noise LUT 1201 is connected to the noise reducing unit 1102. The control unit 119 is connected to the zero-order component extraction unit 1200 and the noise LUT 1201 bi-directionally.

On the basis of the control of the control unit 119, the zero-order component extraction unit 1200 reads the frequency components with respect to the target region (block region) with the 4×4 pixel size from the DCT conversion unit 1100 and extracts the zero-order component thereof. The zero-order component is transferred to the noise LUT 1201.

The gain calculation unit 201 calculates the gain in the amplifier 103 on the basis of the information related to the ISO sensitivity and the exposure condition transferred from the control unit 119 and transfers the gain to the noise LUT 1201.

Also, the control unit 119 obtains the temperature information of the CCD 102 from the temperature sensor 121 and transfers the same to the noise LUT 1201.

The noise LUT 1201 estimates the noise amounts with respect to the high frequency components except for the zero-order component on the basis of the zero-order component from the zero-order component extraction unit 1200, the gain information from the gain calculation unit 201, the temperature information from the control unit 119.

The noise LUT 1201 is a look up table in which a relation between the temperature, the signal value level, and the gain, and the noise amounts with respect to the high frequency components except for the zero-order component, and is configured by applying the method according to the first embodiment to a frequency space. The noise amounts with respect to the high frequency components except for the zero-order component obtained in the noise LUT 1201 is transferred to the noise reducing unit 1102.

It should be noted that the standard value supply unit 202 has a function of supplying the standard value in a case where any one of the parameters is omitted similarly to the first embodiment.

FIG. 42 illustrates a configuration example of the noise reducing unit 1102. The noise reducing unit 1102 has such a configuration that a frequency separation unit 1300 and an average calculation unit 1301 are added to the noise reducing unit 111 illustrated in FIG. 7 according to the first embodiment. The basic configuration is similar to the noise reducing unit 111 illustrated in FIG. 7, the same configuration is allocated with the same name and reference numeral to omit the description and only a different point will mainly be described.

The noise estimation unit 1101 is connected to the range setting unit 300. The DCT conversion unit 1100 is connected to the frequency separation unit 1300, and the frequency separation unit 1300 is connected to the average calculation unit 1301 and the inverse DCT conversion unit 1103. The average calculation unit 1301 is connected to the range setting unit 300 and the switching unit 301. The first smoothing unit 302 and the second smoothing unit 303 are connected to the inverse DCT conversion unit 1103. The control unit 119 is connected to the frequency separation unit 1300 and the average calculation unit 1301 bi-directionally.

On the basis of the control of the control unit 119, the frequency separation unit 1300 reads frequency components illustrated in FIG. 40 from the DCT conversion unit 1100 and separates the components for each frequency component. The separated zero-order component $F_0$ is transferred to the inverse DCT conversion unit 1103, and the high frequency components except for the zero-order component $F_{Le}$ (L means orders of 1 to 5, and e means an element included in each order) are transferred to the average calculation unit 1301.

The average calculation unit 1301 calculates, on the basis of the control of the control unit 119, the average value $AV\_F_L$ of the high frequency component for each order and transfers the same to the range setting unit 300. Also, the high frequency components $F_{Le}$ is transferred to the switching unit 301.

The range setting unit 300 reads, on the basis of the control of the control unit 119, a noise amount $N\_F_L$ for each order from the noise estimation unit 1101, and sets an upper limit $F\_Up_L$ and a lower limit $F\_Low_L$ for each order as the permissible range.

$$F\_Up_L = AV\_F_L + N\_F_L/2$$

$$F\_Low_L = AV\_F_L - N\_F_L/2 \quad \text{[Expression 16]}$$

The permissible range is transferred to the switching unit 301. Also, the range setting unit 300 transfers the average value $AV\_F_L$ and the noise amount $N\_F_L$ to the first smoothing unit 302 and the second smoothing unit 303.

On the basis of the control of the control unit 119, the switching unit 301 reads the high frequency components $F_{Le}$ from the average calculation unit 1301 to determine whether the high frequency components belong within the permissible range. The determination has three options including "belonging within the noise range", "being above the noise range", and "being below the noise range". The switching unit 301 transfers the high frequency components $F_L$ to the first smoothing unit 302 in the case of "belonging within the noise range" and transfers the high frequency components $F_L$ to the second smoothing unit 303 in the other cases.

The first smoothing unit 302 performs a processing of substituting the average value $AV\_F_L$ from the range setting unit 300 for the high frequency components $F_{Le}$ from the switching unit 301.

$$F'_{Le} = AV\_F_L \quad \text{[Expression 17]}$$

The high frequency components $F'_{Le}$ having been subjected to the noise reduction processing in Expression 17 is transferred to the inverse DCT conversion unit 1103.

The second smoothing unit 303 performs a processing of correcting the high frequency components $F_{Le}$ from the switching unit 301 by using the average value $AV\_F_L$ from the range setting unit 300 and the noise amount $N\_F_L$.

First, in the case of "being above the noise range", the correction is performed as in Expression 18.

$$F'_{Le} = AV\_F_L - N\_F_L/2 \quad \text{[Expression 18]}$$

Also, in the case of "being below the noise range", the correction is performed as in Expression 19.

$$F'_{Le} = AV\_F_L + N\_F_L/2 \quad \text{[Expression 19]}$$

The high frequency components $F'_{Le}$ having been subjected to the noise reduction processing in Expression 18 or Expression 19 are transferred to the inverse DCT conversion unit 1103.

FIG. 43 illustrates a configuration example of the edge direction detection unit 1104. The edge direction detection unit 1104 is provided with a horizontal high frequency integration unit 1400, a vertical high frequency integration unit 1401, and a direction determination unit 1402. The noise estimation unit 1101 is connected to the horizontal high frequency integration unit 1400 and the vertical high frequency integration unit 1401. The horizontal high frequency integration unit 1400 and the vertical high frequency integration unit 1401 are connected to the direction determination unit 1402. The direction determination unit 1402 is connected to the buffer 1105. The control unit 119 is connected to the horizontal high frequency integration unit 1400, the vertical high frequency integration unit 1401, and the direction determination unit 1402 bi-directionally.

On the basis of the control of the control unit 119, as illustrated in FIG. 44, the horizontal high frequency integration unit 1400 and the vertical high frequency integration unit 1401 read the high frequency component except for the zero-order component in the horizontal direction or the vertical direction from the frequency component. The high frequency component is put into an absolute value and thereafter integrated to be transferred to the direction determination unit 1402 as the horizontal or vertical edge component.

On the basis of the control of the control unit 119, for each target region unit (block region unit) with the 4×4 pixel size including the target pixel $P_{22}$, the direction determination unit 1402 calculates the edge direction $D_{22}$ on the basis of the horizontal edge component $E0_{22}$ from the horizontal high frequency integration unit 1400 and the vertical edge component $E90_{22}$ from the vertical high frequency integration unit 1401 as illustrated in Expression 12. The calculated edge direction is transferred to the buffer 1105.

With the above-mentioned configuration, the rough direction of the edge is detected on the basis of the information obtained through the course of the noise reduction processing, and the edge component is extracted from the original signal on the basis of the direction, so that it is possible to obtain the high quality edge component in which the influence of the noise is suppressed and the fine signal is saved. As the edge direction is detected from the frequency information obtained through the course of the noise reduction processing, it is possible to reduce the scale of the system and the lower cost can be realized.

In addition, the edge component is corrected on the basis of the detected edge direction, so that it is possible to generate the high quality edge component. In this case, as the edge direction which is used at the time of extracting the edge component is utilized again, it is possible to reduce the scale of the system, so that the lower cost can be realized.

Furthermore, in the noise reduction processing, the target region is converted into the frequency space, and the noise amount is estimated from the zero-order component to perform the noise reduction processing, so that the accuracy of the noise reduction processing can be improved and it is possible to obtain the high quality signal. In the noise estimation, various pieces of information related to the noise amount are dynamically calculated, and the standard value is set for the information which cannot be calculated, so that it is possible to obtain the noise reduction effect with the high accuracy as well as the stability.

Herein, a description will be given of a flow chart in a case where the signal processing according to the third embodiment is processed by way of the software. It should be noted that the present flow chart is different from the flow chart related to the software processing according to the first embodiment illustrated in FIGS. 26 and 27 in the specific processing contents in the flow from step S2 to step S8 but the other processing is substantially similar, so that only the different parts will be described.

FIGS. 45 to 47 illustrate flow charts related to the software processing of the signal processing.

When the processing is started, first, the signal and the header information such as the temperature and the gain are read (step S1), and thereafter, the target regions with the 4×4 pixel size illustrated in FIG. 39 are sequentially extracted (step S51).

Next, the DCT is performed on the sequentially extracted target regions to be converted into the frequency component illustrated in FIG. 40 (step S52), and separated into the zero-order component and the high frequency component except for the zero-order (step S53).

Thereafter, as will be separately described, the noise amounts with respect to the high frequency components except for the zero-order component are calculated for each order component (step S54).

Also, the average value of the high frequency components for each order separated in step S53 is calculated (step S55).

Subsequently, the permissible range illustrated in Expression 16 is set with respect to the target region (step S56).

Next, it is determined whether the target pixel belongs to the permissible range or not, and in a case where the target pixel belongs to the permissible range, the flow is branched to the next step S58, and in a case where the target pixel does not belong to the permissible range, the flow is branched to step S59 (step S57).

In step S57, when it is determined that the target pixel belongs to the permissible range, the processing illustrated in Expression 17 is performed (step S58).

On the other hand, in step S57, when it is determined that the target pixel does not belong to the permissible range, the processing illustrated in Expression 18 or Expression 19 is performed (step S59).

Next, the inverse DCT is performed on the zero-order component and the high frequency components except for the zero-order component having been subjected to the noise reduction processing to be converted into the pixels in the real space (step S60).

When the processing in step S60 is ended, it is subsequently determined whether the extraction of all the target regions is completed, and in a case the extraction is not completed, the flow is branched to step 52 and in a case the extraction is completed, the flow is branched to step 9 (step S8).

In step S8, when it is determined that the extraction of all the target regions is completed, next, the target pixel and the target region with the 5×5 pixel size illustrated in FIG. 10 are extracted (step S9).

Subsequently, as will be separately described, the edge direction is detected from the frequency components in the horizontal and vertical directions (step S61).

Furthermore, on the basis of the edge direction from step S61, the edge component is extracted from the original signal before being subjected to the noise reduction processing (step S11).

Next, on the basis of the edge direction detected in step S10, with the edge component in the neighborhood pixel illustrated in FIG. 23 or 24, the edge component is corrected through the correction processing illustrated in Expression 13 or Expression 14 (step S12).

Furthermore, the edge emphasis processing illustrated in Expression 1 is performed on the signal of the target pixel having been subjected to the noise reduction processing (step S13).

Then, it is determined whether the extraction of all the processing regions is completed, and in a case the extraction is not completed, the flow is branched to step 9 and in a case the extraction is completed, the flow is branched to step 15 (step S14).

In step S14, when it is determined that the extraction of all the processing regions is completed, a known compression processing or the like is subsequently performed (step S15).

Thereafter, the signal after the processing is outputted and the processing is ended (step S16).

FIG. 46 is a flow chart related to the estimation of the noise amount in step S54.

First, the zero-order component of the frequency components with respect to the target regions with the 4×4 pixel size separated in step S53 is extracted (step S71).

On the other hand, information such as the gain and the temperature is set on the basis of the header information (step S72). At this time, if a necessary parameter does not exist in the header information, a predetermined standard value is supplied.

Next, the look up table is used to calculate the noise amount (step S73), and the calculated noise amount is outputted and the flow is ended (step S74).

FIG. 47 is a flow chart related to the edge direction detection processing in step S61.

As illustrated in FIG. 44, the high frequency components in the horizontal direction except for the zero-order component is put into an absolute value, and thereafter integrated to obtain the horizontal edge component (step S81). Also, as illustrated in FIG. 44, the high frequency components in the vertical direction except for the zero-order component is put into an absolute value and thereafter integrated to obtain the vertical edge component (step S82).

Next, for each target region unit with the 4×4 pixel size, the edge direction is detected on the basis of the horizontal edge component obtained in step S81 and the vertical edge component obtained in step S82 as illustrated in Expression 12 (step S83), and the detected direction is outputted to end the flow (step S84).

It should be noted that according to the third embodiment, such a configuration is adopted that the conversion into the frequency component is performed through the DCT and the processing size of the conversion is set as the 4×4 pixels, but it is not necessary to limit to such a configuration. For example, as the conversion into the frequency component, FFT (Fast Fourier Transform) or Wavelet conversion, or the like can also be used. Also, as the processing size, the accuracy of the direction detection can be improved by setting a smaller size such as 2×2 pixels and the increased speed of the entire processing can be realized by setting a larger size such as 8×8 pixels.

Also, according to the third embodiment, the configuration of being integrated to the image pickup unit is adopted, but it is not necessary to adopt the above-mentioned configuration. Similarly to the first embodiment, it is also possible to adopt a configuration of being separated from the image pickup unit.

Figure 48:
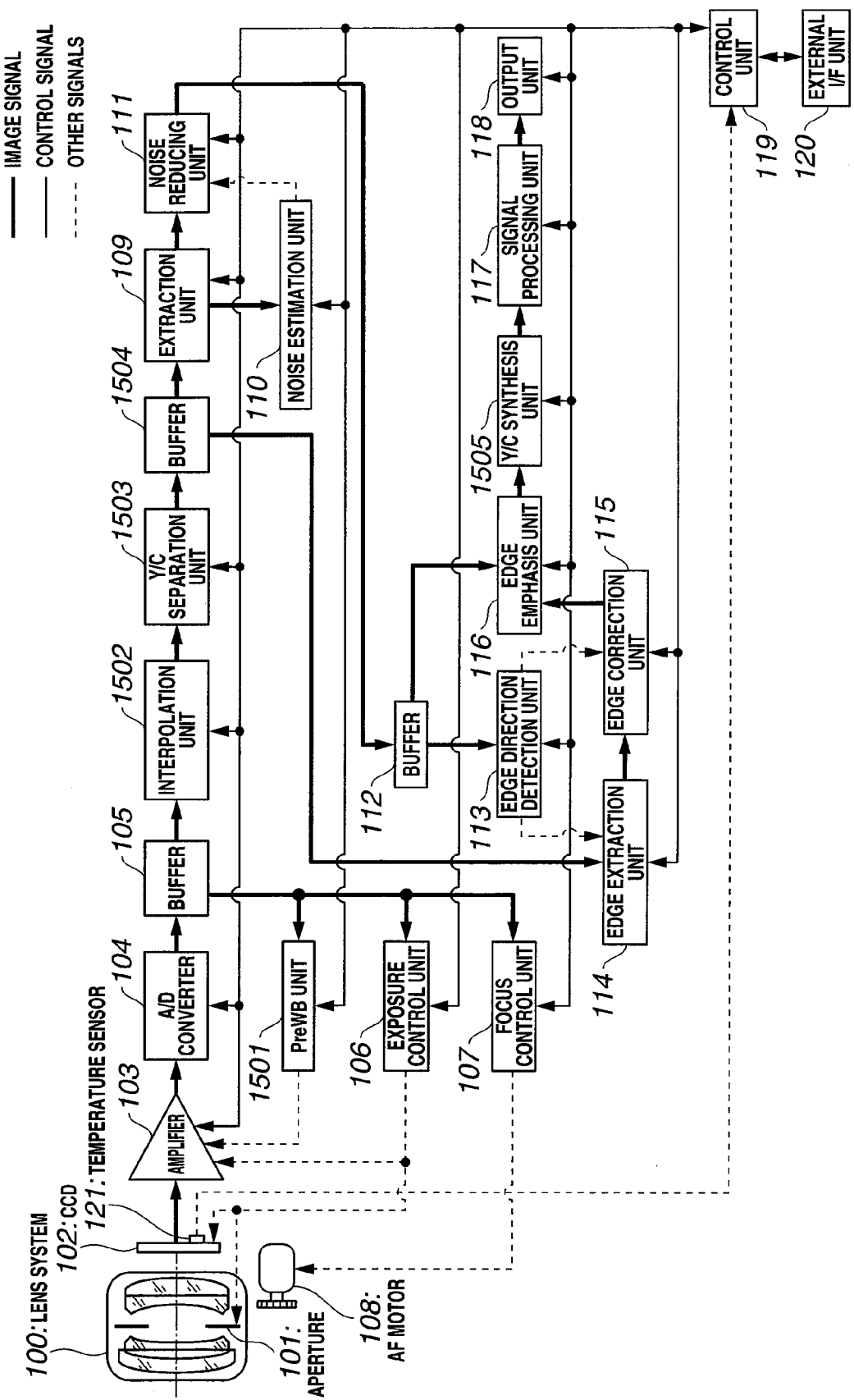
FIG. 48 is a block diagram of a configuration according to a fourth embodiment.
Figure 51:
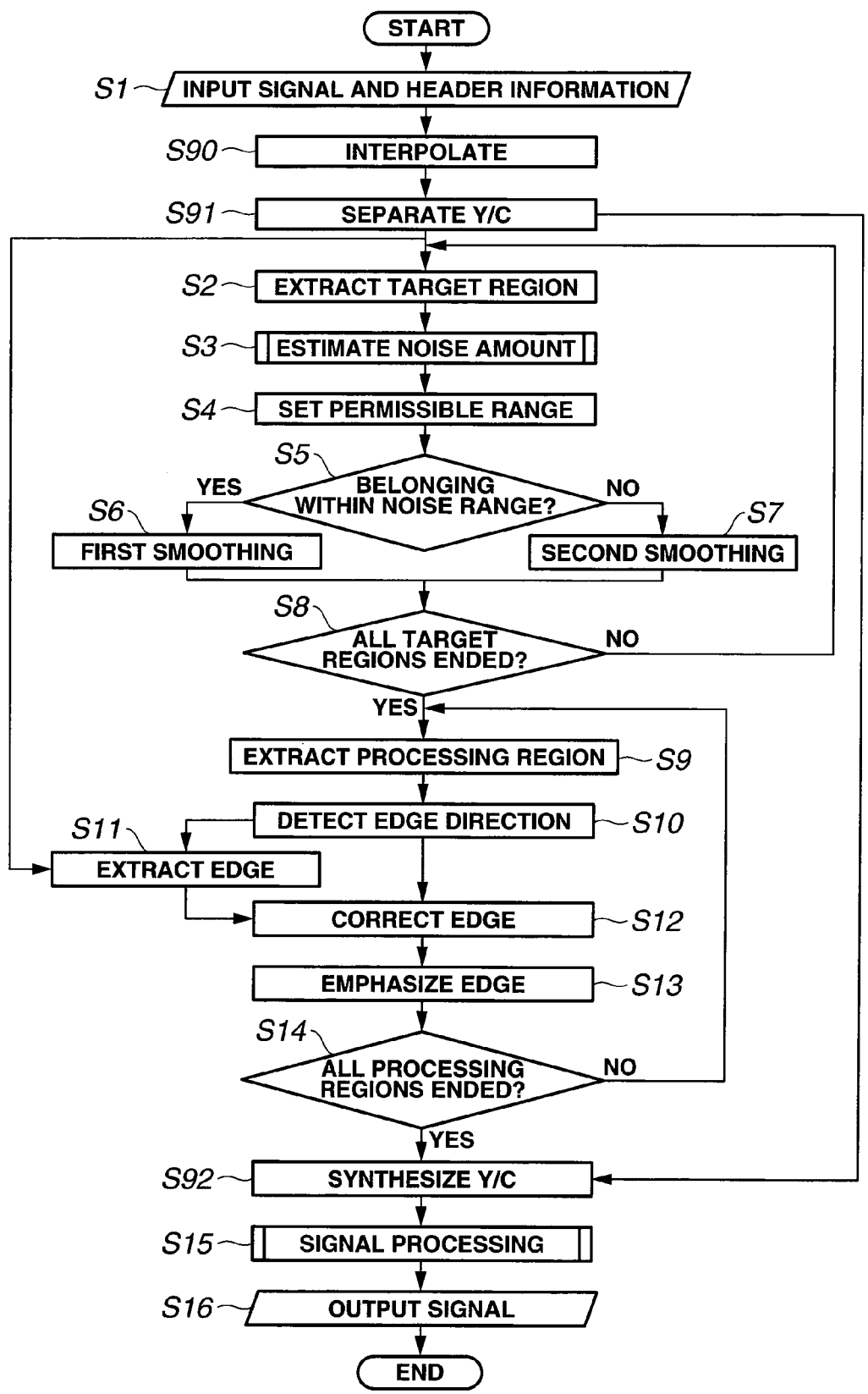
FIG. 51 is a flow chart of a procedure of a signal processing according to the fourth embodiment.

FIGS. 48 to 51 illustrate a fourth embodiment of the present invention: FIG. 48 is a block diagram of a configuration according to the fourth embodiment, FIGS. 49 and 50 are explanatory diagrams related to a color filter in which FIG. 49 illustrates a Bayer type primary color filter and FIG. 50 illustrates a color difference line-sequential type complementary-color filter, and FIG. 51 is a flow chart of a signal processing according to the fourth embodiment.

FIG. 48 is a block diagram of a configuration according to the fourth embodiment. According to the present embodiment, such a configuration is made that the CCD 102 according to the first embodiment illustrated in FIG. 1 is replaced by a color CCD 1500, and a PreWB unit 1501, an interpolation unit 1502, the Y/C separation unit 1503, a buffer 1504, and a Y/C synthesis unit 1505 are added. The basic configuration is similar to the first embodiment, the same configuration is allocated with the same name and reference numeral to omit the description and only a different point will mainly be described.

The color CCD 1500 is connected to the amplifier 103. Also, the temperature sensor 121 is arranged in the vicinity of the color CCD 1500. The buffer 105 is connected to the PreWB unit 1501, the exposure control unit 106, the focus control unit 107, and the interpolation unit 1502. The interpolation unit 1502 is connected via the Y/C separation unit 1503 and the buffer 1504 to the extraction unit 109 and the edge extraction unit 114. The edge emphasis unit 116 is connected to the Y/C synthesis unit 1505, and the Y/C synthesis unit 1505 is connected to the signal processing unit 117. The control unit 119 is connected to the PreWB unit 1501, the interpolation unit 1502, the Y/C separation unit 1503, and the Y/C synthesis unit 1505 bi-directionally.

The present embodiment is basically similar to the first embodiment and only a different point will mainly be described.

In FIG. 48, a flow of the signal will be described. By half-pressing the shutter button via the external I/F unit 120, the pre shooting mode is established.

The signal picked up via the lens system 100, the aperture 101, and the color CCD 1500 is transferred via the amplifier 103 and the A/D converter 104 to the buffer 105. It should be noted that according to the present embodiment, it is supposed that the color CCD 1500 is the single CCD having the Bayer type primary color filter arranged on the front face. FIG. 49 illustrates the Bayer type color filter configuration. The Bayer type has 2×2 pixels as the basis unit, in which a red (R) filter and a blue (B) filter is arranged in one pixel each and green (G) filters are arranged in 2 pixels.

The signal in the buffer 105 is transferred to the PreWB unit 1501.

The PreWB unit 1501 calculates a simplified white balance factor by integrating a predetermined luminance level for each color signal. The PreWB unit 1501 transfers the above-mentioned factor to the amplifier 103, and the white balance is performed by multiplying a different gain for each color signal.

Next, the real shooting is performed through a full press of the shutter button via the external I/F unit 120, and the image signal is transferred to the buffer 105 similarly to the pre shooting. It should be noted that the white balance factor calculated in the PreWB unit 1501 is transferred to the control unit 119. The signal in the buffer 105 is transferred to the interpolation unit 1502.

The interpolation unit 1502 generates a three-state signal from the single-state signal by using a method such as a known linear interpolation. The three-state signal is transferred to the Y/C separation unit 1503 to be separated into a luminance signal Y and color difference signals Cb and Cr.

$Y=0.29900R+0.58700G+0.11400B$ $Cb=-0.16874R-0.33126G+0.50000B$ $Cr=0.50000R-0.41869G-0.08131B$ [Expression 20]

The luminance signal Y and the color difference signals Cb and Cr are transferred and saved in the buffer 1504.

Similarly to the first embodiment, with the extraction unit 109, the noise estimation unit 110, the noise reducing unit 111, the luminance signal Y is subjected to the noise reduction processing to become a luminance signal Y'.

It should be noted that the gain calculation unit 201 in the noise estimation unit 110 illustrated in FIG. 3 calculates the gain in the amplifier 103 on the basis of the information related to the ISO sensitivity and the exposure condition transferred from the control unit 119 and the white balance factor from the PreWB unit 1501. The luminance signal Y' and the color difference signals Cb and Cr are transferred and saved in the buffer 112.

On the basis of the control of the control unit 119, similarly to the first embodiment, the edge direction detection unit 113 reads, the luminance signal Y' having been subjected to the noise reduction processing from the buffer 112, and the target pixel $P'_{22}$ and the target region with the 5×5 pixel size including the target pixel are sequentially extracted. Thereafter, the edge direction of the target pixel $P'_{22}$ and the surrounding 8 pixels is detected. The edge direction has three options: "the direction providing the maximum value", "the isotropic edge direction", or "no edge direction", and similarly to the first embodiment, the processing in the later stage is selected.

On the basis of the control of the control unit 119, the edge extraction unit 114 sequentially extracts the luminance signals Y before being subjected to the noise reduction processing at the same position as the processing region used in the edge direction detection unit 113 from the buffer 1504. Thereafter, on the basis of the edge direction from the edge direction detection unit 113, the edge components of the target pixel $P'_{22}$ and the surrounding 8 pixels are extracted to be transferred to the edge correction unit 115.

On the basis of the control of the control unit 119, regarding the edge components $E_{22}$ of the target pixel $P'_{22}$, the edge correction unit 115 calculates the corrected edge component $E'_{22}$ on the basis of the edge direction $D_{22}$ from the edge direction detection unit 113 and the edge components of the surrounding 8 pixels from the edge extraction unit 114 to be transferred to the edge emphasis unit 116.

On the basis of the control of the control unit 119, the edge emphasis unit 116 reads the luminance signal Y' having been subjected to the noise reduction processing from the buffer 112, and sequentially extracts the target pixel $P'_{22}$. Thereafter, on the basis of the edge component $E'_{22}$ from the edge correction unit 115, the edge emphasis unit 116 calculates the pixel value $P''_{22}$ having been subjected to the edge compression processing to be transferred as the luminance signal Y"

having been subjected to the edge emphasis processing to the Y/C synthesis unit 1505. Also, the edge emphasis unit 116 reads the color difference signals Cb and Cr from the buffer 112 and transfers the same to the Y/C synthesis unit 1505.

On the basis of the control of the control unit 119, the Y/C synthesis unit 1505 synthesizes the R, G and B signals from the luminance signal Y" having been subjected to the edge emphasis processing from the edge emphasis unit 116 and the color difference signals Cb and Cr, as in Expression 21.

$$R = Y'' + 1.40200 Cr$$

$$G = Y'' - 0.34414 Cb - 0.71414 Cr$$

$$B = Y'' + 1.77200 Cb \qquad \text{[Expression 21]}$$

The R, G, and B signals are transferred to the signal processing unit 112.

On the basis of the control of the control unit 119, the signal processing unit 117 performs a known compression processing, a color emphasis processing, or the like on the signal having been subjected to the edge emphasis processing to be transferred to the output unit 118. The output unit 118 records and saves the signal in the memory card or the like.

With the above-mentioned configuration, the signal from the color image pickup device is separated into the luminance signal and the color signal, the rough direction of the edge is detected from the luminance signal having been subjected to the noise reduction processing, and the edge component is extracted from the original signal on the basis of the direction, so that it is possible to obtain the high quality edge component in which the influence of the noise is suppressed and the fine signal is saved.

In addition, the edge component is corrected on the basis of the detected edge direction, so that it is possible to generate the high quality edge component.

Furthermore, the noise reduction processing is performed through the noise estimation and the noise reduction, and the estimation accuracy is increased by performing the estimation from a wide region in the noise estimation and only the target pixel is set as the target in the noise reduction, so that the accuracy of the noise reduction processing can be improved and it is possible to obtain the high quality signal.

In the noise estimation, various pieces of information related to the noise amount are dynamically calculated, and the standard value is set for the information which cannot be calculated, so that it is possible to obtain the noise reduction effect with the high accuracy as well as the stability.

Furthermore, in the detection for the edge direction, after the edge strengths in the plural directions or horizontal and vertical directions are calculated, the comparison with the threshold on the basis of the noise amount or the removal of the minute edge strength is performed, and it is thus possible to obtain the edge direction in which the influence of the noise is suppressed and the accuracy is high. Also, as the edge extraction processing in the later stage is stopped in the case where the edge direction cannot be determined, the wasteful processing can be omitted and it is possible to increase the processing speed. Furthermore, as the isotropic edge extraction processing is performed in the case where the plural edge directions are detected, it is possible to obtain the stable processing result.

In addition, it is possible to cope with the signal from the color image pickup device, and the luminance signal and the color signal are separated after the interpolation processing is performed, and therefore the compatibility to the current image pickup unit and the signal processing system is high, so that it is possible to apply the invention to a large number of image pickup systems.

It should be noted that according to the above-mentioned embodiment, it is supposed that the color CCD 1500 is the single CCD having the Bayer type primary color filter arranged on the front face, but it is not necessary to limit to such a configuration. For example, it is possible to also apply to a color difference line-sequential type complementary-color filter, or a two or three CCD. FIG. 50 illustrates a configuration of the color difference line-sequential type complementary-color filter. The color difference line-sequential type has the 2×2 pixels as the basis unit, and cyan (Cy), magenta (Mg), yellow (Ye), and green (G) are arranged in one pixel each. It should be noted that the positions for Mg and G are inversed in every line. In this case, such a configuration can also be adopted that the 2×2 pixel regions are sequentially extracted while overlapping 1 row or 1 column each and the luminance signal Y and the color difference signals Cb and Cr illustrated below in Expression 22 are calculated for each region unit.

$$Y = Cy + Ye + Mg + G$$

$$Cb = (Cy + Mg) - (Ye + G)$$

$$Cr = (Ye + Mg) - (Cy + G) \qquad \text{[Expression 22]}$$

Also, according to the fourth embodiment, the noise reduction processing is performed only on the luminance signal, but it is not necessary to limit to such a configuration. Such a configuration can also be adopted that the noise reduction processing is performed also on the color difference signal.

Furthermore, according to the fourth embodiment, the configuration of being integrated to the image pickup unit is adopted, but it is not necessary to adopt the above-mentioned configuration. Similarly to the first embodiment, such a configuration can also be adopted that a separate unit from the image pickup unit is used.

Also, according to the fourth embodiment, the processing by way of the hardware is supposed, but it is not necessary to limit to such a configuration. For example, such a configuration can also be realized that the signal from the color CCD 1500 remains unprocessed and is set as the Raw data, and the temperature at the time of the shooting, the gain, white balance facetor and the like from the control unit 119 are outputted as the header information to be processed by way of separate software.

FIG. 51 illustrates a flow chart related to the software processing of the signal processing. It should be noted that regarding the same processing step as the flow of the signal processing according to the first embodiment illustrated in FIG. 26, the same step reference numerals are allocated.

First, the signal and the header information such as the temperature, the gain, and the white balance factor are read (step S1).

Next, the single-state signal is put into a three state through a linear interpolation or the like (step S90).

Furthermore, as illustrated in Expression 20, the signal is separated into the luminance signal Y and the color difference signals Cb and Cr (step S91).

Thereafter, as illustrated in FIG. 2, the target pixel and the target region with the 3×3 pixel size are extracted from the luminance signal (step S2).

Next, on the basis of the flow chart illustrated in FIG. 27, the noise amount of the extracted target region is estimated, and the amount is calculated as the noise amount with respect to the target pixel (step S3).

Then, the permissible range illustrated in Expression 7 is set with respect to the target pixel (step S4).

Thereafter, it is determined whether the target pixel belongs within the permissible range or not, and in a case where the target pixel belongs, the flow is branched to step S6, and in a case where the target pixel does not belong, the flow is branched to S7 (step S5).

In step S5, when it is determined that the target pixel belongs to the permissible range, the processing illustrated in Expression 8 is performed (step S6).

On the other hand, in step S5, when it is determined that the target pixel does not belong to the permissible range, the processing illustrated in Expression 9 or Expression 10 is performed (step S7).

Next, it is determined whether the extraction of all the target regions is completed, and in a case the extraction is not completed, the flow is branched to step 2 and in a case the extraction is completed, the flow is branched to step 9 (step S8).

In a case where the extraction of all the target regions is completed, as illustrated in FIG. 10, the target region with the 5×5 pixel size with the target pixel in the center is extracted from the luminance signal having been subjected to the noise reduction (step S9).

Among the pixels of the processing regions extracted in step S9, with respect to the 9 pixels illustrated in FIG. 11, the directional extraction filters illustrated in FIGS. 12 to 19 are used to detect the edge direction (step S10).

Thereafter, on the basis of the edge direction detected in step S10, the edge components are extracted from the luminance signal before being subjected to the noise reduction processing (step S11).

Furthermore, on the basis of the edge direction from step S10, with the edge component in the neighborhood pixel illustrated in FIG. 23 or 24, the edge component is corrected through the correction processing illustrated in Expression 13 or Expression 14 (step S12).

Next, the edge emphasis processing illustrated in Expression 1 is performed on the signal of the target pixel having been subjected to the noise reduction processing (step S13).

Thereafter, it is determined whether the extraction of all the processing regions is completed, and in a case the extraction is not completed, the flow is branched to step 9 and in a case the extraction is completed, the flow is branched to step 92 (step S14).

In step S14, when it is determined that the extraction of all the processing regions is completed, as illustrated in Expression 21, the R, G, and B signals are synthesized (step S92).

Next, a known compression processing, a color emphasis processing, or the like is performed on the synthesized signal (step S15).

Then, the signal after the processing is outputted and the processing is ended (step S16).

Figure 52:
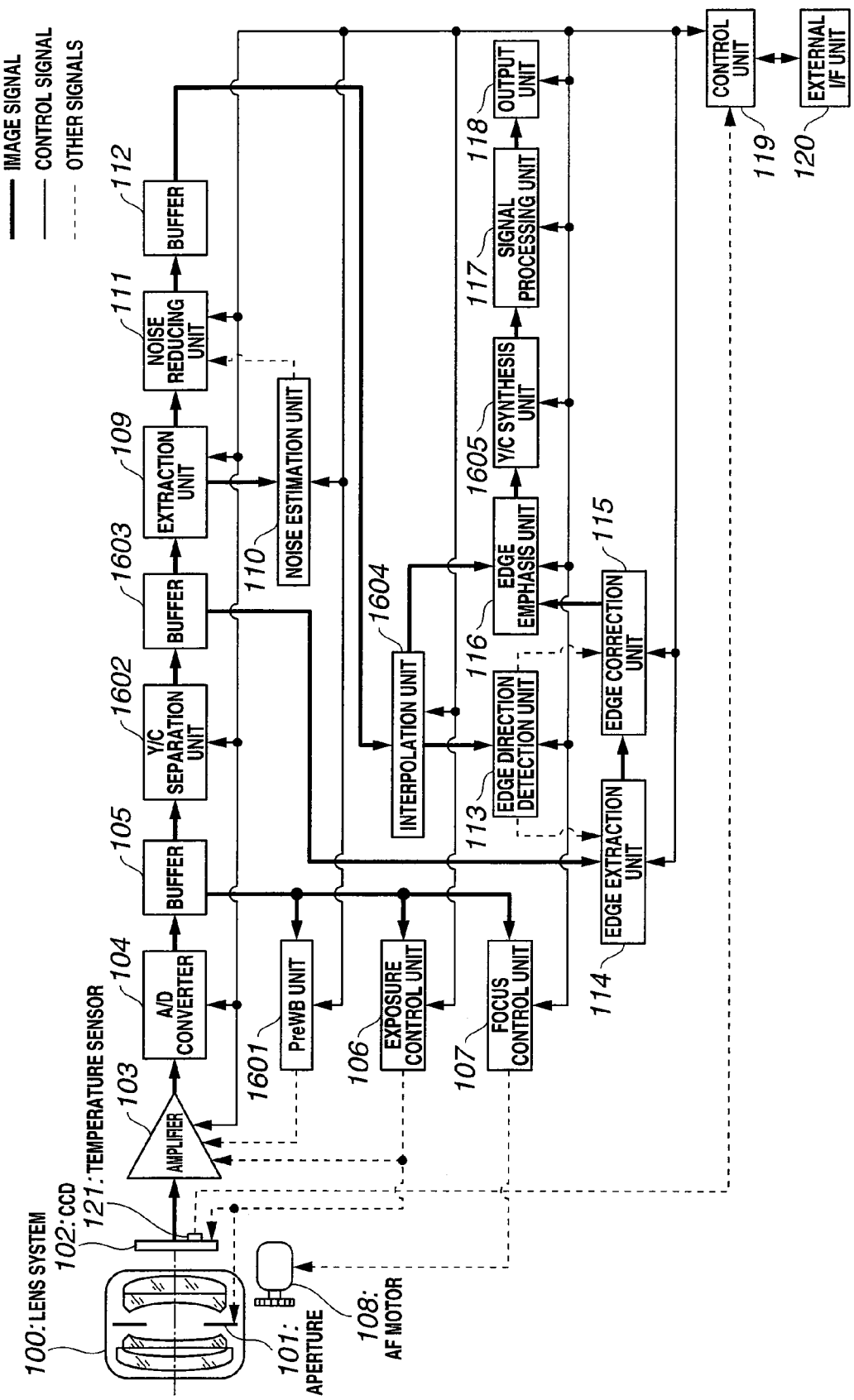
FIG. 52 is a block diagram of a configuration according to a fifth embodiment.

FIGS. 52 to 72 illustrate a fifth embodiment of the present invention: FIG. 52 is a block diagram of a configuration according to the fifth embodiment, FIGS. 53 to 56 are explanatory diagrams related to a Y/C separation in which FIG. 53 illustrates the Bayer type primary color filter, FIG. 54 illustrates the luminance signal, FIG. 55 illustrates a color difference signal of R (red), FIG. 56 illustrates a color difference signal of B (blue), FIG. 57 is an explanatory diagram related to the edge extraction filter at 0° of the edge direction extraction unit in a case where the target pixel is R or B, FIG. 58 is an explanatory diagram related to the edge extraction filter at 0° of the edge direction extraction unit in a case where the target pixel is G, FIG. 59 is an explanatory diagram related to the edge extraction filter at 45° of the edge direction extraction unit in a case where the target pixel is R or B, FIG. 60 is an explanatory diagram related to the edge extraction filter at 45° of the edge direction extraction unit in a case where the target pixel is G, FIG. 61 is an explanatory diagram related to the edge extraction filter at 90° of the edge direction extraction unit in a case where the target pixel is R or B, FIG. 62 is an explanatory diagram related to the edge extraction filter at 90° of the edge direction extraction unit in a case where the target pixel is G, FIG. 63 is an explanatory diagram related to the edge extraction filter at 135° of the edge direction extraction unit in a case where the target pixel is R or B, FIG. 64 is an explanatory diagram related to the edge extraction filter at 135° of the edge direction extraction unit in a case where the target pixel is G, FIG. 65 is an explanatory diagram related to the edge extraction filter at 180° of the edge direction extraction unit in a case where the target pixel is R or B, FIG. 66 is an explanatory diagram related to the edge extraction filter at 180° of the edge direction extraction unit in a case where the target pixel is G, FIG. 67 is an explanatory diagram related to the edge extraction filter at 225° of the edge direction extraction unit in a case where the target pixel is R or B, FIG. 68 is an explanatory diagram related to the edge extraction filter at 225° of the edge direction extraction unit in a case where the target pixel is C; FIG. 69 is an explanatory diagram related to the edge extraction filter at 270° of the edge direction extraction unit in a case where the target pixel is R or B, FIG. 70 is an explanatory diagram related to the edge extraction filter at 270° of the edge direction extraction unit in a case where the target pixel is G, FIG. 71 is an explanatory diagram related to the edge extraction filter at 315° of the edge direction extraction unit in a case where the target pixel is R or B, and FIG. 72 is an explanatory diagram related to the edge extraction filter at 315° of the edge direction extraction unit in a case where the target pixel is G.

FIG. 52 is a block diagram of a configuration according to the fifth embodiment. According to the present embodiment, such a configuration is made that the CCD 102 according to the first embodiment illustrated in FIG. 1 is replaced by a color CCD 1600, and the PreWB unit 1601, the Y/C separation unit 1602, a buffer 1603, an interpolation unit 1604, and a Y/C synthesis unit 1605 are added. The basic configuration is similar to the first embodiment, the same configuration is allocated with the same name and reference numeral to omit the description and only a different point will mainly be described.

The color CCD 1600 is connected to the amplifier 103. Also, the temperature sensor 121 is arranged in the vicinity of the color CCD 1600. The buffer 105 is connected to a PreWB unit 1601, the exposure control unit 106, the focus control unit 107, and the Y/C separation unit 1602. The Y/C separation unit 1602 is connected via a buffer 1603 to the extraction unit 109 and the edge extraction unit 114. The buffer 112 is connected via an interpolation unit 1604 to the edge direction detection unit 113 and the edge emphasis unit 116. The edge emphasis unit 116 is connected to a Y/C synthesis unit 1605, and the Y/C synthesis unit 1605 is connected to the signal processing unit 117. The control unit 119 is connected to the PreWB unit 1601, the Y/C separation unit 1602, the interpolation unit 1604, and the Y/C synthesis unit 1605 bi-directionally.

The present embodiment is basically similar to the first embodiment and only a different point will mainly be described.

In FIG. 52, a flow of the signal will be described. First, by half-pressing the shutter button via the external I/F unit 120, the pre shooting mode is established.

The signal picked up via the lens system 100, the aperture 101, and the color CCD 1600 is transferred via the amplifier 103 and the A/D converter 104 to the buffer 105. It should be noted that according to the present embodiment, it is supposed that the color CCD 1600 is the single CCD having the Bayer type primary color filter arranged on the front face illustrated in FIG. 53.

The PreWB unit 1601 calculates a simplified white balance factor by integrating a signal with a predetermined luminance level for each color signal. The above-mentioned factor is transferred to the amplifier 103, and the white balance is performed by multiplying a different gain for each color signal.

Next, the real shooting is performed through a full press of the shutter button via the external I/F unit 120, and the image signal is transferred to the buffer 105 similarly to the pre shooting.

It should be noted that the white balance factor calculated in the PreWB unit 1601 is transferred to the control unit 119. The signal in the buffer 105 is transferred to the Y/C separation unit 1602.

The Y/C separation unit 1602 supposes, as illustrated in FIGS. 54, 55, and 56, a G signal as the luminance signal Y, a B signal as the color difference signal Cb, and an R signal as the color difference signal Cr.

$$Y=G$$

$$Cb=B$$

$$Cr=R \quad \text{[Expression 23]}$$

The luminance signal and the color difference signal are in the single state before being subjected to the interpolation processing and transferred to the buffer 1603.

Thereafter, similarly to the first embodiment, with the extraction unit 109, the noise estimation unit 110, the noise reducing unit 111, the luminance signal Y is subjected to the noise reduction processing to become a luminance signal Y'.

It should be noted that the gain calculation unit 201 in the noise estimation unit 110 illustrated in FIG. 3 calculates the gain in the amplifier 103 on the basis of the information related to the ISO sensitivity and the exposure condition transferred from the control unit 119 and the white balance factor from the PreWB unit 1601. Also, in the target region with the 3×3 pixel size, only five pixels or four pixels of the luminance signal Y, that is, the G signal exist, and therefore, the calculation of the average value is performed by using the above-mentioned five pixels or four pixels.

The luminance signal Y' having been subjected to the noise reduction and the color difference signals Cb and Cr are transferred and saved in the buffer 112.

The interpolation unit 1604 reads the luminance signal Y' and the color difference signals Cb and Cr from the buffer 112 and generates a three-state signal from the single-state signal by using a method such as a known linear interpolation.

The three-state signal is transferred to the edge direction detection unit 113 and the edge emphasis unit 116.

Similarly to the first embodiment, on the basis of the control of the control unit 119, the edge direction detection unit 113 reads the luminance signal Y' having been subjected to the noise reduction processing from the interpolation unit 1604, and sequentially extracts the target pixel P'$_{22}$ and the processing region with the 5×5 pixel size including the target pixel. Thereafter, the edge directions of the target pixel P'$_{22}$ and the surrounding 8 pixels are detected. The edge direction has one of the three options: "the direction providing the maximum value", "the isotropic edge direction", "no edge direction", and similarly to the first embodiment, the processing in the later stage is selected.

On the basis of the control of the control unit 119, the edge extraction unit 114 sequentially extracts, the luminance signals Y in the single state before being subjected to the noise reduction processing at the same position as the processing region used in the edge direction detection unit 113 from the buffer 1603. Thereafter, on the basis of the edge direction from the edge direction detection unit 113, the edge components of the target pixel P'$_{22}$ and the surrounding 8 pixels are extracted to be transferred to the edge correction unit 115. It should be noted that the edge extraction filters are used in a mode applicable to the luminance signal Y in the single state as illustrated in FIGS. 57 to 72.

On the basis of the control of the control unit 119, regarding the edge components E$_{22}$ of the target pixel P'$_{22}$, the edge correction unit 115 calculates the corrected edge component E'$_{22}$ on the basis of the edge direction D$_{22}$ from the edge direction detection unit 113 and the edge components of the surrounding 8 pixels from the edge extraction unit 114 to be transferred to the edge emphasis unit 116.

On the basis of the control of the control unit 119, the edge emphasis unit 116 reads the luminance signal Y' having been subjected to the noise reduction processing from the interpolation unit 1604, and sequentially extracts the target pixel P'$_{22}$. Thereafter, on the basis of the edge component E'$_{22}$ from the edge correction unit 115, the pixel value P"$_{22}$ having been subjected to the edge emphasis processing is calculated and transferred as the luminance signal Y" having been subjected to the edge emphasis processing to the Y/C synthesis unit 1605. Also, the edge emphasis unit 116 reads the color difference signals Cb and Cr from the interpolation unit 1604 to be transferred to the Y/C synthesis unit 1605.

On the basis of the control of the control unit 119, the Y/C synthesis unit 1605 obtains the R, G, and B signals from the luminance signal Y" having been subjected to the edge emphasis processing from the edge emphasis unit 116 and the color difference signals Cb and Cr.

$$R=Cr$$

$$G=Y"$$

$$B=Cb \quad \text{[Expression 24]}$$

The R, G, and B signals are transferred to the signal processing unit 117.

On the basis of the control of the control unit 119, the signal processing unit 117 performs a known compression processing, a color emphasis processing, or the like on the signal having been subjected to the edge emphasis processing to be transferred to the output unit 118.

The output unit 118 records and saves the signal in the memory card or the like.

With the above-mentioned configuration, the signal from the color image pickup device is separated into the luminance signal and the color signal, the rough direction of the edge is detected from the luminance signal having been subjected to the noise reduction processing, and the edge component is extracted from the original signal on the basis of the direction, so that it is possible to obtain the high quality edge component in which the influence of the noise is suppressed and the fine signal is saved. In this case, the edge component extraction is performed from the signal before being subjected to the interpolation, and therefore it is possible to perform the edge component extraction with the higher precision.

In addition, the edge component is corrected on the basis of the detected edge direction, so that it is possible to generate the high quality edge component.

Furthermore, the noise reduction processing is performed through the noise estimation and the noise reduction, and the estimation accuracy is increased by performing the estimation from a wide region in the noise estimation and only the target pixel is set as the target in the noise reduction, so that the accuracy of the noise reduction processing can be improved and it is possible to obtain the high quality signal.

In the noise estimation, various pieces of information related to the noise amount are dynamically calculated, and the standard value is set for the information which cannot be calculated, so that it is possible to obtain the noise reduction effect with the high accuracy as well as the stability.

Furthermore, in the detection for the edge direction, after the edge strengths in the plural directions or horizontal and vertical directions are calculated, the comparison with the threshold on the basis of the noise amount or the removal of the minute edge strength is performed, and it is thus possible to obtain the edge direction in which the influence of the noise is suppressed and the accuracy is high. Also, as the edge extraction processing in the later stage is stopped in the case where the edge direction cannot be determined, the wasteful processing can be omitted and it is possible to increase the processing speed. Furthermore, as the isotropic edge extraction processing is performed in the case where the plural edge directions are detected, it is possible to obtain the stable processing result.

In addition, it is possible to cope with the signal from the color image pickup device, and therefore the compatibility to the current image pickup unit is high, so that it is possible to apply the invention to a large number of image pickup systems.

It should be noted that according to the above-mentioned embodiment, the configuration of being integrated to the image pickup unit is adopted, but it is not necessary to adopt the above-mentioned configuration. Similarly to the first embodiment, it is also possible to adopt a configuration of being separated from the image pickup unit.

Furthermore, according to the fifth embodiment, the processing by way of the hardware is supposed, but it is not necessary to limit to such a configuration. Similarly to the first embodiment, a configuration of processing by way of the software can also be realized.

Figure 73:
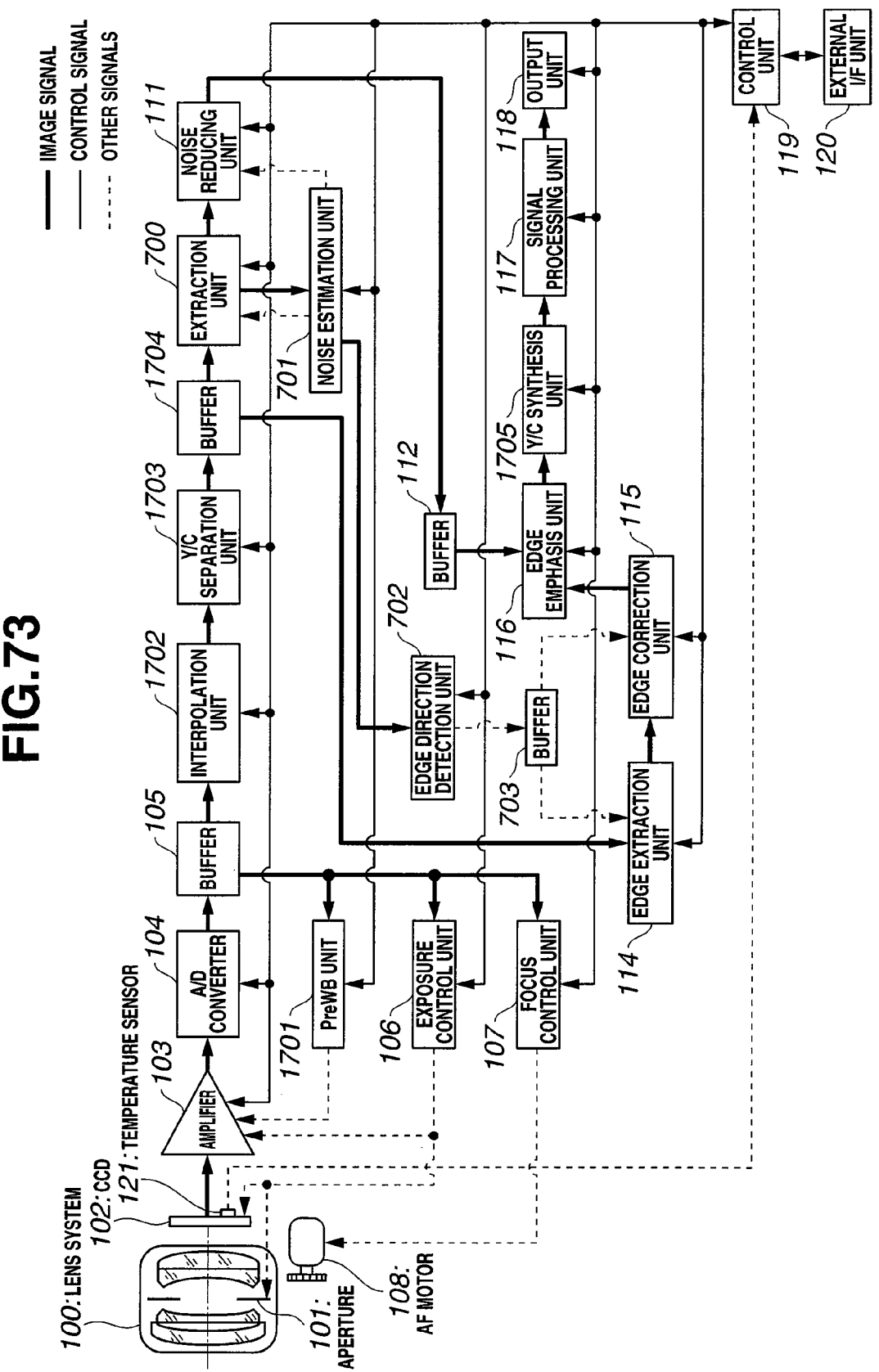
FIG. 73 is a block diagram of a configuration according to a sixth embodiment.

FIG. 73 illustrates a sixth embodiment of the present invention, which is a block diagram of the configuration of the sixth embodiment. According to the present embodiment, such a configuration is made that the CCD 102 according to the second embodiment illustrated in FIG. 28 is replaced by a color CCD 1700, and a PreWB unit 1701, an interpolation unit 1702, the Y/C separation unit 1703, a buffer 1704, and a Y/C synthesis unit 1705 are added. The basic configuration is similar to the second embodiment, the same configuration is allocated with the same name and reference numeral to omit the description and only a different point will mainly be described.

The color CCD 1700 is connected to the amplifier 103. Also, the temperature sensor 121 is arranged in the vicinity of the color CCD 1700. The buffer 105 is connected to the PreWB unit 1701, the exposure control unit 106, the focus control unit 107, and the interpolation unit 1702. The interpolation unit 1702 is connected via the Y/C separation unit 1703 and the buffer 1704 to the extraction unit 700 and the edge extraction unit 114. The edge emphasis unit 116 is connected to the Y/C synthesis unit 1705, and the Y/C synthesis unit 1705 is connected to the signal processing unit 117. The control unit 119 is connected to the PreWB unit 1701, the interpolation unit 1702, the Y/C separation unit 1703, and the Y/C synthesis unit 1705 bi-directionally.

The present embodiment is basically similar to the second embodiment and only a different point will mainly be described.

In FIG. 73, a flow of the signal will be described. By half-pressing the shutter button via the external I/F unit 120, the pre shooting mode is established.

The signal picked up via the lens system 100, the aperture 101, and the color CCD 1700 is transferred via the amplifier 103 and the A/D converter 104 to the buffer 105. It should be noted that according to the present embodiment, it is supposed that the color CCD 1700 is the single CCD having the Bayer type primary color filter arranged on the front face.

The signal in the buffer 105 is transferred to the PreWB unit 1701.

The PreWB unit 1701 calculates a simplified white balance factor by integrating a signal with a predetermined luminance level for each color signal. Then, the above-mentioned factor is transferred to the amplifier 103, and the white balance is performed by multiplying a different gain for each color signal.

Next, the real shooting is performed through a full press of the shutter button via the external I/F unit 120, and the image signal is transferred to the buffer 105 similarly to the pre shooting.

It should be noted that the white balance factor calculated in the PreWB unit 1701 is transferred to the control unit 119. The signal in the buffer 105 is transferred to the interpolation unit 1702.

The interpolation unit 1702 generates a three-state signal from the single-state signal by using a method such as a known linear interpolation. The three-state signal is transferred to the Y/C separation unit 1703 to be separated into the luminance signal Y and the color difference signals Cb and Cr as illustrated in Expression 20. The luminance signal Y and the color difference signals Cb and Cr are transferred and saved in the buffer 1704.

Similarly to the second embodiment, with the extraction unit 700, the noise estimation unit 701, and the noise reducing unit 111, the luminance signal Y is subjected to the noise reduction processing to become a luminance signal Y'. The luminance signal Y' and color difference signals Cb, Cr are transferred and saved in the buffer 112.

The edge direction detection unit 702 detects the edge direction $D_{22}$ with respect to the target pixel $P'_{22}$ on the basis of the information of the target pixel and the similar pixel from the noise estimation unit 701. The edge direction is transferred to the buffer 703. The buffer 112 records all the signals having being subjected to the noise reduction processing, and the buffer 703 records the edge direction.

The edge extraction unit 114 reads the luminance signal Y before being subjected to the noise reduction processing from the buffer 1704 to extract the target pixel $P_{22}$ and the surrounding 8 pixels. Thereafter, on the basis of the edge direction from the buffer 703, the edge components of the target pixel $P'_{22}$ and the surrounding 8 pixels are extracted to be transferred to the edge correction unit 115.

On the basis of the control of the control unit 119, the edge correction unit 115 calculates the corrected edge component $E'_{22}$ regarding the edge components $E_{22}$ of the target pixel $P'_{22}$, on the basis of the edge direction $D_{22}$ from the buffer 703 and the edge components of the surrounding 8 pixels from the edge extraction unit 114 to be transferred to the edge emphasis unit 116.

On the basis of the control of the control unit 119, the edge emphasis unit 116 reads the luminance signal Y' having been subjected to the noise reduction processing from the buffer 112 to sequentially extract the target pixel $P'_{22}$. Thereafter on the basis of the edge component E'22 from the edge correction unit 115, the pixel value P"$_{22}$ having been subjected to the edge emphasis processing is calculated to be transferred as the luminance signal Y" having been subjected to the edge emphasis processing to the Y/C synthesis unit 1705. Also, the edge emphasis unit 116 reads the color difference signals Cb and Cr from the buffer 112 to be transferred to the Y/C synthesis unit 1705.

On the basis of the control of the control unit 119, the Y/C synthesis unit 1705 synthesizes the R, Q and B signals from the luminance signal Y" having been subjected to the edge emphasis processing from the edge emphasis unit 116 and the color difference signals Cb and Cr as illustrated in Expression 21. The R, G, and B signals are transferred to the signal processing unit 117.

The signal processing unit 117 performs a known compression processing, a color emphasis processing, or the like on the signal having been subjected to the edge emphasis processing on the basis of the control of the control unit 119 to be transferred to the output unit 118. The output unit 118 records and saves the signal in the memory card or the like.

With the above-mentioned configuration, the signal from the color image pickup device is separated into the luminance signal and the color signal, the rough direction of the edge is detected from the luminance signal obtained in the course of the noise reduction processing, and the edge component is extracted from the original signal on the basis of the direction, so that it is possible to obtain the high quality edge component in which the influence of the noise is suppressed and the fine signal is saved.

As the edge direction is detected from the information obtained through the course of the noise reduction processing, it is possible to reduce the scale of the system and the lower cost can be realized. Also, as the edge component is corrected on the basis of the detected edge direction, it is possible to generate the high quality edge component.

Furthermore, in the noise reduction processing, the rough first noise amount is estimated from the target pixel, the similar pixel is extracted from the first noise amount, the second noise amount with the high precision is estimated from the target pixel and the similar pixel, and the noise reduction processing is performed on the basis of the second noise amount, so that the accuracy of the noise reduction processing can be improved and it is possible to obtain the high quality signal. In the noise estimation, various pieces of information related to the noise amount are dynamically calculated, and the standard value is set for the information which cannot be calculated, so that it is possible to obtain the noise reduction effect with the high accuracy as well as the stability.

In addition, it is possible to cope with the signal from the color image pickup device, and the luminance signal and the color signal are separated after the interpolation processing is performed, and therefore the compatibility to the current image pickup unit and the signal processing system is high, so that it is possible to apply the invention to a large number of image pickup systems.

It should be noted that according to the above-mentioned embodiment, the configuration of being integrated to the image pickup unit is adopted, but it is not necessary to adopt the above-mentioned configuration. Similarly to the first embodiment, it is also possible to adopt a configuration of being separated from the image pickup unit.

Furthermore, according to the sixth embodiment, the processing by way of the hardware is supposed, but it is not necessary to limit to such a configuration. Similarly to the second embodiment, a configuration of processing by way of the software can also be realized.

[Appendix]

With the embodiments of the present invention as detailed above, the following configuration can be obtained.

(1) In order to achieve the above-mentioned objects, an image pickup system according to a first invention is an image pickup system for processing a signal from an image pickup device, including: a noise processing section for performing a noise reduction processing on the signal from the image pickup device; an edge direction detection section for detecting an edge direction from the signal having been subjected to the noise reduction processing; and an edge extraction section for extracting an edge component from the signal from the image pickup device on the basis of the edge direction.

An application example of the present invention is described in a first embodiment illustrated in FIGS. 1 to 27. The noise processing section having the above-mentioned configuration corresponds to for example an extraction unit 109, a noise estimation unit 110, and a noise reducing unit 111 illustrated in FIGS. 1, 3, 7, and 25, the edge direction detection section corresponds to for example an edge direction detection unit 113 illustrated in FIGS. 1, 8, 9, and 25, and the edge extraction section corresponds to for example the edge extraction unit 114 illustrated in FIGS. 1 and 25, respectively.

A preferable application example of the present invention is an image pickup system in which the noise reduction processing is performed by the extraction unit 109, the noise estimation unit 110, the noise reducing unit 111, the edge direction is detected from the signal having been subjected to the noise reduction processing by the edge direction detection unit 113, and the edge component is extracted from the original signal before being subjected to the noise reduction processing on the basis of the edge direction by the edge extraction unit 114.

In the image pickup system according to the first invention, the rough direction of the edge is detected from the signal having been subjected to the noise reduction processing, and on the basis of the direction, the edge component is extracted from the original signal. For this reason, it is possible to obtain the high quality edge component in which the influence of the noise is suppressed and also the fine signal is saved.

(2) In addition, an image pickup system according to a second invention is an image pickup system for processing a signal from an image pickup device, including: a noise processing section for performing a noise reduction processing on the signal from the image pickup device; an edge direction detection section for detecting an edge direction on the basis of information from the noise processing section; and an edge extraction section for extracting an edge component from the signal from the image pickup device on the basis of the edge direction.

An application example of the present invention is described in a second embodiment illustrated in FIGS. 28 to 37 and a third embodiment illustrated in FIGS. 38 to 47. The noise processing section having the above-mentioned configuration corresponds to for example an extraction unit 700, a noise estimation unit 701, and the noise reducing unit 111 illustrated in FIGS. 28, 31, and 32 and extraction unit 109, a DCT conversion unit 1100, a noise estimation unit 1101, a noise reducing unit 1102, and an inverse DCT conversion unit 1103 illustrated in FIGS. 38, 41, and 42, the edge direction detection section corresponds to for example an edge direction detection unit 702 illustrated in FIGS. 28 and 33 and an edge direction detection unit 1104 illustrated in FIGS. 38 and 43, and the edge extraction section corresponds to for example the edge extraction unit 114 illustrated in FIGS. 28 and 38, respectively.

A preferable application example of the present invention is an image pickup system in which the noise reduction processing is performed by the extraction unit 700, the noise estimation unit 701, and the noise reducing unit 111 or the extraction unit 109, the DCT conversion unit 1100, the noise estimation unit 1101, the noise reducing unit 1102, and the inverse DCT conversion unit 1103, the edge direction is detected on the basis of the information obtained in the procedure of the noise reduction processing by the edge direction detection unit 702 or the edge direction detection unit 1104, and the edge component is extracted from the original signal before the noise reduction on the basis of the edge direction by the edge extraction unit 114.

In the image pickup system according to the second invention, the rough direction of the edge is detected on the basis of the information obtained in the procedure of the noise reduction processing, and on the basis of the direction, the edge component is extracted from the original signal. For this reason, it is possible to obtain the high quality edge component in which the influence of the noise is suppressed and also the fine signal is saved. Furthermore, as the direction of the edge is detected on the basis of the information obtained in the procedure of the noise reduction processing, it is possible to achieve the lower cost while the scale of the system can be reduced.

(3) In addition, an image pickup system according to a third invention is an image pickup system for processing a signal from a color image pickup device, including: a Y/C separation section for separating a luminance signal and a color signal with respect to the signal from the color image pickup device; a noise processing section for performing a noise reduction processing on the luminance signal separated by the Y/C separation section; an edge direction detection section for detecting an edge direction on the basis of the luminance signal having been subjected to the noise reduction processing; and an edge extraction section for extracting an edge component from the luminance signal separated by the Y/C separation section on the basis of the edge direction.

An application example of the present invention is described in a fourth embodiment illustrated in FIGS. 48 to 51 and a fifth embodiment illustrated in FIGS. 52 to 72. The Y/C separation section having the above-mentioned configuration corresponds to for example a Y/C separation unit 1503 illustrated in FIG. 48 and a Y/C separation unit 1602 illustrated in FIG. 52, the noise processing section corresponds to for example the extraction unit 109, the noise estimation unit 110, and the noise reducing unit 111 illustrated in FIGS. 48 and 52, the edge direction detection section corresponds to for example the edge direction detection unit 113 illustrated in FIGS. 48 and 52, and the edge extraction section corresponds to for example the edge extraction unit 114 illustrated in FIGS. 48 and 52, respectively.

A preferable application example of the present invention is an image pickup system in which the signal is separated into the luminance signal and the color signal by the Y/C separation unit 1503 or the Y/C separation unit 1602, the noise reduction processing is performed on the luminance signal by the extraction unit 109, the noise estimation unit 110, and the noise reducing unit 111, the edge direction is detected from the luminance signal having been subjected to the noise reduction processing by the edge direction detection unit 113, and on the basis of the edge direction, the edge component is extracted from the luminance signal before being subjected to the noise reduction by the edge extraction unit 114.

In the image pickup system according to the third invention, the signal from the color image pickup device is separated into the luminance signal and the color signal, the rough direction of the edge is detected from the luminance signal having subjected to the noise reduction processing, and on the basis of the direction, the edge component is extracted from the luminance signal before being subjected to the noise reduction processing. For this reason, it is possible to obtain the high quality edge component in which the influence of the noise is suppressed and also the fine signal is saved. In addition, as the signal from the color image pickup device is dealt with, the image pickup system can be used for various image pickup systems.

(4) In addition, an image pickup system according to a fourth invention is an image pickup system for processing a signal from a color image pickup device, including: a Y/C separation section for separating a luminance signal and a color signal with respect to the signal from the color image pickup device; a noise processing section for performing a noise reduction processing on the luminance signal separated by the Y/C separation section; an edge direction detection section for detecting an edge direction on the basis of information from the noise processing section; and an edge extraction section for extracting an edge component from the luminance signal separated by the Y/C separation section on the basis of the edge direction.

An application example of the present invention is described in a sixth embodiment illustrated in FIG. 73. The Y/C separation section having the above-mentioned configuration corresponds to for example a Y/C separation unit 1703 illustrated in FIG. 73, the noise processing section corresponds to for example the extraction unit 700, the noise estimation unit 701, and the noise reducing unit 111 illustrated in FIG. 73, the edge direction detection section corresponds to for example the edge direction detection unit 702 illustrated in FIG. 73, and the edge extraction section corresponds to for example the edge extraction unit 114 illustrated in FIG. 73, respectively.

A preferable application example of the present invention is an image pickup system in which the signal is separated into the luminance signal and the color signal by the Y/C separation unit 1703, the noise reduction processing is performed on the luminance signal by the extraction unit 700, the noise estimation unit 701, and the noise reducing unit 111, the edge direction is detected on the basis of the information obtained in the procedure of the noise reduction processing by the edge direction detection unit 702, and on the basis of the edge direction, the edge component is extracted from the luminance signal before being subjected to the noise reduction by the edge extraction unit 114.

In the image pickup system according to the fourth invention, the signal from the color image pickup device is separated into the luminance signal and the color signal, the rough direction of the edge is detected on the basis of the information obtained in the procedure of the noise reduction processing, on the basis of the direction, the edge component is extracted from the luminance signal before being subjected to the noise reduction processing. For this reason, it is possible to obtain the high quality edge component in which the influence of the noise is suppressed and also the fine signal is saved. In addition, as the signal from the color image pickup device is dealt with, the image pickup system can be used for various image pickup systems. Furthermore, as the direction of the edge is detected on the basis of the information obtained in the procedure of the noise reduction processing, it is possible to achieve the lower cost while the scale of the system can be reduced.

(5) In addition, an image processing according to a fifth invention is an image processing program for causing a computer to execute a procedure of processing a signal from an image pickup device, the procedure including: a noise processing step of performing a noise reduction processing on the signal from the image pickup device; an edge direction detection step of detecting an edge direction from the signal having been subjected to the noise reduction processing; and a step of extracting an edge component from the signal from the image pickup device on the basis of the edge direction.

An application example of the present invention is described in the first embodiment illustrated in FIGS. 26 and 27. The noise processing procedure of the above-mentioned configuration corresponds to for example a procedure in steps S2 to S7 illustrated in FIGS. 26 and 27, the edge direction detection procedure corresponds to for example a procedure in step S10 illustrated in FIG. 26, and the edge extraction procedure corresponds to for example a procedure in step S11 illustrated in FIG. 26, respectively.

In the image processing program according to the fifth invention, the rough direction of the edge is detected from the signal having been subjected to the noise reduction processing, and on the basis of the direction, the edge component is extracted from the original signal. For this reason, it is possible to obtain the high quality edge component in which the influence of the noise is suppressed and also the fine signal is saved.

(6) In addition, an image processing according to a sixth invention is an image processing program for causing a computer to execute a procedure of processing a signal from an image pickup device, the procedure including: a noise processing step of performing a noise reduction processing on the signal from the image pickup device; an edge direction detection step of detecting an edge direction on the basis of information from the noise processing step; and a step of extracting an edge component from the signal from the image pickup device on the basis of the detected edge direction.

An application example of the present invention is described in the second embodiment illustrated in FIGS. 36 and 37 and the third embodiment illustrated in FIGS. 45, 46, and 47. The noise processing procedure of the above-mentioned configuration corresponds to for example a procedure in steps S2 to S7 illustrated in FIGS. 36 and 37 and a procedure in steps S51 to S56 illustrated in FIGS. 45 and 46, the edge direction detection procedure corresponds to for example a procedure in step S10 illustrated in FIG. 36 and a procedure in step S57 illustrated in FIGS. 45 and 47, and the edge extraction procedure corresponds to for example a procedure in step S33 illustrated in FIG. 36 and a procedure in step S11 illustrated in FIG. 45, respectively.

In the image processing program according to the sixth invention, the rough direction of the edge is detected on the basis of the information obtained in the procedure of the noise reduction processing, and on the basis of the direction, the edge component is extracted from the original signal. For this reason, it is possible to obtain the high quality edge component in which the influence of the noise is suppressed and also the fine signal is saved.

(7) In addition, an image processing according to a seventh invention is an image processing program for causing a computer to execute a procedure of processing a signal from a color image pickup device, the procedure including: a Y/C separation step of separating a luminance signal and a color signal with respect to the signal from the color image pickup device; a noise processing step of performing a noise reduction processing on the luminance signal separated in the Y/C separation step; an edge direction detection step of detecting an edge direction on the basis of the luminance signal having been subjected to the noise reduction processing; and a step of extracting an edge component from the luminance signal separated in the Y/C separation step on the basis of the detected edge direction.

An application example of the present invention is described in the fourth embodiment illustrated in FIG. 51. The Y/C separation procedure of the above-mentioned configuration corresponds to for example a procedure in step S91 illustrated in FIG. 51, the noise processing procedure corresponds to for example a procedure in steps S2 to S7 illustrated in FIG. 51, the edge direction detection procedure corresponds to for example a procedure in step S10 illustrated in FIG. 51, and the edge extraction procedure corresponds to for example a procedure in step S11 illustrated in FIG. 51, respectively.

In the image processing program according to the seventh invention, the signal from the color image pickup device is separated into the luminance signal and the color signal, the rough direction of the edge is detected from the luminance signal having subjected to the noise reduction processing, and on the basis of the direction, the edge component is extracted from the luminance signal before being subjected to the noise reduction processing. For this reason, it is possible to obtain the high quality edge component in which the influence of the noise is suppressed and also the fine signal is saved. In addition, as the signal from the color image pickup device is dealt with, the image pickup system can be used for various image pickup systems.

(8) In addition, an image processing according to an eighth invention is an image processing program for causing a computer to execute a procedure of processing a signal from a color image pickup device, the procedure including: a Y/C separation step of separating a luminance signal and a color signal with respect to the signal from the color image pickup device; a noise processing step of performing a noise reduction processing on the luminance signal separated in the Y/C separation step; an edge direction detection step of detecting an edge direction on the basis of information from the noise processing step; and a step of extracting an edge component from the luminance signal separated in the Y/C separation step on the basis of the detected edge direction.

An application example of the present invention corresponds to a configuration in which the second embodiment illustrated in FIGS. 36 and 37 is applied to the image processing program for executing the procedure of processing the signal from the color image pickup device. The noise processing procedure of the above-mentioned configuration corresponds to for example a procedure in steps S2 to S7 illustrated in FIGS. 36 and 37, the edge direction detection procedure corresponds to for example a procedure in step S10 illustrated in FIG. 36, and the edge extraction procedure corresponds to for example a procedure in step S33 illustrated in FIG. 36, respectively.

In the image processing program according to the eighth invention, the signal from the color image pickup device is separated into the luminance signal and the color signal, the rough direction of the edge is detected on the basis of the information obtained in the procedure of the noise reduction processing, on the basis of the direction, the edge component is extracted from the luminance signal before being subjected to the noise reduction processing. For this reason, it is possible to obtain the high quality edge component in which the influence of the noise is suppressed and also the fine signal is saved. In addition, as the signal from the color image pickup device is dealt with, the image pickup system can be used for various image pickup systems.

It should be noted that the present invention is not exactly limited to the above-mentioned embodiments and can be embodied by modifying the components in the implementing stages without departing from the gist of the invention. Also, various inventions can be formed through appropriate combinations of the plurality of components disclosed in the above-mentioned embodiments. For example, some components may be deleted from the entire components illustrated in the embodiments. Furthermore, the components across different embodiments may also be appropriately combined. In this manner, it is of course possible to realize various modifications and application without departing from the gist of the invention.

What is claimed is:

1. An image pickup system for processing a signal from an image pickup device, comprising:
   a noise processing section for performing a noise reduction processing on the signal from the image pickup device;
   an edge direction detection section for detecting an edge direction based on a result of the noise reduction processing; and
   an edge extraction section for extracting an edge component from the signal from the image pickup device, which signal has not been subjected to the noise reduction processing, on the basis of the edge direction.

2. The image pickup system according to claim 1, wherein the image pickup device is a color image pickup device and the image pickup system further comprises a Y/C separation section for separating a luminance signal and a color signal with respect to the signal from the color image pickup device;
   the noise processing section performs a noise reduction processing on the luminance signal separated by the Y/C separation section;
   the edge direction detection section detects an edge direction based on a result of the noise reduction processing; and
   the edge extraction section extracts an edge component from the luminance signal separated by the Y/C separation section on the basis of the edge direction.

3. The image pickup system according to claim 2, wherein the result of the noise reduction processing is a luminance signal subjected to the noise reduction processing.

4. The image pickup system according to claim 3, wherein the edge direction detection section includes:
   an edge strength calculation section for calculating an edge strength related to predetermined plural directions from the luminance signal having been subjected to the noise reduction processing;
   an edge strength selection section for selecting the edge strength through a comparison with a predetermined threshold; and
   an edge direction determination section for determining an edge direction on the basis of the selected edge strength.

5. The image pickup system according to claim 4, wherein edge strength selection section includes:
   a threshold setting section for setting the threshold on the basis of the noise amount from the noise processing section.

6. The image pickup system according to claim 4, wherein the edge direction determination section includes:
   a stop signal generation section for generating a stop signal for stopping the processing of the edge extraction section in a case where a particular edge direction cannot be determined.

7. The image pickup system according to claim 4, wherein the edge direction determination section includes:
   an isotropic processing signal generation section for generating a control signal for causing the edge extraction section to perform an isotropic edge extraction processing in a case where plural edge directions are detected.

8. The image pickup system according to claim 3, wherein the edge direction detection section includes:
   an edge strength calculation section for calculating an edge strength related to predetermined plural directions from the luminance signal having been subjected to the noise reduction processing;
   a removal section for removing a predetermined minute fluctuation from the edge strength; and
   an edge direction determination section for determining an edge direction on the basis of the edge strength from which the minute fluctuation has been removed.

9. The image pickup system according to claim 8, wherein the edge direction determination section includes:
   a stop signal generation section for generating a stop signal for stopping the processing of the edge extraction section in a case where a particular edge direction cannot be determined.

10. The image pickup system according to claim 8, wherein the edge direction determination section includes:
    an isotropic processing signal generation section for generating a control signal for causing the edge extraction section to perform an isotropic edge extraction processing in a case where plural edge directions are detected.

11. The image pickup system according to claim 3, wherein the edge direction detection section includes:
    an edge strength calculation section for calculating an edge strength related to horizontal and vertical directions from the luminance signal having been subjected to the noise reduction processing; and
    an edge direction determination section for determining an edge direction on the basis of the edge strength.

12. The image pickup system according to claim 11, wherein the edge direction determination section includes:
    a stop signal generation section for generating a stop signal for stopping the processing of the edge extraction section in a case where a particular edge direction cannot be determined.

13. The image pickup system according to claim 11, wherein the edge direction determination section includes:
    an isotropic processing signal generation section for generating a control signal for causing the edge extraction section to perform an isotropic edge extraction processing in a case where plural edge directions are detected.

14. The image pickup system according to claim 2, wherein the result of the noise reduction processing is information transmitted by the noise processing section.

15. The image pickup system according to claim 14, wherein:
    the noise processing section includes:
    a region extraction section for extracting a target region with a predetermined size including a target pixel in which the noise reduction processing is performed on the luminance signal separated by the Y/C separation section;
    a noise estimation section for estimating a noise amount from the target region; and
    a noise reducing section for smoothing the target pixel on the basis of the noise amount; and the edge direction detection section includes:
an edge direction determination section for determining an edge direction on the basis of pixel information used upon the noise amount estimation in the noise estimation section.

16. The image pickup system according to claim 15, wherein the edge direction determination section includes:
a stop signal generation section for generating a stop signal for stopping the processing of the edge extraction section in a case where a particular edge direction cannot be determined.

17. The image pickup system according to claim 15, wherein the edge direction determination section includes:
an isotropic processing signal generation section for generating a control signal for causing the edge extraction section to perform an isotropic edge extraction processing in a case where plural edge directions are detected.

18. The image pickup system according to claim 14, wherein:
the noise processing section includes:
a block extraction section for extracting a block region with a predetermined size from the luminance signal separated by the Y/C separation section;
a conversion section for converting the block region into a frequency space;
a noise estimation section for estimating a noise amount related to a frequency component except for a zero-order component on the basis of the zero-order component in the frequency space;
a noise reducing section for smoothing the frequency component except for the zero-order component on the basis of the noise amount; and
an inverse conversion section for converting the zero-order component and the frequency component except for the zero-order component processed by the noise reducing section into a real space; and
the edge direction detection section includes:
an edge direction determination section for determining an edge direction on the basis of frequency information used upon the noise amount estimation in the noise processing section.

19. The image pickup system according to claim 18, wherein the edge direction determination section includes:
a stop signal generation section for generating a stop signal for stopping the processing of the edge extraction section in a case where a particular edge direction cannot be determined.

20. The image pickup system according to claim 18, wherein the edge direction determination section includes:
an isotropic processing signal generation section for generating a control signal for causing the edge extraction section to perform an isotropic edge extraction processing in a case where plural edge directions are detected.

21. The image pickup system according to claim 2, further comprising an edge emphasis section for performing an edge emphasis on the luminance signal having been subjected to the noise reduction processing on the basis of the extracted edge component.

22. The image pickup system according to claim 21, wherein the edge emphasis section includes:
a correction section for correcting the edge component on the basis of the detected edge direction.

23. The image pickup system according to claim 2, wherein the noise processing section includes:
a region extraction section for extracting a target region with a predetermined size including a target pixel in which the noise reduction processing is performed on the luminance signal separated by the Y/C separation section;
a noise estimation section for estimating a noise amount from the target region; and
a noise reducing section for smoothing the target pixel on the basis of the noise amount.

24. The image pickup system according to claim 23, wherein the noise estimation section includes:
a collection section for collecting information related to a temperature value of the color image pickup device and a gain with respect to the luminance signal;
a supplying section for supplying a standard value with respect to information that cannot be collected by the collection section;
an average calculation section for calculating an average value from the target region; and
a noise amount calculation section for calculating a noise amount on the basis of the information from the collection section or the supplying section and the average value.

25. The image pickup system according to claim 2, wherein the noise processing section includes:
a pixel extraction section for extracting a target pixel in which the noise reduction processing is performed on the luminance signal separated by the Y/C separation section;
a first noise estimation section for estimating a first noise amount from the target pixel;
a similar pixel extraction section for extracting a similar pixel which is similar to the target pixel from a neighborhood of the target pixel on the basis of the target pixel and the first noise amount;
a second noise estimation section for estimating a second noise amount from the target pixel and the similar pixel; and
a noise reducing section for smoothing the target pixel on the basis of the second noise amount.

26. The image pickup system according to claim 25, wherein the first noise estimation section includes:
a collection section for collecting information related to a temperature value of the color image pickup device and a gain with respect to the luminance signal;
a supplying section for supplying a standard value with respect to information that cannot be collected by the collection section; and
a noise amount calculation section for calculating a first noise amount on the basis of the information from the collection section or the supplying section and the target pixel.

27. The image pickup system according to claim 25, wherein the second noise estimation section includes:
a collection section for collecting information related to a temperature value of the color image pickup device and a gain with respect to the luminance signal;
a supplying section for supplying a standard value with respect to information that cannot be collected by the collection section;
an average calculation section for calculating an average value from the target pixel and the similar pixel; and
a noise amount calculation section for calculating a second noise amount on the basis of the information from the collection section or the supplying section and the average value.

28. The image pickup system according to claim 2, wherein the noise processing section includes:
- a block extraction section for extracting a block region with a predetermined size from the luminance signal separated by the Y/C separation section;
- a conversion section for converting the block region into a frequency space;
- a noise estimation section for estimating a noise amount related to a frequency component except for a zero-order component on the basis of the zero-order component in the frequency space;
- a noise reducing section for smoothing the frequency component except for the zero-order component on the basis of the noise amount; and
- an inverse conversion section for converting the zero-order component and the frequency component except for the zero-order component processed by the noise reducing section into a real space.

29. The image pickup system according to claim 28, wherein the noise estimation section includes:
- a collection section for collecting information related to a temperature value of the color image pickup device and a gain with respect to the luminance signal;
- a supplying section for supplying a standard value with respect to information that cannot be collected by the collection section; and
- a noise amount calculation section for calculating a noise amount on the basis of the information from the collection section or the supplying section and the zero-order component.

30. The image pickup system according to claim 2, wherein the color image pickup device is a single image pickup device having an R (red), G (green), B (blue) Bayer type primary color filter arranged on a front face or a single image pickup device having a Cy (cyan), Mg (magenta), Ye (yellow), G (green) color difference line-sequential type complementary-color filter arranged on a front face.

31. The image pickup system according to claim 2, wherein the Y/C separation section further includes:
- an interpolation section for performing an interpolation processing on the signal of the color image pickup device before the luminance signal and the color signal are separated.

32. The image pickup system according to claim 2, wherein the Y/C separation section further includes:
- an interpolation section for performing an interpolation processing on the luminance signal and the color signal after the luminance signal and the color signal are separated.

33. The image pickup system according to claim 1, wherein the result of the noise reduction processing is a signal subjected to the noise reduction processing.

34. The image pickup system according to claim 33, wherein the edge direction detection section includes:
- an edge strength calculation section for calculating an edge strength related to predetermined plural directions from the signal having been subjected to the noise reduction processing;
- an edge strength selection section for selecting the edge strength through a comparison with a predetermined threshold; and
- an edge direction determination section for determining an edge direction on the basis of the selected edge strength.

35. The image pickup system according to claim 34, wherein edge strength selection section includes:
- a threshold setting section for setting the threshold on the basis of the noise amount from the noise processing section.

36. The image pickup system according to claim 34, wherein the edge direction determination section includes:
- a stop signal generation section for generating a stop signal for stopping the processing of the edge extraction section in a case where a particular edge direction cannot be determined.

37. The image pickup system according to claim 34, wherein the edge direction determination section includes:
- an isotropic processing signal generation section for generating a control signal for causing the edge extraction section to perform an isotropic edge extraction processing in a case where plural edge directions are detected.

38. The image pickup system according to claim 33, wherein the edge direction detection section includes:
- an edge strength calculation section for calculating an edge strength related to predetermined plural directions from the signal having been subjected to the noise reduction processing;
- a removal section for removing a predetermined minute fluctuation from the edge strength; and
- an edge direction determination section for determining an edge direction on the basis of the edge strength from which the minute fluctuation has been removed.

39. The image pickup system according to claim 38, wherein the edge direction determination section includes:
- a stop signal generation section for generating a stop signal for stopping the processing of the edge extraction section in a case where a particular edge direction cannot be determined.

40. The image pickup system according to claim 38, wherein the edge direction determination section includes:
- an isotropic processing signal generation section for generating a control signal for causing the edge extraction section to perform an isotropic edge extraction processing in a case where plural edge directions are detected.

41. The image pickup system according to claim 33, wherein the edge direction detection section includes:
- an edge strength calculation section for calculating an edge strength related to horizontal and vertical directions from the signal having been subjected to the noise reduction processing; and
- an edge direction determination section for determining an edge direction on the basis of the edge strength.

42. The image pickup system according to claim 41, wherein the edge direction determination section includes:
- a stop signal generation section for generating a stop signal for stopping the processing of the edge extraction section in a case where a particular edge direction cannot be determined.

43. The image pickup system according to claim 41, wherein the edge direction determination section includes:
- an isotropic processing signal generation section for generating a control signal for causing the edge extraction section to perform an isotropic edge extraction processing in a case where plural edge directions are detected.

44. The image pickup system according to claim 1, wherein the result of the noise reduction processing is information transmitted by the noise processing section.

45. The image pickup system according to claim 44, wherein:
the noise processing section includes:
a region extraction section for extracting a target region with a predetermined size including a target pixel in which the noise reduction processing is performed on the signal from the image pickup device;
a noise estimation section for estimating a noise amount from the target region; and
a noise reducing section for smoothing the target pixel on the basis of the noise amount; and
the edge direction detection section includes:
an edge direction determination section for determining an edge direction on the basis of pixel information used upon the noise amount estimation in the noise estimation section.

46. The image pickup system according to claim 45, wherein the edge direction determination section includes:
a stop signal generation section for generating a stop signal for stopping the processing of the edge extraction section in a case where a particular edge direction cannot be determined.

47. The image pickup system according to claim 45, wherein the edge direction determination section includes:
an isotropic processing signal generation section for generating a control signal for causing the edge extraction section to perform an isotropic edge extraction processing in a case where plural edge directions are detected.

48. The image pickup system according to claim 44, wherein:
the noise processing section includes:
a block extraction section for extracting a block region with a predetermined size from the signal from the image pickup device;
a conversion section for converting the block region into a frequency space;
a noise estimation section for estimating a noise amount related to a frequency component except for a zero-order component on the basis of the zero-order component in the frequency space;
a noise reducing section for smoothing the frequency component except for the zero-order component on the basis of the noise amount; and
an inverse conversion section for converting the zero-order component and the frequency component except for the zero-order component processed by the noise reducing section into a real space; and
the edge direction detection section includes:
an edge direction determination section for determining an edge direction on the basis of frequency information used upon the noise amount estimation in the noise processing section.

49. The image pickup system according to claim 48, wherein the edge direction determination section includes:
a stop signal generation section for generating a stop signal for stopping the processing of the edge extraction section in a case where a particular edge direction cannot be determined.

50. The image pickup system according to claim 48, wherein the edge direction determination section includes:
an isotropic processing signal generation section for generating a control signal for causing the edge extraction section to perform an isotropic edge extraction processing in a case where plural edge directions are detected.

51. The image pickup system according to claim 1, further comprising an edge emphasis section for performing an edge emphasis on the signal having been subjected to the noise reduction processing on the basis of the extracted edge component.

52. The image pickup system according to claim 51, wherein the edge emphasis section includes:
a correction section for correcting the edge component on the basis of the detected edge direction.

53. The image pickup system according to claim 1, wherein the noise processing section includes:
a region extraction section for extracting a target region with a predetermined size including a target pixel in which the noise reduction processing is performed on the signal from the image pickup device;
a noise estimation section for estimating a noise amount from the target region; and
a noise reducing section for smoothing the target pixel on the basis of the noise amount.

54. The image pickup system according to claim 53, wherein the noise estimation section includes:
a collection section for collecting information related to a temperature value of the image pickup device and a gain with respect to the signal from the image pickup device;
a supplying section for supplying a standard value with respect to information that cannot be collected by the collection section;
an average calculation section for calculating an average value from the target region; and
a noise amount calculation section for calculating a noise amount on the basis of the information from the collection section or the supplying section and the average value.

55. The image pickup system according to claim 1, wherein the noise processing section includes:
a pixel extraction section for extracting a target pixel in which the noise reduction processing is performed on the signal from the image pickup device;
a first noise estimation section for estimating a first noise amount from the target pixel;
a similar pixel extraction section for extracting a similar pixel which is similar to the target pixel from a neighborhood of the target pixel on the basis of the target pixel and the first noise amount;
a second noise estimation section for estimating a second noise amount from the target pixel and the similar pixel; and
a noise reducing section for smoothing the target pixel on the basis of the second noise amount.

56. The image pickup system according to claim 55, wherein the first noise estimation section includes:
a collection section for collecting information related to a temperature value of the image pickup device and a gain with respect to the signal from the image pickup device;
a supplying section for supplying a standard value with respect to information that cannot be collected by the collection section; and
a noise amount calculation section for calculating a first noise amount on the basis of the information from the collection section or the supplying section and the target pixel.

57. The image pickup system according to claim 55, wherein the second noise estimation section includes:
a collection section for collecting information related to a temperature value of the image pickup device and a gain with respect to the signal from the image pickup device;
a supplying section for supplying a standard value with respect to information that cannot be collected by the collection section;

an average calculation section for calculating an average value from the target pixel and the similar pixel; and a noise amount calculation section for calculating a second noise amount on the basis of the information from the collection section or the supplying section and the average value.

58. The image pickup system according to claim 1, wherein the noise processing section includes:

a block extraction section for extracting a block region with a predetermined size from the signal from the image pickup device;

a conversion section for converting the block region into a frequency space;

a noise estimation section for estimating a noise amount related to a frequency component except for a zero-order component on the basis of the zero-order component in the frequency space;

a noise reducing section for smoothing the frequency component except for the zero-order component on the basis of the noise amount; and an inverse conversion section for converting the zero-order component and the frequency component except for the zero-order component processed by the noise reducing section into a real space.

59. The image pickup system according to claim 58, wherein the noise estimation section includes:

a collection section for collecting information related to a temperature value of the image pickup device and a gain with respect to the signal from the image pickup device;

a supplying section for supplying a standard value with respect to information that cannot be collected by the collection section; and a noise amount calculation section for calculating a noise amount on the basis of the information from the collection section or the supplying section and the zero-order component.

60. An image processing method for processing a signal from an image pickup device, comprising:

a noise processing step for performing a noise reduction processing on the signal from the image pickup device;

an edge direction detection step for detecting an edge direction based on a result of the noise reduction processing; and an edge extraction step for extracting an edge component from the signal from the image pickup device, which signal has not been subjected to the noise reduction processing, on the basis of the edge direction.

61. The image processing method according to claim 60, wherein the image pickup device is a color image pickup device and the image processing method further comprises a Y/C separation step for separating a luminance signal and a color signal with respect to the signal from the color image pickup device;

the noise processing step is a step for performing a noise reduction processing on the luminance signal separated by the Y/C separation step;

the edge direction detection step is a step for detecting an edge direction based on a result of the noise reduction processing; and the edge extraction step is a step for extracting an edge component from the luminance signal separated by the Y/C separation step on the basis of the edge direction.

62. A computer program product on a tangible computer readable media for causing a computer to process a signal from an image pickup device, comprising:

a noise processing module for performing a noise reduction processing on the signal from the image pickup device;

an edge direction detection module for detecting an edge direction based on a result of the noise reduction processing; and an edge extraction module for extracting an edge component from the signal from the image pickup device, which signal has not been subjected to the noise reduction processing, on the basis of the edge direction.

63. The computer program product according to claim 62, wherein the image pickup device is a color image pickup device and the computer program product further comprises a Y/C separation module for separating a luminance signal and a color signal with respect to the signal from the color image pickup device;

the noise processing module is a module for performing a noise reduction processing on the luminance signal separated by the Y/C separation module;

the edge direction detection module is a module for detecting an edge direction based on a result of the noise reduction processing; and the edge extraction module is a module for extracting an edge component from the luminance signal separated by the Y/C separation module on the basis of the edge direction.

* * * * *